US 7,483,915 B2

(12) United States Patent
Thompson et al.

(10) Patent No.: US 7,483,915 B2
(45) Date of Patent: Jan. 27, 2009

(54) SYSTEMS AND METHOD FOR REPRESENTING RELATIONSHIPS BETWEEN UNITS OF INFORMATION MANAGEABLE BY A HARDWARE/SOFTWARE INTERFACE SYSTEM

(75) Inventors: J. Patrick Thompson, Seattle, WA (US); Anil K. Nori, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 10/646,645

(22) Filed: Aug. 21, 2003

(65) Prior Publication Data
US 2005/0050537 A1 Mar. 3, 2005

(51) Int. Cl.
*G06F 17/30* (2006.01)
(52) U.S. Cl. .................................. 707/103 R
(58) Field of Classification Search ............... None
See application file for complete search history.

(56) References Cited

U.S. PATENT DOCUMENTS

| | | | |
|---|---|---|---|
| 5,684,984 A * | 11/1997 | Jones et al. ................... 707/10 |
| 5,758,153 A * | 5/1998 | Atsatt et al. ............. 707/103 R |
| 5,774,717 A | 6/1998 | Porcaro et al. .............. 707/202 |
| 5,806,074 A | 9/1998 | Souder et al. ................. 707/21 |
| 5,815,415 A * | 9/1998 | Bentley et al. .................. 703/4 |
| 5,842,213 A * | 11/1998 | Odom et al. ................ 707/100 |
| 5,893,106 A | 4/1999 | Brobst et al. ................ 707/102 |
| 5,900,870 A | 5/1999 | Malone et al. .............. 345/333 |
| 5,937,402 A | 8/1999 | Pandit ............................ 707/4 |
| 6,006,234 A | 12/1999 | Govindarajan et al. .. 707/103 R |
| 6,047,291 A | 4/2000 | Anderson et al. ........... 707/103 |
| 6,085,192 A | 7/2000 | Mendez et al. ................ 707/10 |
| 6,108,004 A | 8/2000 | Medl .......................... 345/346 |
| 6,108,661 A * | 8/2000 | Caron et al. ................. 707/102 |
| 6,112,024 A | 8/2000 | Almond et al. ............. 395/703 |
| 6,151,606 A | 11/2000 | Mendez ....................... 707/201 |
| 6,199,195 B1 * | 3/2001 | Goodwin et al. ............ 717/104 |
| 6,240,414 B1 | 5/2001 | Beizer et al. .................... 707/8 |
| 6,317,754 B1 | 11/2001 | Peng .......................... 707/203 |

(Continued)

FOREIGN PATENT DOCUMENTS

EP 0 974 895 1/2000

(Continued)

OTHER PUBLICATIONS

Bernstein et al. "The Microsoft Repository", Proceedings of the 23rd VLDB Conference, 1997, available online at http://citeseer.ist.psu.edu/bernstein97microsoft.html.*

(Continued)

*Primary Examiner*—Christian P. Chace
*Assistant Examiner*—Mark Andrew X Radtke
(74) *Attorney, Agent, or Firm*—Woodcock Washburn LLP

(57) ABSTRACT

Various embodiments of the present invention are directed to a method for manipulating a plurality of discrete units of information ("Items") in a hardware/software interface system for a computer system, said method comprising interconnecting said Items with a plurality of Relationships and managing said Relationships at the hardware/software interface system level. Each Relationship constitutes, at the hardware/software interface system level, a mapping between a pair of Items that said Relationship interconnects. Moreover, each Relationship may have properties of its own distinct and separate from the properties of the Items it interconnects.

30 Claims, 27 Drawing Sheets

U.S. PATENT DOCUMENTS

| | | | |
|---|---|---|---|
| 6,324,533 B1 | 11/2001 | Agrawal et al. | 707/3 |
| 6,338,056 B1 | 1/2002 | Dessloch et al. | 707/2 |
| 6,343,287 B1 | 1/2002 | Kumar et al. | 707/4 |
| 6,370,541 B1 | 4/2002 | Chou et al. | 707/103 |
| 6,430,564 B1 | 8/2002 | Judge et al. | 707/100 |
| 6,438,545 B1 | 8/2002 | Beauregard et al. | 707/6 |
| 6,442,620 B1* | 8/2002 | Thatte et al. | 719/316 |
| 6,449,659 B1* | 9/2002 | Caron et al. | 719/315 |
| 6,477,527 B2 | 11/2002 | Carey et al. | 707/4 |
| 6,477,564 B1 | 11/2002 | Freyssinet et al. | 709/202 |
| 6,519,597 B1 | 2/2003 | Cheng et al. | 707/10 |
| 6,553,391 B1 | 4/2003 | Goldring et al. | 707/203 |
| 6,556,983 B1 | 4/2003 | Altschuler et al. | 706/55 |
| 6,578,046 B2 | 6/2003 | Chang et al. | 707/103 |
| 6,643,652 B2* | 11/2003 | Helgeson et al. | 707/10 |
| 6,671,757 B1 | 12/2003 | Multer et al. | 710/100 |
| 6,694,336 B1 | 2/2004 | Multer et al. | 707/201 |
| 6,701,314 B1 | 3/2004 | Conover et al. | 707/7 |
| 6,704,743 B1 | 3/2004 | Martin | 707/103 R |
| 6,708,221 B1 | 3/2004 | Mendez et al. | 709/248 |
| 6,738,789 B2 | 5/2004 | Multer et al. | 707/201 |
| 6,757,696 B2 | 6/2004 | Multer et al. | 707/201 |
| 6,772,178 B2 | 8/2004 | Mandal et al. | 707/204 |
| 6,801,604 B2 | 10/2004 | Maes et al. | 379/88.17 |
| 6,851,089 B1* | 2/2005 | Erickson et al. | 715/513 |
| 6,857,053 B2 | 2/2005 | Bolik et al. | 711/162 |
| 6,895,586 B1 | 5/2005 | Brasher et al. | 719/313 |
| 6,961,723 B2 | 11/2005 | Faybishenko et al. | 707/100 |
| 6,976,027 B2 | 12/2005 | Cutlip | 707/101 |
| 6,990,513 B2 | 1/2006 | Belfiore et al. | 709/203 |
| 6,999,956 B2* | 2/2006 | Mullins | 707/2 |
| 7,031,973 B2 | 4/2006 | Natarajan et al. | 707/102 |
| 7,043,481 B2* | 5/2006 | Mullins et al. | 707/10 |
| 7,099,932 B1 | 8/2006 | Frenkel et al. | 709/223 |
| 7,158,962 B2 | 1/2007 | Nelson | 707/2 |
| 7,177,843 B2 | 2/2007 | Nguyen et al. | 705/51 |
| 7,177,865 B2 | 2/2007 | Sasaki | 707/7 |
| 7,178,100 B2 | 2/2007 | Call | 704/9 |
| 2002/0091702 A1 | 7/2002 | Mullins | 707/100 |
| 2002/0152422 A1 | 10/2002 | Sharma et al. | 714/13 |
| 2002/0156792 A1 | 10/2002 | Gombocz et al. | 707/103 |
| 2002/0184163 A1 | 12/2002 | Lotter et al. | 705/4 |
| 2002/0198891 A1 | 12/2002 | Li et al. | 707/102 |
| 2003/0105732 A1* | 6/2003 | Kagalwala et al. | 707/1 |
| 2003/0110189 A1 | 6/2003 | Agrawal et al. | 707/203 |
| 2003/0144849 A1 | 7/2003 | Kakivaya et al. | 709/206 |
| 2004/0024795 A1* | 2/2004 | Hind et al. | 707/204 |
| 2004/0025110 A1 | 2/2004 | Hu | 715/500 |
| 2004/0073560 A1 | 4/2004 | Edwards | 707/200 |
| 2004/0199521 A1 | 10/2004 | Anglin et al. | 707/103 |
| 2004/0268240 A1 | 12/2004 | Vincent | 707/100 |
| 2005/0065977 A1 | 3/2005 | Benson et al. | 707/104.1 |

FOREIGN PATENT DOCUMENTS

| | | |
|---|---|---|
| WO | WO 02/075539 | 9/2002 |

OTHER PUBLICATIONS

"Using Value Objects", by the XDoclet Team. Last published: May 05, 2005. Available online at http://xdoclet.sourceforge.net/xdoclet/valueobjects.html.*

Costa, F.M.; Blair, G.S., "Integrating meta-information management and reflection in middleware," Distributed Objects and Applications, 2000. Proceedings. DOA '00. International Symposium on, vol., no., pp. 133-143, 2000.*

Ingalls, D., Kaehler, T., Maloney, J., Wallace, S., and Kay, A. 1997. Back to the future: the story of Squeak, a practical Smalltalk written in itself. SIGPLAN Not. 32, 10 (Oct. 1997), 318-326.*

Ramsey, N. et al., "An Algebraic Approach to File Synchronization", Software Engineering Notes, Association for Computing Machinery, Sep. 2001, 26(5), 175-185, XP002295139.

Andrews, T. et al., "Combining Language and Database Advances in an Object-Oriented Development Environment", OOPSLA Proceedings, Oct. 4-8, 1987, 430-440.

Beard, et al., "Multilevel and Graphical Views of Metadata", Research and Technology Advances in Digital Libraries, 1998, 256-265.

Beitner, N.D. et al., "Multimedia Support and Authoring in Microcosm: An Extended Model", Department of Electronics and Computer Science, University of Southampton, 12 pages.

Berg, C., How Do I Create Persistent Java Objects? Dr. Dobb's Journal, 1997, 22(4), 98-101.

Bhattacharya, S. et al., "Coordinating Backup/Recovery and Data Consistency Between Database and File Systems", International Conference on Management of Data and Symposium on Principles of Database Systems, Proceedings of the 2002 ACM SIGMOD International Conference on Management of Data, 2002, 500-511.

Biliris, A., "The Performance of Three Database Storage Structures of Managing Large Objects", ACM SIGMOD, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", Modelling in Data Base Management Systems G.M. Nijssen, (ed); North Holland Publishing Company: 1976, 125-147.

Buneman, P. et al., Inheritance and Persistence in Database Programming Languages, ACM, 1986, 4-15.

Chien, A.A., "Concurrent Aggregates (CA)—Design and Experience with a Concurrent Object—Oriented Language Based on Aggregates", J. Parallel and Distributed Computing, 1995, 25(2), 174-196.

Chryssostomidis, Chryssosiomos, et al., "Geometric Modeling Issues in Computer Aided Design of Marine Structures", MTS Journal, 22(2) pp. 15-33.

"Computervision Launches Design Automation Development Platform for Windows", PR Newswire, Financial News, Jan. 10, 1995.

Darby, C., Object Serialization in Java 1.1. Marking Objects Persistent, WEB Techniques, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", Software-Practice and Experience, Oct. 1989, 19(10), 970-1013.

Dobashi, Y. et al, "Skylight for Interior Lighting Design," Computer Graphics Forum, 1994, 13(3), C85-C96.

Dorsch, Jeff, "Accel Signs with IBM to Buy Altium PCT Unit-Accel Technologies Acquires the Assets to Altium's P-CAD Business Unit", EDA Licensing, Electronic New, Jan. 16, 1995, 4 pages.

Fegaras, Leonidas, "Optimizing Object Queries Using an Effective Calculus", ACM Transactions on Database Systems, Dec. 2000, 25(4), 457-516.

Findler, R.B. et al., Contract Soundness for Object-Oriented Languages ACM Conference on Object-Oriented Programming Systems, Languages, and Applications, OOPSLA, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al. "Geographic Data Modeling: Requirements and Research Issues in Geographic Data Modeling," Nov. 2001, Proceedings of the 9th ACM International Symposium on Advances in Geographic Information Systems 2-8.

Fuh, Y-C. et al, "Implementation of SQL3 Structured Types with Inheritance and Value Substitutability", Digital Symposium Collection, 2000, Abstract only, 2 pages, www.acm.org/sigmod/disc/p_implementationoyostw.htm.

Garret, J.H., Jr. et al, "An Object Oriented Environment for Representing Building Design and Construction Data", Advanced Construction Technology Center, Jun. 1989, Document No. 89-37-04, 1-34.

Godoy Simões, M. et al, "A RISC-Microcontroller Based Photovoltaic System for Illumination Applications", APEC 2000. Fifteenth Annual IEEE Applied Power Electronics Conference and Exposition, Feb. 6-10, 2000, 2, 1151-1156.

Goscinski, A. "Distributed Operating Systems The Logical Design", Addison-Welsley, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Conventions of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series, vol. 3, Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al., "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-327.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp- An Investigation into the Implementation and Exploitation of Binary Relational Storage Structures", *Proc. 8.sup.th. BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002, 14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2), 108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernatics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Database using Valid XML Documents", *DocEng '01*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architecture Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

D'Andrea, A. et al., "Unisql's Next-Generation Object-Relational Database Management System", *ACM SIGMOD Record*, Sep. 1996, 25(2), 70-76.

Barker, J., "Beginning Java Objects," *Wrox Press Ltd.*, 2000, pp. 1 and 94.

Berenson, H. "A Critique of ANSI SQL Isolation Levels", SIGMOD Record, 1995, 24(2), 10 pages.

Bernstein, P. et al., "Microsoft Repository Version 2 & The Open Information Model," *Microsoft Paper pub. In Information Systems*, 1999, 22(4).

Fialli et al., "Java TM Architecture for XML Binding (JAXB) Specification," Sep. 12, 2002, Version 0.7, 1-178.

Gordon, A.D. et al., "Typing a Multi-Language Intermediate Code," *POPL '01*, London, UK, Jan. 2001, 257.

Gray, J. et al., "The Dangers of replication and a Solution", SIGMOD, 1996, 25(2), 173-182, XP-002146555.

Greenwald, R. et al., "Oracle Essentials: Oracle 8 & Oracle 8i", MultiUser Concurrency, 1999, Ch. 7, 7 pages, XP-002312028.

Guy, R.G. et al., "Implementation of the Ficus Replicated File System", Proceedings of the Summer USENIX Conference, Jun. 1990, 63-71, XP 002234187.

Helal, S. et al., "A Three-tier Architecture for Ubiquitous Data Access", Computer Systems and Applications ACS/IEEE, Jun. 2001, 177-180, XP010551207.

Huang, Yun-Wu. et al., "Lightweight Version Vectors for Pervasive Computing Devices", IEEE, 2000, 43-48.

Ip et al., *IEEE*, 1991, 8-15.

Kistler, J.J. et al., "Disconnected Operation in the Coda File System", ACM Transactions on Computer Systems, Feb. 1992, 10(1), 3-25, XP000323223.

Kistler, J.J. et al., "Increasing File System Availability through Second-Class Replication", IEEE, 1990, 65-69, XP010021244.

Lubinsky, B., "Approaches to B2B Integration," *EAI Journal*, Feb. 2002.

Mazzola Paluska, J. et al., "Footloose: A Case for Physical Eventual Consistency and Selective Conflict Resolution", Proceedings of the 5th IEEE Workshop on Mobile Computing Systems and Applications, 2003, 170-179.

Plattner, C. et al., "Ganymed: Scalable Replication for Transactional Web Applications", IFIP International federation for Information Processing, 2004, 155-174, XP-002370197.

Seshadri, P., "Enhanced Abstract Data Types in Object-Relational Databases", The VLDB Journal, The International Journal on Very Large Databases, 1998, 7, 130-140.

Shapiro, M. et al., "Managing Databases with Binary Large Objects", IEEE, 1999, 185-193, XP-000922048.

Singer, J., "JVM versus CLR: A Comparative Study," *PPPJ 2003*, Kilkenny City, Ireland, Jun. 16-18, 2003, 167.

Soundarajan et al., *Fifth International Conference on Software reuse ICSR*, 1998, 206-215.

"SyncML Sync Protocol", 2000, Version 1.0, 60 pages, http://www.syncml.org/docs/syncml protocol v10 20001207.pdf.

Wang et al., peper on (OS) application programming interfaces (APIs), *IEEE Communications Magazine*, Oct. 2001.

\* cited by examiner

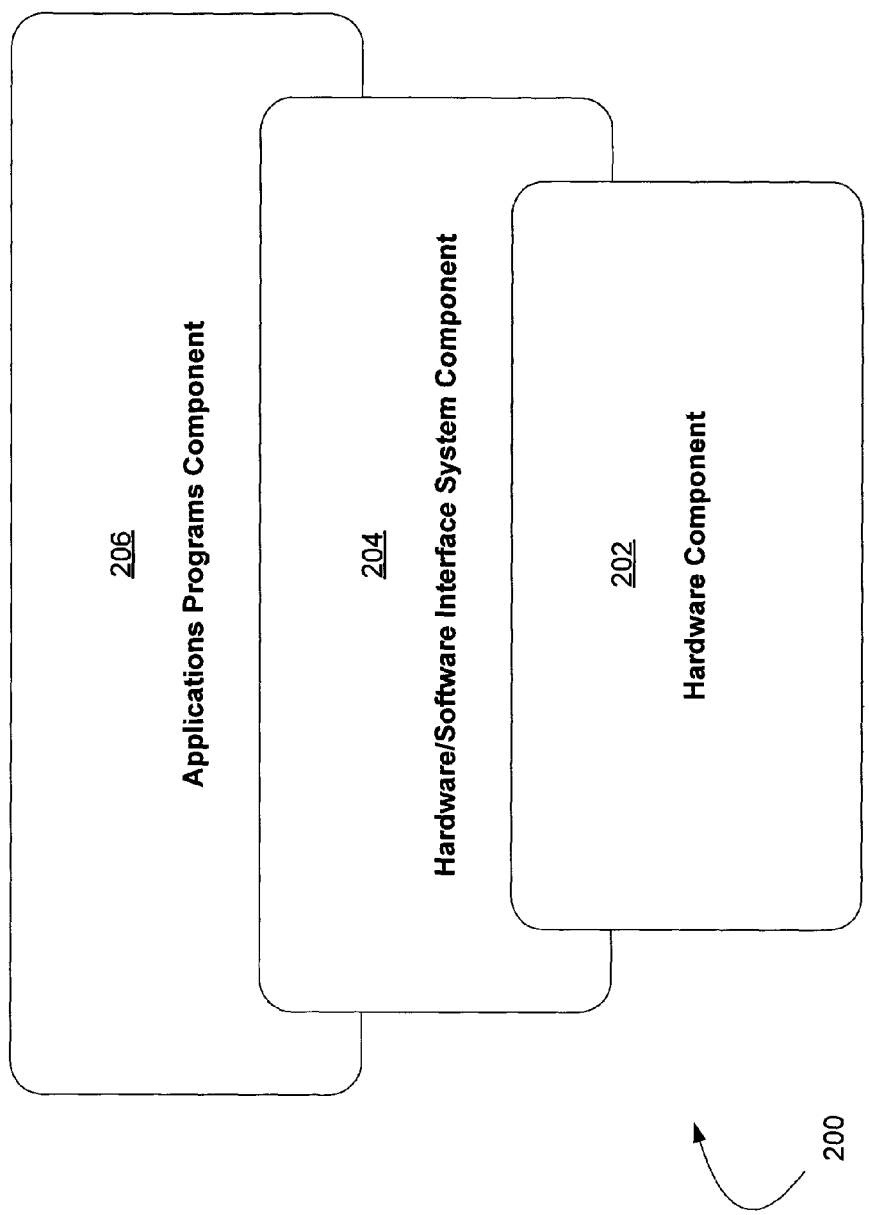

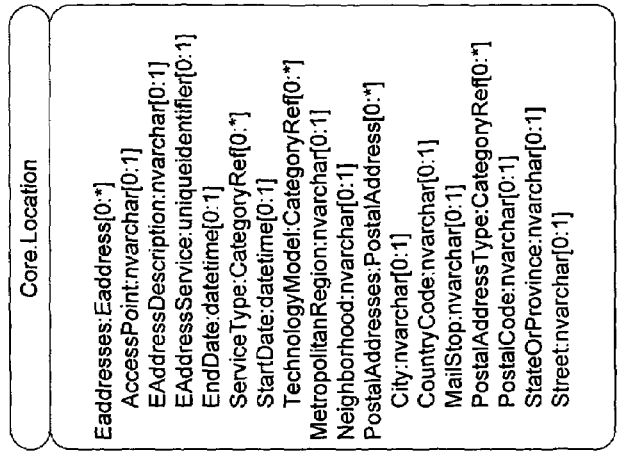
FIG. 5C
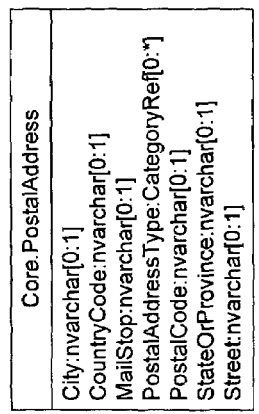
FIG. 5A
FIG. 5B

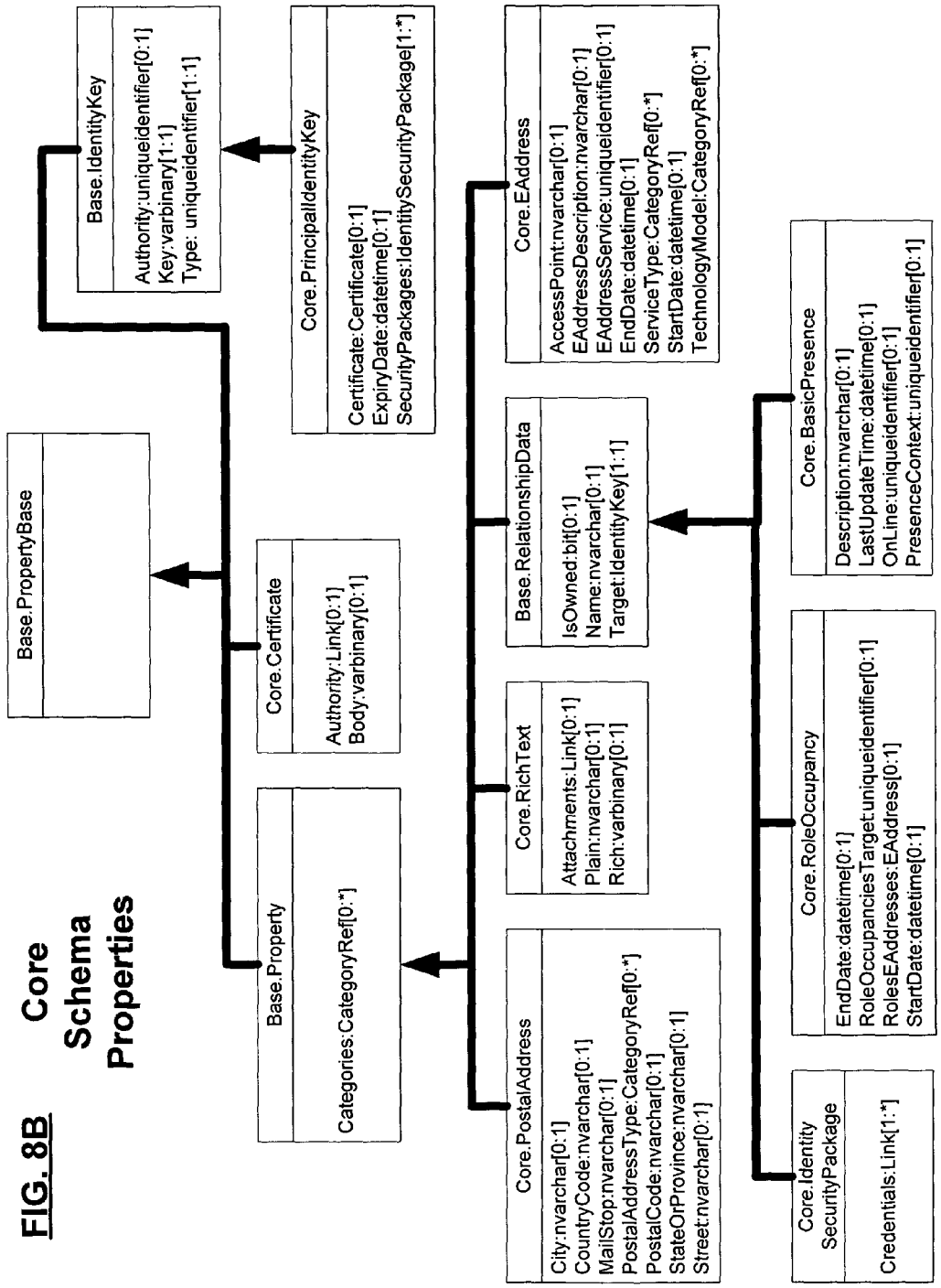
FIG. 8B    Core Schema Properties

Note: Grey boxes are types defined in the Base schema, but are shown here for the sake of completeness.

Items Defined in the Files Schema

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| G R | G W | G E | G A | \multicolumn{4}{c|}{Reserved} | A S | \multicolumn{7}{c|}{Standard Access Rights} | \multicolumn{16}{c|}{Object-Specific Access Rights} |

GR --> Generic_Read
GW --> Generic_Write
GE --> Generic_Execute
GA --> Generic_ALL
AS --> Right to access SACL

FIG. 26

SYSTEMS AND METHOD FOR REPRESENTING RELATIONSHIPS BETWEEN UNITS OF INFORMATION MANAGEABLE BY A HARDWARE/SOFTWARE INTERFACE SYSTEM

CROSS-REFERENCE

This application is related by subject matter to the inventions disclosed in the following commonly assigned applications: U.S. patent application Ser. No. 10/647,058, filed Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,575, filed Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, filed Aug. 21, 2003, entitled "STORAGE PLATFORM FOR ORGANIZING, SEARCHING, AND SHARING DATA"; and U.S. patent application Ser. No. 10/646,580, filed Aug. 21, 2003, entitled "SYSTEMS AND METHODS FOR DATA MODELING IN AN ITEM-BASED STORAGE PLATFORM".

FIELD OF THE INVENTION

The present invention relates generally to the field of information storage and retrieval, and, more particularly, to an active storage platform for organizing, searching, and sharing different types of data in a computerized system.

BACKGROUND OF THE INVENTION

Individual disk capacity has been growing at roughly seventy percent (70%) per year over the last decade. Moore's law accurately predicted the tremendous gains in central processing unit (CPU) power that has occurred over the years. Wired and wireless technologies have provided tremendous connectivity and bandwidth. Presuming current trends continue, within several years the average laptop computer will possess roughly one terabyte (TB) of storage and contain millions of files, and 500 gigabyte (GB) drives will become commonplace.

Consumers use their computers primarily for communication and organizing personal information, whether it is traditional personal information manager (PIM) style data or media such as digital music or photographs. The amount of digital content, and the ability to store the raw bytes, has increased tremendously; however the methods available to consumers for organizing and unifying this data has not kept pace. Knowledge workers spend enormous amounts of time managing and sharing information, and some studies estimate that knowledge workers spend 15-25% of their time on non-productive information related activities. Other studies estimate that a typical knowledge worker spends about 2.5 hours per day searching for information.

Developers and information technology (IT) departments invest significant amounts of time and money in building their own data stores for common storage abstractions to represent such things as people, places, times, and events. Not only does this result in duplicated work, but it also creates islands of common data with no mechanisms for common searching or sharing of that data. Just consider how many address books can exist today on a computer running the Microsoft Windows operating system. Many applications, such as e-mail clients and personal finance programs, keep individual address books, and there is little sharing among applications of the address book data that each such program individually maintains. Consequently, a finance program (like Microsoft Money) does not share addresses for payees with the addresses maintained in an email contact folder (like the one in Microsoft Outlook). Indeed, many users have multiple devices and logically should synchronize their personal data amongst themselves and across a wide variety of additional sources, including cell phones to commercial services such as MSN and AOL; nevertheless, collaboration of shared documents is largely achieved by attaching documents to e-mail messages-that is, manually and inefficiently.

One reason for this lack of collaboration is that traditional approaches to the organization of information in computer systems have centered on the use of file-folder-and-directory-based systems ("file systems") to organize pluralities of files into directory hierarchies of folders based on an abstraction of the physical organization of the storage medium used to store the files. The Multics operating system, developed during the 1960s, can be credited with pioneering the use of the files, folders, and directories to manage storable units of data at the operating system level. Specifically, Multics used symbolic addresses within a hierarchy of files (thereby introducing the idea of a file path) where physical addresses of the files were not transparent to the user (applications and end-users). This file system was entirely unconcerned with the file format of any individual file, and the relationships amongst and between files was deemed irrelevant at the operating system level (that is, other than the location of the file within the hierarchy). Since the advent of Multics, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of indirection (interpretation) between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable.

Moreover, existing file systems know little about the structure of data stored in individual files and, because of this, most of the information remains locked up in files that may only be accessed (and comprehensible) to the applications that wrote them. Consequently, this lack of schematic description of information, and mechanisms for managing information, leads to the creation of silos of data with little data sharing among the individual silos. For example, many personal computer (PC) users have more than five distinct stores that contain information about the people they interact with on some level—for example, Outlook Contacts, online account addressees, Windows Address Book, Quicken Payees, and instant messaging (IM) buddy lists—because organizing files presents a significant challenge to these PC users. Because most existing file systems utilize a nested folder metaphor for organizing files and folders, as the number of files increases the effort necessary to maintain an organization scheme that is flexible and efficient becomes quite daunting. In such situations, it would be very useful to have multiple classifications of a single file; however, using hard or soft links in existing file systems is cumbersome and difficult to maintain.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file and folder based hierarchical structure at the hardware/software interface system level. Other efforts, such as those that attempted to use SmallTalk (and other derivatives), proved to be quite effective at handling file and non-file representations but lacked database features necessary to efficiently organize and utilize the relationships that exist between the various data files, and thus the overall efficiency of such systems was unacceptable. Yet other attempts to use BeOS (and other such operating systems research) proved to be inadequate at handling non-file representations—the same core shortcoming of traditional file systems—despite being able to adequately represent files while providing some necessary database features.

Database technology is another area of the art in which similar challenges exits. For example, while the relational database model has been a great commercial success, in truth independent software vendors (ISV) generally exercise a small portion of the functionality available in relational database software products (such as Microsoft SQL Server). Instead, most of an application's interaction with such a product is in the form of simple "gets" and "puts". While there are a number of readily apparent reasons for this—such as being platform or database agnostic—one key reason that often goes unnoticed is that the database does not necessarily provide the exact abstractions that a major business application vendor really needs. For example, while the real world has the notion of "items", such as "customers" or "orders" (along with an order's embedded "line items" as items in and of themselves), relational databases only talk in terms of tables and rows. Consequently, while the application may desire to have aspects of consistency, locking, security, and/or triggers at the item level (to name a few), generally databases provide these features only at the table/row level. While this may work fine if each item gets mapped to a single row in some table in the database, in the case of an order with multiple line items there may be reasons why an item actually gets mapped to multiple tables and, when that is the case, the simple relational database system does not quite provide the right abstractions. Consequently, an application must build logic on top of the database to provide these basic abstractions. In other words, the basic relational model does not provide a sufficient platform for storage of data on which higher-level applications can easily be developed because the basic relational model requires a level of indirection between the application and the storage system—where the semantic structure of the data might only be visible in the application in certain instances. While some database vendors are building higher-level functionality into their products—such as providing object relational capabilities, new organizational models, and the like—none have yet to provide the kind of comprehensive solution needed, where a truly comprehensive solution is one which provides both useful data model abstractions (such as "Items," "Extensions," "Relationships," and so on) for useful domain abstractions (such as "Persons," "Locations," "Events," etc.).

In view of the foregoing deficiencies in existing data storage and database technologies, there is a need for a new storage platform that provides an improved ability to organize, search, and share all types of data in a computer system—a storage platform that extends and broadens the data platform beyond existing file systems and database systems, and that is designed to be the store for all types of data. The present invention satisfies this need.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to a storage platform for organizing, searching, and sharing data. The storage platform of the present invention extends and broadens the concept of data storage beyond existing file systems and database systems, and is designed to be the store for all types of data including structured, non-structured, or semi-structured data.

According to one aspect of the present invention, the storage platform of the present invention comprises a data store implemented on a database engine. In various embodiments of the present invention, the database engine comprises a relational database engine with object relational extensions. The data store implements a data model that supports organization, searching, sharing, synchronization, and security of data. Specific types of data are described in schemas, and the platform provides a mechanism to extend the set of schemas to define new types of data (essentially subtypes of the basic types provides by the schemas). A synchronization capability facilitates the sharing of data among users or systems. File-system-like capabilities are provided that allow interoperability of the data store with existing file systems but without the limitation of such traditional file systems. A change tracking mechanism provides the ability track changes to the data store. The storage platform further comprises a set of application program interfaces that enable applications to access all of the foregoing capabilities of the storage platform and to access the data described in the schemas.

According to another aspect of the invention, the data model implemented by the data store defines units of data storage in terms of items, elements, and relationships. An item is a unit of data storable in a data store and can comprise one or more elements and relationships. An element is an instance of a type comprising one or more fields (also referred to herein as a property). A relationship is a link between two items. (As used herein, these and other specific terms may be capitalized in order to offset them from other terms used in close proximity; however, there is no intention whatsoever to distinguish between a capitalized term, e.g. "Item", and the same term when not capitalized, e.g., "item", and no such distinction should be presumed or implied.)

According to another aspect of the invention, a computer system comprises a plurality of Items where each Item constitutes a discrete storable unit of information that can be manipulated by a hardware/software interface system; a plurality of Item Folders that constitute an organizational structure for said Items; and a hardware/software interface system for manipulating a plurality of Items and wherein each Item belongs to at least one Item Folder and may belong to more than one Item Folder.

According to another aspect of the invention, a computer system comprises a plurality of Items, where each Item constitutes a discrete unit of information that can be manipulated by a hardware/software interface system, and the Item or some of the Item's property values are computed dynamically as opposed to being derived from a persistent store. In other words, the hardware/software interface system does not require that the Item be stored, and certain operations are supported such as the ability to enumerate the current set of Items or the ability to retrieve an Item given its identifier (which is more fully described in the sections that describe the application programming interface, or API) of the storage platform—for example, an Item might be the current location of a cell phone or the temperature reading on a temperature sensor.

According to another aspect of the invention, a hardware/software interface system for a computer system, wherein said hardware/software interface system manipulates a plurality of Items, further comprises Items interconnected by a plurality of Relationships managed by the hardware/software interface system. According to another aspect of the invention, a hardware/software interface system for a computer system wherein said hardware/software interface system manipulates a plurality of discrete units of information having properties understandable by said hardware/software interface system. According to another aspect of the invention, a hardware/software interface system for a computer system comprises a core schema to define a set of core Items which said hardware/software interface system understands and can directly process in a predetermined and predictable way. According to another aspect of the invention, a method for manipulating a plurality of discrete units of information ("Items") in a hardware/software interface system for a computer system, said method comprising interconnecting said Items with a plurality of Relationships and managing said Relationships at the hardware/software interface system level, is disclosed.

According to another feature of the invention, the API of the storage platform provides data classes for each item, item extension, and relationship defined in the set of storage platform schemas. In addition, the application programming interface provides a set of framework classes that define a common set of behaviors for the data classes and that, together with the data classes, provide the basic programming model for the storage platform API. According to another feature of the invention, the storage platform API provides a simplified query model that enables application programmers to form queries based on various properties of the items in the data store, in a manner that insulates the application programmer from the details of the query language of the underlying database engine. According to yet another aspect of the storage platform API of the present invention, the API collects changes to an item made by an application program and then organizes them into the correct updates required by the database engine (or any kind of storage engine) on which the data store is implemented. This enables application programmers to make changes to an item in memory, while leaving the complexity of data store updates to the API.

Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 2 is a block diagram illustrating a computer system divided into three component groups: the hardware component, the hardware/software interface system component, and the application programs component;

FIG. 5A is a block diagram illustrating the structure of an Item;

FIG. 5B is a block diagram illustrating the complex property types of the Item of FIG. 5A;

FIG. 5C is a block diagram illustrating the "Location" Item wherein its complex types are further described (explicitly listed);

FIG. 8B is a block diagram illustrating the property types in the Core Schema;

FIG. 26 is a diagram illustrating an access mask format used for data security purposes, in accordance with an embodiment of the present invention;

---

Figure 1:
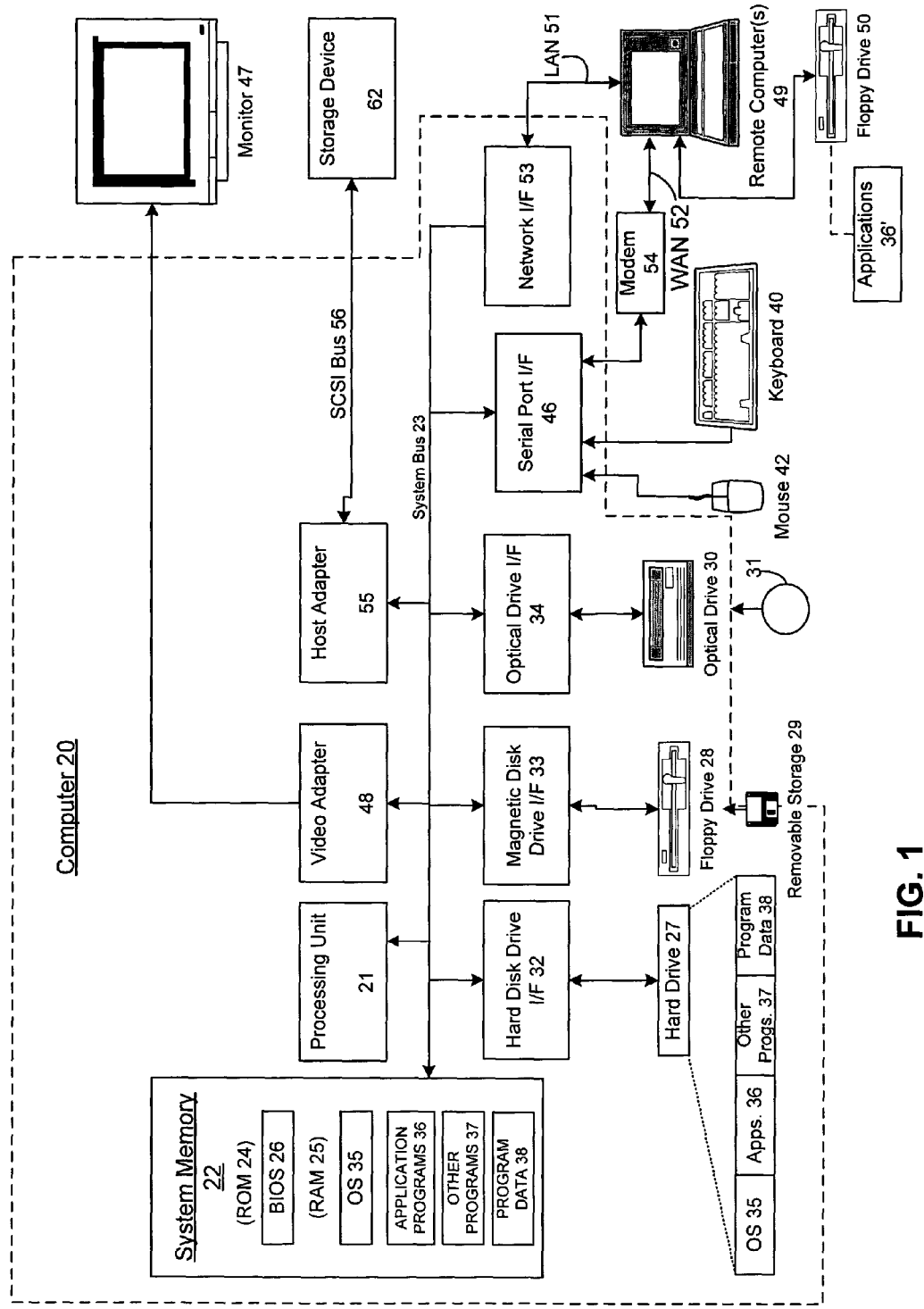
FIG. 1 is a block diagram representing a computer system in which aspects of the present invention may be incorporated.

DETAILED DESCRIPTION OF THE INVENTION
TABLE OF CONTENTS

| | | | | |
|---|---|---|---|---|
| I. | INTRODUCTION | | | 22 |
| | A. | EXEMPLARY COMPUTING ENVIRONMENT | | 22 |
| | B. | TRADITIONAL FILE-BASED STORAGE | | 26 |
| II. | A NEW STORAGE PLATFORM FOR ORGANIZING, SEARCHING, AND SHARING DATA | | | 28 |
| | A. | GLOSSARY | | 28 |
| | B. | STORAGE PLATFORM OVERVIEW | | 29 |
| | C. | THE DATA MODEL | | 30 |
| | | 1. | Items | 32 |
| | | 2. | Item Identification | 36 |
| | | | a) Item References | 36 |
| | | | (1) ItemIDReference | 36 |
| | | | (2) ItemPathReference | 36 |
| | | | b) Reference type hierarchy | 36 |
| | | 3. | Item Folders and Categories | 37 |
| | | 4. | Schemas | 39 |
| | | | a) Base Schema | 39 |
| | | | b) Core Schema | 39 |
| | | 5. | Relationships | 41 |
| | | | a) Relationship Declaration | 42 |
| | | | b) Holding Relationship | 43 |
| | | | c) Embedding Relationships | 45 |
| | | | d) Reference Relationships | 45 |
| | | | e) Rules and constraints | 46 |
| | | | f) Ordering of Relationships | 47 |
| | | 6. | Extensibility | 52 |
| | | | a) Item extensions | 53 |
| | | | b) Extending NestedElement types | 57 |
| | D. | DATABASE ENGINE | | 59 |
| | | 1. | Data Store Implementation Using UDTs | 60 |
| | | 2. | Item Mapping | 62 |
| | | 3. | Extension Mapping | 64 |
| | | 4. | Nested Element Mapping | 65 |
| | | 5. | Object Identity | 65 |
| | | 6. | SQL Object Naming | 66 |

-continued

| | | DETAILED DESCRIPTION OF THE INVENTION TABLE OF CONTENTS | | |
|---|---|---|---|---|
| | 7. | Column Naming | | 67 |
| | 8. | Search Views | | 67 |
| | | a) | Item | 68 |
| | | | (1) Master Item Search View | 68 |
| | | | (2) Typed Item Search Views | 69 |
| | | b) | Item Extensions | 69 |
| | | | (1) Master Extension Search View | 69 |
| | | | (2) Typed Extension Search Views | 70 |
| | | c) | Nested Elements | 71 |
| | | d) | Relationships | 71 |
| | | | (1) Master Relationship Search View | 71 |
| | | | (2) Relationship Instance Search Views | 72 |
| | 9. | Updates | | 73 |
| | 10. | Change Tracking & Tombstones | | 73 |
| | | a) | Change Tracking | 74 |
| | | | (1) Change Tracking in "Master" Search Views | 74 |
| | | | (2) Change Tracking in "Typed" Search Views | 75 |
| | | b) | Tombstones | 76 |
| | | | (1) Item Tombstones | 76 |
| | | | (2) Extension Tombstones | 76 |
| | | | (3) Relationships Tombstone | 77 |
| | | | (4) Tombstone Cleanup | 78 |
| | 11. | Helper APIs and Functions | | 78 |
| | | a) | Function [System.Storage].GetItem | 78 |
| | | b) | Function [System.Storage].GetExtension | 78 |
| | | c) | Function [System.Storage].GetRelationship | 78 |
| | 12. | Metadata | | 78 |
| | | a) | Schema Metadata | 79 |
| | | b) | Instance Metadata | 79 |
| E. | SECURITY | | | 79 |
| | 1. | Overview | | 79 |
| | 2. | Detailed Description of the Security Model | | 84 |
| | | a) | Security Descriptor structure | 84 |
| | | | (1) Access Mask Format | 86 |
| | | | (2) Generic Access Rights | 86 |
| | | | (3) Standard Access Rights | 87 |
| | | b) | Item Specific Rights | 87 |
| | | | (1) File and Directory object specific rights | 87 |
| | | | (2) WinFSItemRead | 89 |
| | | | (3) WinFSItemReadAttributes | 89 |
| | | | (4) WinFSItemWriteAttributes | 90 |
| | | | (5) WinFSItemWrite | 90 |
| | | | (6) WinFSItemAddLink | 90 |
| | | | (7) WinFSItemDeleteLink | 91 |
| | | | (8) Rights to delete an item | 91 |
| | | | (9) Rights to copy an item | 91 |
| | | | (10) Rights to move an item | 92 |
| | | | (11) Rights to view the security policy on an item | 92 |
| | | | (12) Rights to change the security policy on an item | 92 |
| | | | (13) Rights that don't have a direct equivalent | 93 |
| | 3. | Implementation | | 93 |
| | | a) | Creating a new item in a container | 94 |
| | | b) | Adding an explicit ACL to an item | 94 |
| | | c) | Adding a holding Relationship to an item | 94 |
| | | d) | Deleting a holding Relationship from an item | 95 |
| | | e) | Deleting an explicit ACL from an item | 95 |
| | | f) | Modifying an ACL associated with an item | 95 |
| F. | NOTIFICATIONS AND CHANGE TRACKING | | | 95 |
| | 1. | Storage Change Events | | 96 |
| | | a) | Events | 96 |
| | | b) | Watchers | 97 |
| | 2. | Change Tracking and Notification Generation Mechanism | | 98 |
| | | a) | Change tracking | 100 |
| | | b) | Timestamp Management | 101 |
| | | c) | Data Change Detection - Event Detection | 101 |
| G. | SYNCHRONIZATION | | | 102 |
| | 1. | Storage Platform-to-Storage Platform Synchronization | | 103 |
| | | a) | Synchronization (Sync) Controlling Applications | 103 |
| | | b) | Schema annotation | 104 |

-continued

DETAILED DESCRIPTION OF THE INVENTION
TABLE OF CONTENTS

|   |   |   |   |   | |
|---|---|---|---|---|---|
| | | c) | | Sync Configuration | 105 |
| | | | (1) | Community Folder - Mappings | 106 |
| | | | (2) | Profiles | 107 |
| | | | (3) | Schedules | 108 |
| | | d) | | Conflict Handling | 108 |
| | | | (1) | Conflict Detection | 108 |
| | | | | (a) Knowledge-based conflicts | 108 |
| | | | | (b) Constraint-based conflicts | 109 |
| | | | (2) | Conflict Processing | 109 |
| | | | | (a) Automatic Conflict resolution | 110 |
| | | | | (b) Conflict Logging | 110 |
| | | | | (c) Conflict inspection and resolution | 112 |
| | | | | (d) Convergence of replicas and Propagation of Conflict Resolutions | 112 |
| | 2. | Synchronizing to non-storage platform data stores | | | 113 |
| | | a) | | Sync Services | 113 |
| | | | (1) | Change Enumeration | 113 |
| | | | (2) | Change Application | 114 |
| | | | (3) | Conflict Resolution | 115 |
| | | b) | | Adapter implementation | 115 |
| | 3. | Security | | | 115 |
| | 4. | Manageability | | | 116 |
| H. | TRADITIONAL FILE SYSTEM INTEROPERABILITY | | | | 116 |
| | 1. | Model for Interoperability | | | 117 |
| | 2. | Data Store Features | | | 118 |
| | | a) | | Not a volume | 118 |
| | | b) | | Store Structure | 119 |
| | | c) | | Not all files are migrated | 119 |
| | | d) | | NTFS namespace access to Storage Platform files | 119 |
| | | e) | | Expected namespace/drive letters | 120 |
| I. | STORAGE PLATFORM API | | | | 120 |
| | 1. | Overview | | | 120 |
| | 2. | Naming and Scopes | | | 121 |
| | 3. | Storage Platform API Components | | | 123 |
| | 4. | Data Classes | | | 123 |
| | 5. | Runtime Framework | | | 131 |
| | | a) | | Runtime Framework Classes | 131 |
| | | | (1) | ItemContext | 132 |
| | | | (2) | ItemSearcher | 133 |
| | | | | a) Target Type | 133 |
| | | | | b) Filters | 133 |
| | | | | c) Preparing Searches | 133 |
| | | | | d) Find Options | 134 |
| | | | (3) | Item Result Stream ("FindResult") | 135 |
| | | b) | | Runtime Framework in Operation | 136 |
| | | c) | | Common Programming Patterns | 137 |
| | | | (1) | Opening and Closing ItemContext Objects | 137 |
| | | | (2) | Searching for Objects | 138 |
| | | | | (a) Search Options | 139 |
| | | | | (b) FindOne and FindOnly | 140 |
| | | | | (c) Search Shortcuts on ItemContext | 140 |
| | | | | (d) Find by ID or Path | 140 |
| | | | | (e) The GetSearcher Pattern | 141 |
| | | | (3) | Updating the Store | 141 |
| | 6. | Security | | | 143 |
| | 7. | Support for Relationships | | | 144 |
| | | a) | | Base Relationship Types | 144 |
| | | | (1) | Relationship Class | 144 |
| | | | (2) | ItemReference Class | 145 |
| | | | (3) | ItemIDReference Class | 146 |
| | | | (4) | ItemPathReference Class | 147 |
| | | | (5) | RelationshipId Structure | 147 |
| | | | (6) | VirtualRelationshipCollection Class | 148 |
| | | b) | | Generated Relationship Types | 150 |
| | | | (1) | Generated Relationship Types | 150 |
| | | | (2) | RelationshipPrototype Class | 151 |
| | | | (3) | RelationshipPrototypeCollection Class | 151 |
| | | c) | | Relationship Support in the Item Class | 152 |
| | | | (1) | Item Class | 152 |
| | | | (2) | RelationshipCollection Class | 152 |
| | | d) | | Relationship Support in Search Expressions | 153 |
| | | | (1) | Traversing From Items to Relationships | 153 |
| | | | (2) | Traversing From Relationships to Items | 153 |
| | | | (3) | Combining Relationship Traversal | 154 |

-continued

DETAILED DESCRIPTION OF THE INVENTION
TABLE OF CONTENTS

|   |   |   |   |   |   |
|---|---|---|---|---|---|
|   |   | e) | Examples Uses of Relationship Support |   | 155 |
|   |   |   | (1) | Searching for Relationships | 155 |
|   |   |   | (2) | Navigating from a Relationship to the Source and Target Items | 156 |
|   |   |   | (3) | Navigating from Source Items to Relationships | 157 |
|   |   |   | (4) | Creating Relationships (and Items) | 158 |
|   |   |   | (5) | Deleting Relationships (and Items) | 159 |
|   | 8. | "Extending" the Storage Platform API |   |   | 159 |
|   |   | a) | Domain Behaviors |   | 159 |
|   |   | b) | Value-Add Behaviors |   | 161 |
|   |   | c) | Value-Add Behaviors as Service Providers |   | 161 |
|   | 9. | Design Time Framework |   |   | 162 |
|   | 10. | Query Formalism |   |   | 163 |
|   |   | a) | Filter Basics |   | 163 |
|   |   | b) | Type Casts |   | 165 |
|   |   | c) | Filter Syntax |   | 165 |
|   | 11. | Remoting |   |   | 166 |
|   |   | a) | Local/Remote Transparency in the API |   | 166 |
|   |   | b) | Storage Platform Implementation of Remoting |   | 167 |
|   |   | c) | Accessing Non-Storage Platform Stores |   | 167 |
|   |   | d) | Relationship to DFS |   | 167 |
|   |   | e) | Relationship to GXA/Indigo |   | 168 |
|   | 12. | Constraints |   |   | 168 |
|   | 13. | Sharing |   |   | 170 |
|   |   | a) | Representing a Share |   | 170 |
|   |   | b) | Managing Shares |   | 171 |
|   |   | c) | Accessing Shares |   | 171 |
|   |   | d) | Discoverability |   | 171 |
|   | 14. | Semantics of Find |   |   | 172 |
|   | 15. | The Storage Platform Contacts API |   |   | 172 |
|   |   | a) | Overview of System.Storage.Contact |   | 173 |
|   |   | b) | Domain Behaviors |   | 173 |
|   | 16. | Storage Platform File API |   |   | 175 |
|   |   | a) | Introduction |   | 175 |
|   |   |   | (1) | Reflecting an NTFS Volume in the Storage Platform | 175 |
|   |   |   | (2) | Creating Files and Directories in the storage platform Namespace | 175 |
|   |   | b) | File Schema |   | 176 |
|   |   | c) | Overview of System.Storage.Files |   | 176 |
|   |   | d) | Code Examples |   | 176 |
|   |   |   | (1) | Opening a File and Writing to It | 177 |
|   |   |   | (2) | Using Queries | 177 |
|   |   | e) | Domain Behaviors |   | 178 |
| J. |   | CONCLUSION |   |   | 178 |

I. INTRODUCTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

A. Exemplary Computing Environment

Numerous embodiments of the present invention may execute on a computer. FIG. 1 and the following discussion is intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As illustrated in the block diagram of FIG. 2, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

B. Traditional File-Based Storage

In most computer systems today, "files" are units of storable information that may include the hardware/software interface system as well as application programs, data sets, and so forth. In all modern hardware/software interface systems (Windows, Unix, Linux, Mac OS, virtual machine systems, and so forth), files are the basic discrete (storable and retrievable) units of information (e.g., data, programs, and so forth) that can be manipulated by the hardware/software interface system. Groups of files are generally organized in "folders." In Microsoft Windows, the Macintosh OS, and other hardware/software interface systems, a folder is a collection of files that can be retrieved, moved, and otherwise manipulated as single units of information. These folders, in turn, are organized in a tree-based hierarchical arrangement called a "directory" (discussed in more detail herein below). In certain other hardware/software interface systems, such as DOS, z/OS and most Unix-based operating systems, the terms "directory" and/or "folder" are interchangeable, and early Apple computer systems (e.g., the Apple IIe) used the term "catalog" instead of directory; however, as used herein, all of these terms are deemed to be synonymous and interchangeable and are intended to further include all other equivalent terms for and references to hierarchical information storage structures and their folder and file components.

Figure 2A:
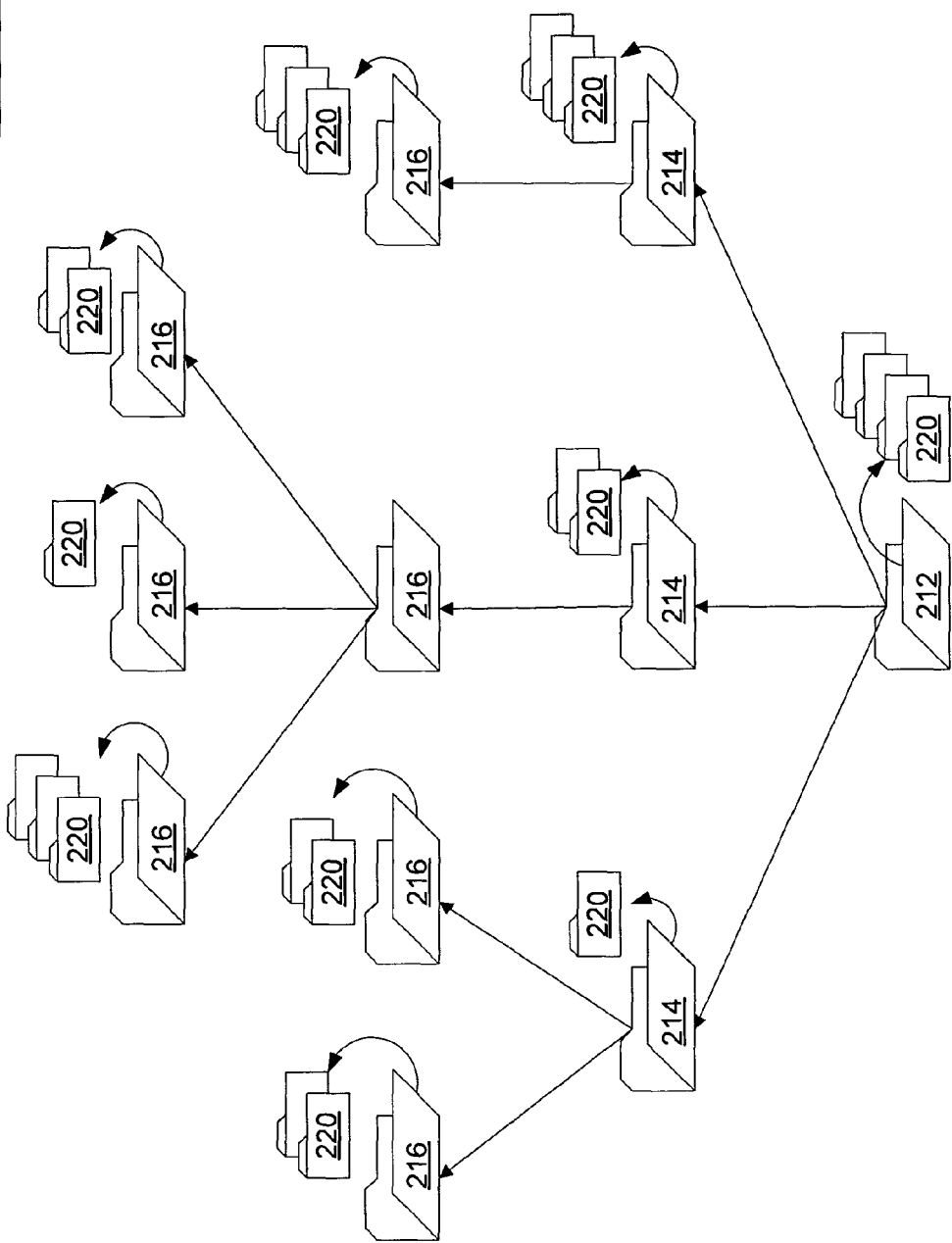
FIG. 2A illustrates the traditional tree-based hierarchical structure for files grouped in folders in a directory in a file-based operating system.

Traditionally, a directory (a.k.a. a directory of folders) is a tree-based hierarchical structure wherein files are grouped into folders and folder, in turn, are arranged according to relative nodal locations that comprise the directory tree. For example, as illustrated in FIG. 2A, a DOS-based file system base folder (or "root directory") 212 may comprise a plurality of folders 214, each of which may further comprise additional folders (as "subfolders" of that particular folder) 216, and each of these may also comprise additional folders 218 ad infinitum. Each of these folders may have one or more files 220 although, at the hardware/software interface system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files-that is, each folder owns its subfolders and files. For example, when a folder is deleted by the hardware/software interface system, that folder's subfolders and files are also deleted (which, in the case of each subfolder, further includes its own subfolders and files recursively). Likewise, each file is generally owned by only one folder and, although a file can be copied and the copy located in a different folder, a copy of a file is itself a distinct and separate unit that has no direct connection to the original (e.g., changes to the original file are not mirrored in the copy file at the hardware/software interface system level). In this regard, files and folders are therefore characteristically "physical" in nature because folders are the treated like physical containers, and files are treated as discrete and separate physical elements inside these containers.

II. A NEW STORAGE PLATFORM FOR ORGANIZING, SEARCHING, AND SHARING DATA

The present invention is directed to a storage platform for organizing, searching, and sharing data. The storage platform of the present invention extends and broadens the data platform beyond the kinds of existing file systems and database systems discussed above, and is designed to be the store for all types of data, including a new form of data called Items.

A. Glossary

As used herein and in the claims, the following terms have the following meanings:

An "Item" is an unit of storable information accessible to a hardware/software interface system that, unlike a simple file, is an object having a basic set of properties that are commonly supported across all objects exposed to an end-user by the hardware/software interface system shell. Items also have properties and relationships that are commonly supported across all Item types including features that allow new properties and relationships to be introduced (and discussed in great detail later herein).

An "operating system" (OS) is a special program that acts as an intermediary between application programs and computer hardware. An operating system comprises, in most cases, a shell and a kernel.

A "hardware/software interface system" is software, or a combination of hardware and software, that serves as the interface between the underlying hardware components of a computer system and applications that execute on the computer system. A hardware/software interface system typically comprises (and, in some embodiments, may solely consist of) an operating system. A hardware/software interface system may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

B. Storage Platform Overview

Figure 3:
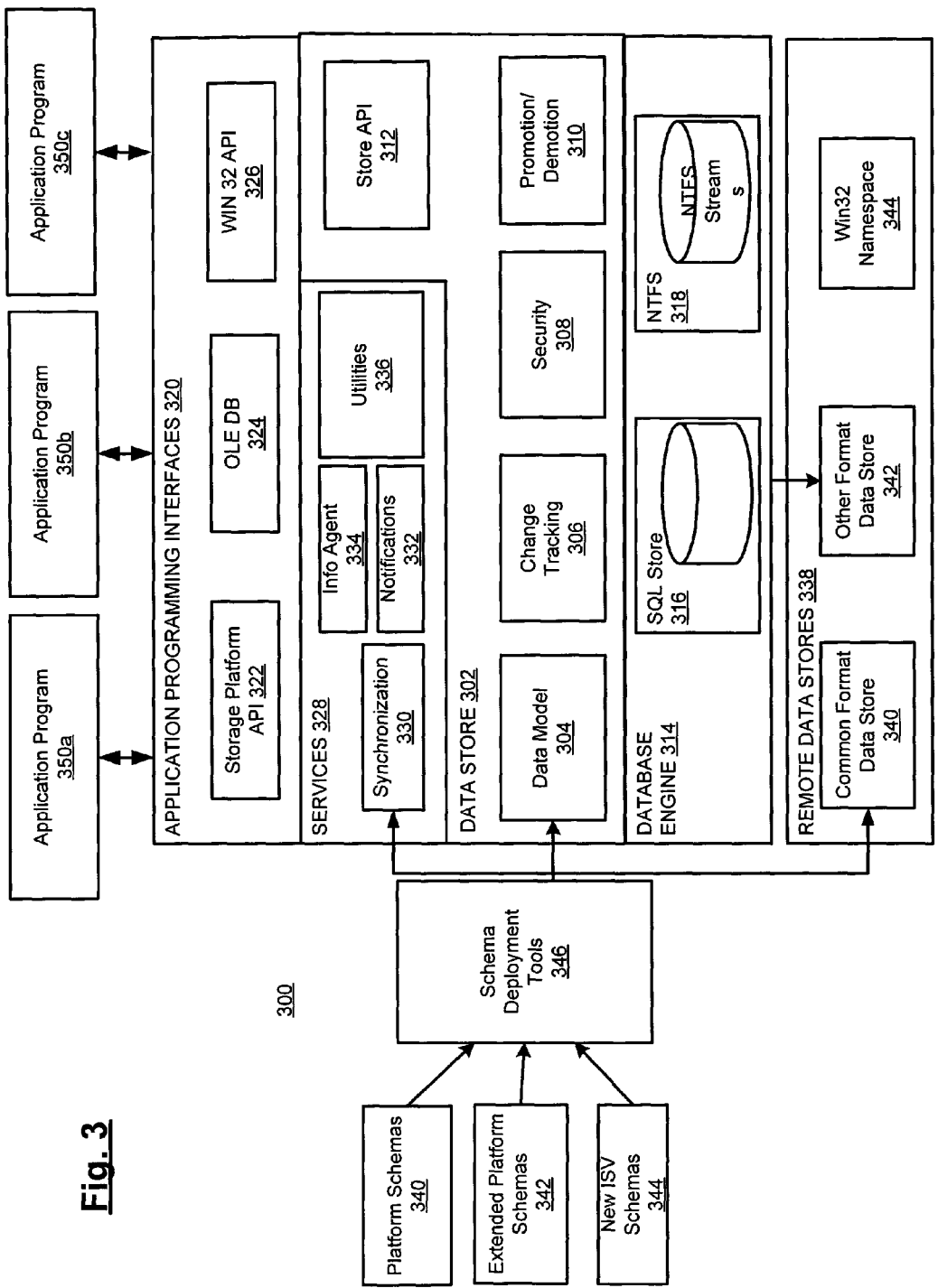
FIG. 3 is a block diagram illustrating a storage platform in accordance with the present invention.

Referring to FIG. 3, a storage platform 300 in accordance with the present invention comprises a data store 302 implemented on a database engine 314. In one embodiment, the database engine comprises a relational database engine with object relational extensions. In one embodiment, the relational database engine 314 comprises the Microsoft SQL Server relational database engine.

The data store 302 implements a data model 304 that supports the organization, searching, sharing, synchronization, and security of data. Specific types of data are described in schemas, such as schemas 340, and the storage platform 300 provides tools 346 for deploying those schemas as well as for extending those schemas, as described more fully below.

A change tracking mechanism 306 implemented within the data store 302 provides the ability track changes to the data store. The data store 302 also provides security capabilities 308 and a promotion/demotion capability 310, both of which are discussed more fully below. The data store 302 also provides a set of application programming interfaces 312 to expose the capabilities of the data store 302 to other storage platform components and application programs (e.g., application programs 350a, 350b, and 350c) that utilize the storage platform.

The storage platform of the present invention still further comprises an application programming interfaces (API) 322, which enables application programs, such as application programs 350a, 350b, and 350c, to access all of the foregoing capabilities of the storage platform and to access the data described in the schemas. The storage platform API 322 may be used by application programs in combination with other APIs, such as the OLE DB API 324 and the Microsoft Windows Win32 API 326.

The storage platform 300 of the present invention may provide a variety of services 328 to application programs, including a synchronization service 330 that facilitates the sharing of data among users or systems. For example, the synchronization service 330 may enable interoperability with other data stores 340 having the same format as data store 302, as well as access to data stores 342 having other formats. The storage platform 300 also provides file system capabilities that allow interoperability of the data store 302 with existing file systems, such as the Windows NTFS files system 318.

In at least some embodiments, the storage platform 320 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform of the present invention enables more efficient application development for consumers, knowledge workers and enterprises. It offers a rich and extensible programming surface area that not only makes available the capabilities inherent in its data model, but also embraces and extends existing file system and database access methods.

In the following description, and in various ones of the figures, the storage platform 300 of the present invention may be referred to as "WinFS." However, use of this name to refer to the storage platform is solely for convenience of description and is not intended to be limiting in any way.

C. The Data Model

The data store 302 of the storage platform 300 of the present invention implements a data model that supports the organization, searching, sharing, synchronization, and security of data that resides in the store. In the data model of the present invention, an "Item" is the fundamental unit of storage information. The data model provides a mechanism for declaring Items and Item extensions and for establishing relationships between Items and for organizing Items in Item Folders and in Categories, as described more fully below.

The data model relies on two primitive mechanisms, Types and Relationships. Types are structures which provide a format which governs the form of an instance of the Type. The format is expressed as an ordered set of Properties. A Property is a name for a value or set of values of a given Type. For example a USPostalAddress type might have the properties Street, City, Zip, State in which Street, City and State are of type String and Zip is of Type Int32. Street may be multi-valued (i.e. a set of values) allowing the address to have more than one value for the Street property. The system defines certain primitive types that can be used in the construction of other types—these include String, Binary, Boolean, Int16, Int32, Int64, Single, Double, Byte, DateTime, Decimal and GUID. The Properties of a Type may be defined using any of the primitive types or (with some restrictions noted below) any of the constructed types. For example a Location Type might be defined that had Properties Coordinate and Address where the Address Property is of Type USPostalAddress as described above. Properties may also be required or optional.

Relationships can be declared and represent a mapping between the sets of instances of two types. For example there may be a Relationship declared between the Person Type and the Location Type called LivesAt which defines which people live at which locations. The Relationship has a name, two endpoints, namely a source endpoint and a target endpoint. Relationships may also have an ordered set of properties. Both the Source and Target endpoints have a Name and a Type. For example the LivesAt Relationship has a Source called Occupant of Type Person and a Target called Dwelling of Type Location and in addition has properties StartDate and EndDate indicating the period of time for which the occupant lived at the dwelling. Note that a Person may live at multiple dwellings over time and a dwelling may have multiple occupants so the most likely place to put the StartDate and EndDate information is on the relationship itself.

Relationships define a mapping between instances that is constrained by the types given as the endpoint types. For example the LivesAt relationship cannot be a relationship in which an Automobile is the Occupant because an Automobile is not a Person.

The data model does allow the definition of a subtype-supertype relationship between types. The subtype-supertype relationship also known as the BaseType relationship is defined in such a way that if Type A is a BaseType for Type B it must be the case that every instance of B is also an instance of A. Another way of expressing this is that every instance that conforms to B must also conform to A. If, for example A has a property Name of Type String while B has a property Age of Type Int16, it follows that any instance of B must have both a Name and an Age. The type hierarchy may be envisaged as an tree with a single supertype at the root. The branches from the root provide the first level subtypes, the branches at this level provide the second level subtypes and so on to the leaf-most subtypes which themselves do not have any subtypes. The tree is not constrained to be of a uniform depth but cannot contain any cycles. A given Type may have zero or many subtypes and zero or one super type. A given instance may conform to at most one type together with that type's super types. To put it another way, for a given instance at any level in the tree the instance may conform to at most one subtype at that level.

A type is said to be Abstract if instances of the type must also be an instance of a subtype of the type.

1. Items

An Item is a unit of storable information that, unlike a simple file, is an object having a basic set of properties that are commonly supported across all objects exposed to an end-user or application program by the storage platform. Items also have properties and relationships that are commonly supported across all Item types including features that allow new properties and relationships to be introduced, as discussed below.

Items are the objects for common operations such as copy, delete, move, open, print, backup, restore, replicate, and so forth. Items are the units that can be stored and retrieved, and all forms of storable information manipulated by the storage platform exist as Items, properties of Items, or Relationships between Items, each of which is discussed in greater detail herein below.

Items are intended to represent real-world and readily-understandable units of data like Contacts, People, Services, Locations, Documents (of all various sorts), and so on. FIG. 5A is a block diagram illustrating the structure of an Item. The unqualified name of the Item is "Location". The qualified name of the Item is "Core.Location" which indicates that this Item structure is defined as a specific type of Item in the Core Schema. (The Core Schema is discussed in more detail later herein.)

The Location Item has a plurality of properties including EAddresses, MetropolitanRegion, Neighborhood, and PostalAddresses. The specific type of property for each is indicated immediately following the property name and is separated from the property name by a colon (":"). To the right of the type name, the number of values permitted for that property type is indicated between brackets ("[ ]") wherein an asterisk ("*") to the right of the colon (":") indicates an unspecified and/or unlimited number ("many"). A "1" to the right of the colon indicates that there can be at most one value. A zero ("0") to the left of the colon indicates that the property is optional (there may be no value at all). A "1" to the left of the colon indicates that there must be at least one value (the property is required). Neighborhood and MetropolitanRegion are both of type "nvarchar" (or equivalent) which is a predefined data type or "simple type" (and denoted herein by the lack of capitalization). EAddresses and PostalAddresses, however, are properties of defined types or "complex types" (as denoted herein by capitalization) of types EAddress and PostalAddress respectively. A complex type is type that is derived from one or more simple data types and/or from other complex types. The complex types for the properties of an Item also constitute "nested elements" since the details of the complex type are nested into the immediate Item to define its properties, and the information pertaining to these complex types is maintained with the Item that has these properties (within the Item's boundary, as discussed later herein). These concepts of typing are well known and readily appreciated by those of skill in the art.

FIG. 5B is a block diagram illustrating the complex property types PostalAddress and EAddress. The PostalAddress property type defines that an Item of property type PostalAddress can be expected to have zero or one City values, zero or one CountryCode values, zero or one MailStop values, and any number (zero to many) of PostalAddressTypes, and so on and so forth. In this way, the shape of the data for a particular property in an Item is hereby defined. The EAddress property type is similarly defined as shown. Although optionally used herein this Application, another way to represent the complex types in the Location Item is to draw the Item with the individual properties of each complex type listed therein. FIG. 5C is a block diagram illustrating the Location Item wherein its complex types are further described. However, it should be understood that this alternative representation of the Location Item in this FIG. 5C is for the exact same Item illustrated in FIG. 5A. The storage platform of the present invention also allows subtyping whereby one property type can be a subtype of another (where the one property type inherits the properties of another, parent property type).

Figure 6B:
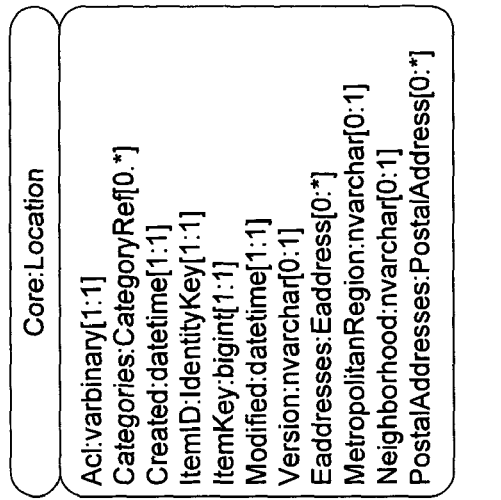
FIG. 6B is a block diagram illustrating the subtype Item of FIG. 6A wherein its inherited types are explicitly listed (in addition to its immediate properties)
Figure 6A:
FIG. 6A illustrates an Item as a subtype of the Item found in the Base Schema.
Figure 6A:
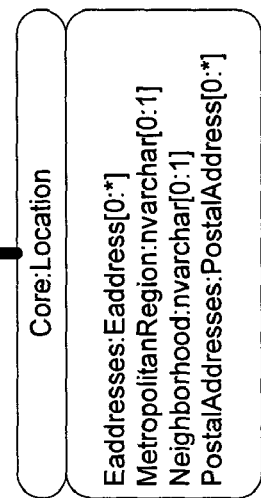

Similar to but distinct from properties and their property types, Items inherently represent their own Item Types that can also be the subject of subtyping. In other words, the storage platform in several embodiments of the present invention allows an Item to be a subtype of another Item (whereby the one Item inherits the properties of the other, parent Item). Moreover, for various embodiments of the present invention, every Item is a subtype of the "Item" Item type which is the first and foundational Item type found in the Base Schema. (The Base Schema will also be discussed in detail later herein.) FIG. 6A illustrates an Item, the Location Item in this Instance, as being a subtype of the Item Item type found in the Base Schema. In this drawing, the arrow indicates that the Location Item (like all other Items) is a subtype of the Item Item type. The Item Item type, as the foundational Item from which all other Items are derived, has a number of important properties such as ItemId and various timestamps, and thereby defines the standard properties of all Items in an operating system. In the present figure, these properties of the Item Item type are inherited by Location and thereby become properties of Location.

Another way to represent the properties in the Location Item inherited from the Item Item type is to draw Location with the individual properties of each property type from the parent Item listed therein. FIG. 6B is a block diagram illustrating the Location Item wherein its inherited types described in addition to its immediate properties. It should be noted and understood that this Item is the same Item illustrated in FIG. 5A, although in the present figure Location is illustrated with all of its properties, both immediate—shown in both this figure and FIG. 5A—and inherited—shown in this figure but not FIG. 5A (whereas in FIG. 5A these properties are referenced by showing with an arrow that the Location Item is a subtype of the Item Item type).

Items are stand-alone objects; thus, if you delete an Item, all of the Items immediate and inherited properties are also deleted. Similarly, when retrieving an Item, what is received is the Item and all of its immediate and inherited properties (including the information pertaining to its complex property types). Certain embodiments of the present invention may enable one to request a subset of properties when retrieving a specific Item; however, the default for many such embodiments is to provide the Item with all of its immediate and inherited properties when retrieved. Moreover, the properties of Items can also be extended by adding new properties to the existing properties of that Item's type. These "extensions" are thereafter bona fide properties of the Item and subtypes of that Item type may automatically include the extension properties.

The "boundary" of the Item is represented by its properties (including complex property types, extensions, and so forth). An Item's boundary also represents the limit of an operation performed on an Item such as copy, delete, move, create, and so on. For example, in several embodiments of the present invention, when an Item is copied, everything within that Item's boundary is also copied. For each Item, the boundary encompasses the following:

The Item Type of the Item and, if the Item is a subtype of another Item (as is the case in several embodiments of the present invention where all Items are derived from a single Item and Item Type in the Base Schema), any applicable subtype information (that is, information pertaining to the parent Item Type). If the original Item being copied is a subtype of another Item, the copy may also be a subtype of that same Item.

The Item's complex-type properties and extensions, if any. If the original Item has properties of complex types (native or extended), the copy may also have the same complex types.

The Item's records on "ownership relationships", that is, the Item's own list of what other Items (the "Target Items") are owned by the present Item (the "Owning Item"). This is particularly relevant in regard to Item Folders, discussed more fully below, and the rule stated below that all Items must belong to at least one Item Folder. Moreover, in regard to embedded items-discussed more fully below-an embedded item is considered to be part of the Item in which it is embedded for operations such as copy, delete, and the like.

2. Item Identification

Items are uniquely identified within the global items space with an ItemID. The Base.Item type defines a field ItemID of type GUID that stores the identity for the Item. An Item must have exactly one identity in the data store 302.

a) Item References

An item reference is a data structure that contains information to locate and identify an Item. In the data model, an abstract type is defined named ItemReference from which all item reference types derive. The ItemReference type defines a virtual method named Resolve. The Resolve method resolves the ItemReference and returns an Item. This method is overridden by the concrete subtypes of ItemReference, which implement a function that retrieves an Item given a reference. The Resolve method is invoked as part of the storage platform API 322.

(1) ItemIDReference

ItemIDReference is a subtype of ItemReference. It defines a Locator and an ItemID field. The Locator field names (i.e. identifies) an item domain. It is processed by a locator resolution method that can resolve the value of the Locator to an item domain. The ItemID field is of type ItemID (2) ItemPathReference ItemPathReference is a specialization of ItemReference that defines a Locator and a Path field. The Locator field identifies an item domain. It is processed by a locator resolution method that can resolve the value of the Locator to an item domain. The Path field contains a (relative) path in the storage platform namespace rooted at the item domain provided by the Locator.

This type of reference cannot be used in a set operation. The reference must generally be resolved through a path resolution process. The Resolve method of the storage platform API 322 provides this functionality.

b) Reference Type Hierarchy

Figure 11:
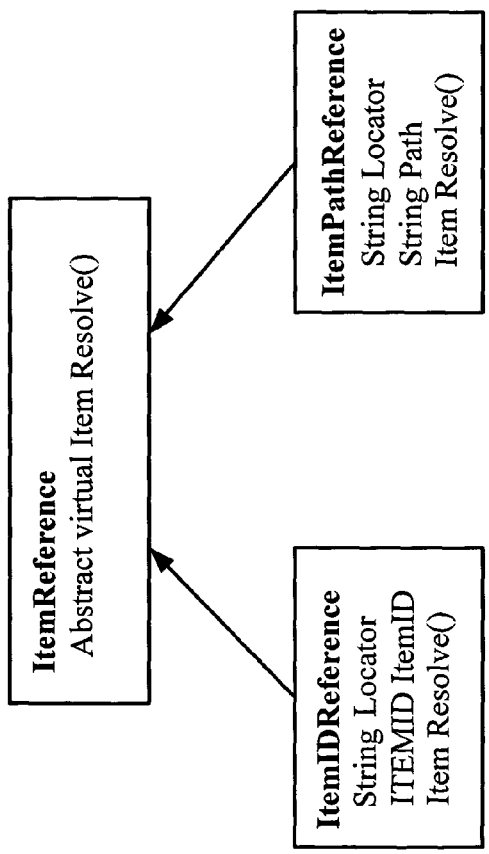
FIG. 11 is a diagram illustrating a reference type hierarchy of the data model of the storage platform, in accordance with the present invention.

The reference forms discussed above are represented through the reference type hierarchy illustrated in FIG. 11. Additional reference types that inherit from these types can be defined in the schemas. They can be used in a relationship declaration as type of the target field.

3. Item Folders and Categories

As discussed more fully below, groups of Items can are organized into special Items called Item Folders (which are not to be confused with file folders). Unlike in most file systems, however, an Item can belong to more than one Item Folder, such that when an Item is accessed in one Item Folder and revised, this revised Item can then be accessed directly from another Item folder. In essence, although access to an Item may occur from different Item Folders, what is actually being accessed is in fact the very same Item. However, an Item Folder does not necessarily own all of its member Items, or may simply co-own Items in conjunction with other folders, such that the deletion of an Item Folder does not necessarily result in the deletion of the Item. Nevertheless, in several embodiments of the present invention, an Item must belong to at least one Item Folder so that if the sole Item Folder for a particular Item is deleted then, for some embodiments, the Item is automatically deleted or, in alternative embodiments, the Item automatically becomes a member of a default Item Folder (e.g., a "Trash Can" Item Folder conceptually similar to similarly-named folders used in various file-and-folder-based systems).

As also discussed more fully below, Items may also belong to Categories based on common described characteristic such as (a) an Item Type (or Types), (b) a specific immediate or inherited property (or properties), or (c) a specific value (or values) corresponding to an Item property. For example, a Item comprising specific properties for personal contact information might automatically belong to a Contact Category, and any Item having contact information properties would likewise automatically belong to this Category. Likewise, any Item having a location property with a value of "New York City" might automatically belong to a NewYorkCity Category.

Categories are conceptually different form Item Folders in that, whereas Item Folders may comprise Items that are not interrelated (i.e., without a common described characteristic), each Item in a Category has a common type, property, or value (a "commonality") that is described for that Category, and it is this commonality that forms the basis for its relationship to and among the other Items in the Category. Moreover, whereas an Item's membership in a particular Folder is not compulsory based on any particular aspect of that Item, for certain embodiments all Items having a commonality categorically related to a Category might automatically become a member of the Category at the hardware/software interface system level. Conceptually, Categories can also be thought of as virtual Item Folders whose membership is based on the results of a specific query (such as in the context of a database), and Items that meet the conditions of this query (defined by the commonalities of the Category) would thus comprise the Category's membership.

Figure 4:
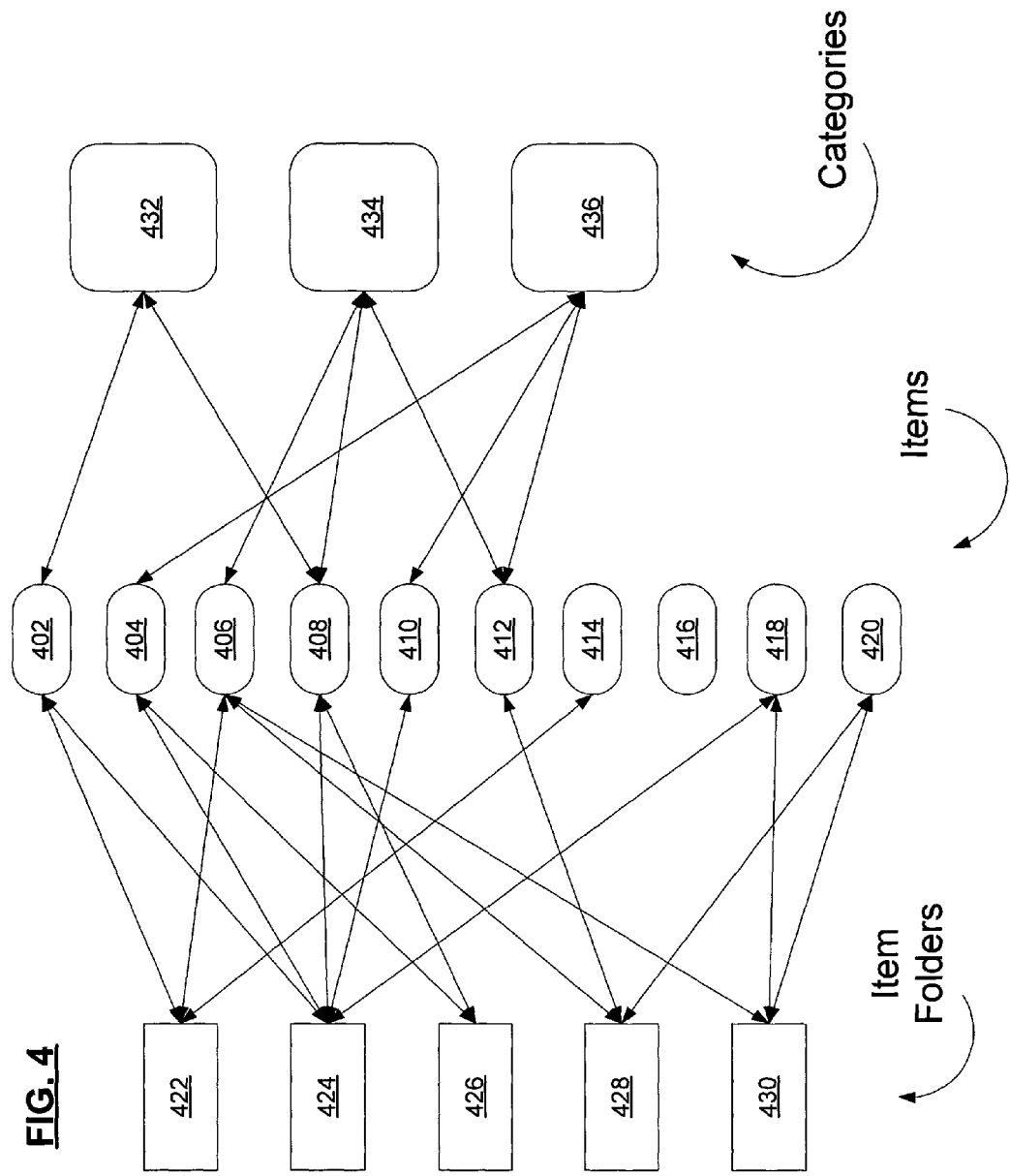
FIG. 4 illustrates the structural relationship between Items, Item Folders, and Categories in various embodiments of the present invention.

FIG. 4 illustrates the structural relationship between Items, Item Folders, and Categories in various embodiments of the present invention. A plurality of Items 402, 404, 406, 408, 410, 412, 414, 416, 418, and 420 are members of various Item Folders 422, 424, 426, 428, and 430. Some Items may belong to more than one Item Folder, e.g., Item 402 belong to Item Folders 422 and 424. Some Items, e.g., Item 402, 404, 406, 408, 410, and 412 are also members of one or more Categories 432, 434, and 436, while other times, e.g., Items 414, 416,

418, and 420, may belong to no Categories (although this is largely unlikely in certain embodiments where the possession of any property automatically implies membership in a Category, and thus an Item would have to be completely featureless in order not to be a member of any category in such an embodiment). In contrast to the hierarchical structure of folders, both Categories and Item Folders have structures more akin to directed graphs as shown. In any event, the Items, Item Folders, and Categories are all Items (albeit of different Item Types).

In contrast to files, folders, and directories, the Items, Item Folders, and Categories of the present invention are not characteristically "physical" in nature because they do not have conceptual equivalents of physical containers, and therefore Items may exist in more than one such location. The ability for Items to exist in more than one Item Folder location as well as being organized into Categories provides an enhanced and enriched degree of data manipulation and storage structure capabilities at the hardware/software interface level, beyond that currently available in the art.

4. Schemas a) Base Schema

To provide a universal foundation for the creation and use of Items, various embodiments of the storage platform of the present invention comprise a Base Schema that establishes a conceptual framework for creating and organizing Items and properties. The Base Schema defines certain special types of Items and properties, and the features of these special foundational types from which subtypes can be further derived. The use of this Base Schema allows a programmer to conceptually distinguish Items (and their respective types) from properties (and their respective types). Moreover, the Base Schema sets forth the foundational set of properties that all Items may possess as all Items (and their corresponding Item Types) are derived from this foundational Item in the Base Schema (and its corresponding Item Type).

Figure 7:
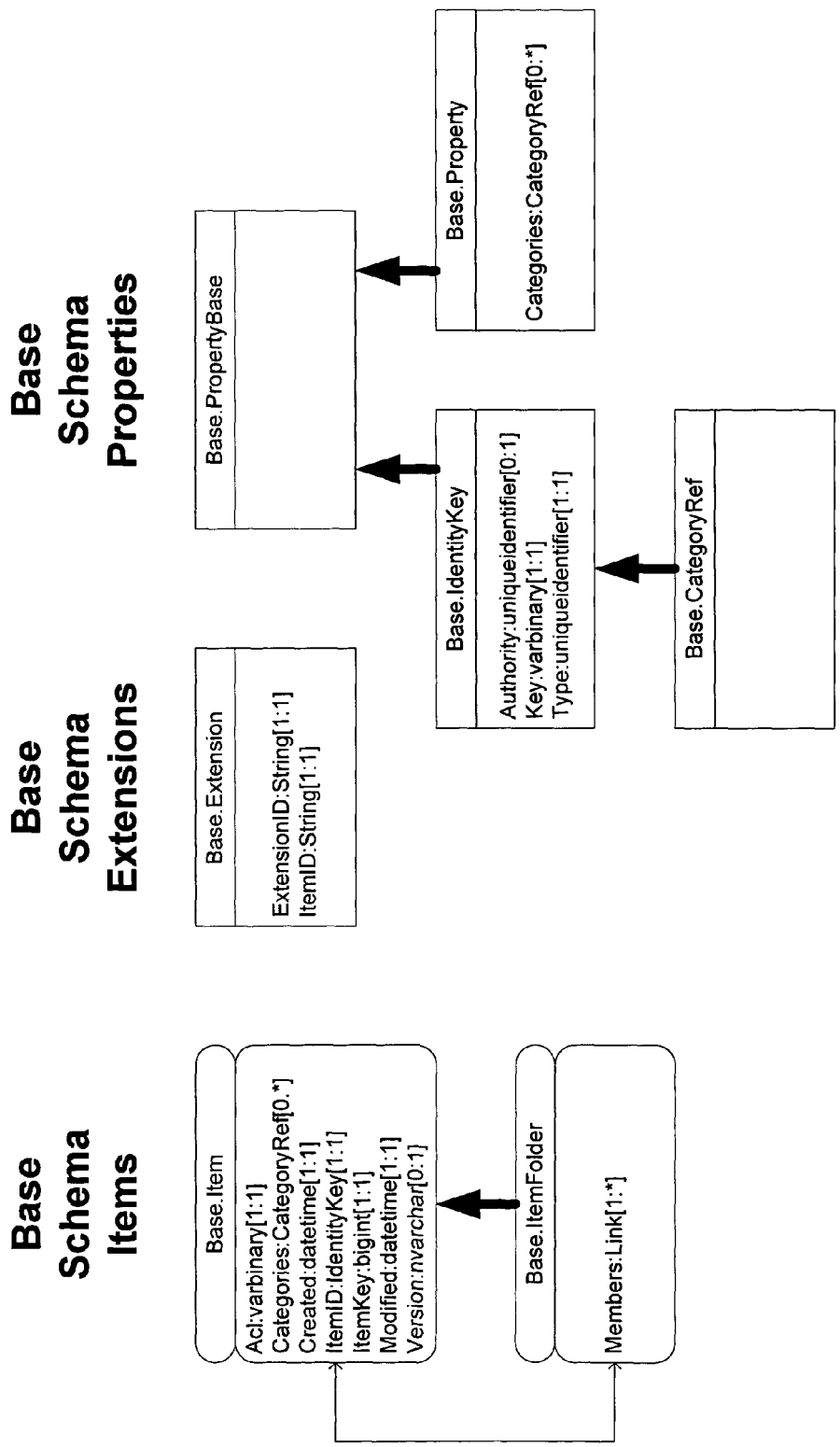
FIG. 7 is a block diagram illustrating the Base Schema including its two top-level class types, Item and PropertyBase, and the additional Base Schema types derived therefrom.

As illustrated in FIG. 7, and in regard to several embodiments of the present invention, the Base Schema defines three top-level types: Item, Extension, and PropertyBase. As shown, the Item type is defined by the properties of this foundational "Item" Item type. In contrast, the top level property type "PropertyBase" has no predefined properties and is merely the anchor from which all other property types are derived and through which all derived property types are interrelated (being commonly derived from the single property type). The Extension type properties define which Item the extension extends as well as identification to distinguish one extension from another as an Item may have multiple extensions.

ItemFolder is a subtype of the Item Item type that, in addition to the properties inherited from Item, features a Relationship for establishing links to its members (if any), whereas both IdentityKey and Property are subtypes of PropertyBase. CategoryRef, in turn, is a subtype of IdentityKey.

b) Core Schema

Figure 8A:
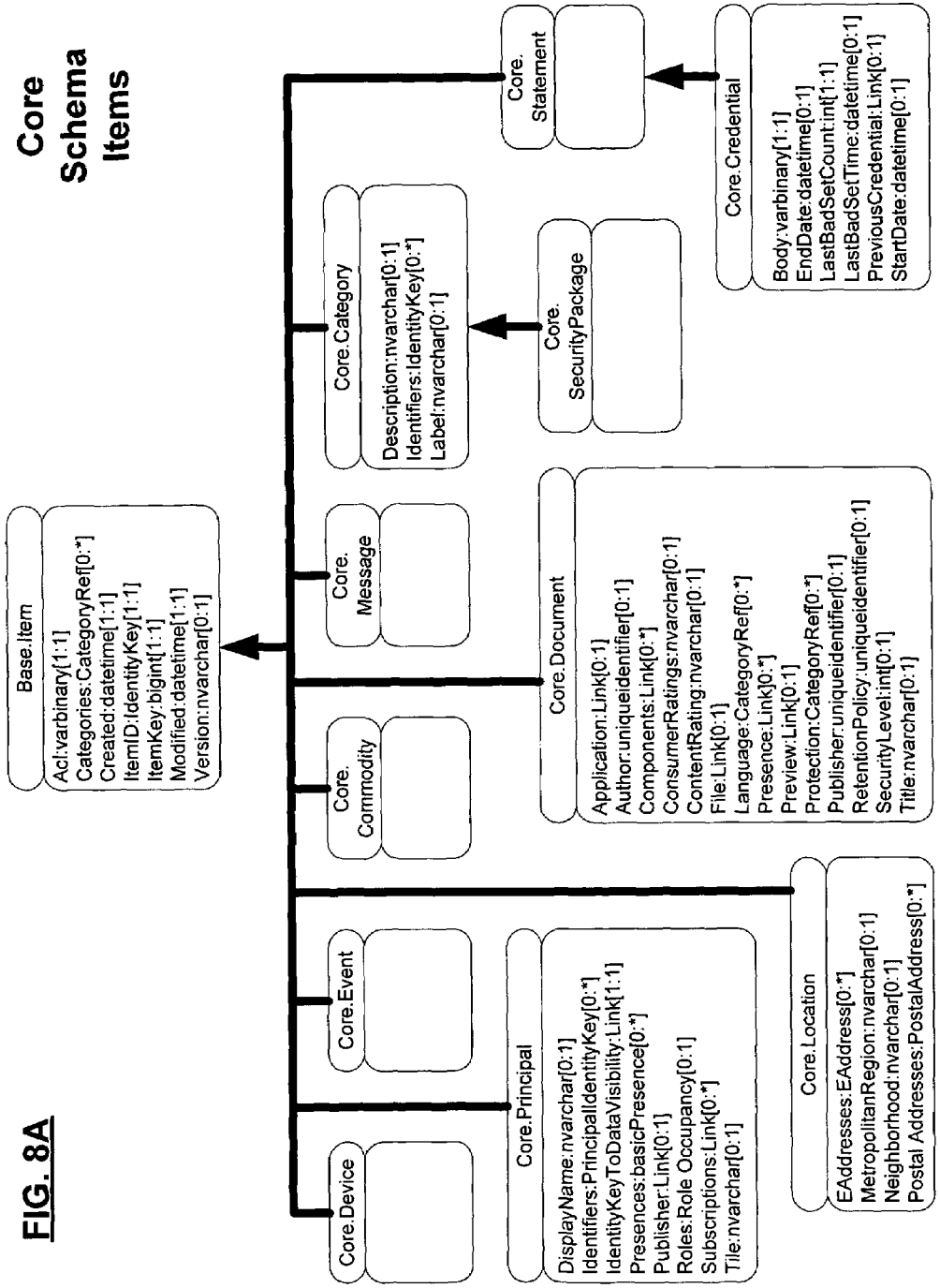
FIG. 8A is a block diagram illustrating Items in the Core Schema.

Various embodiments of the storage platform of the present invention further comprise a Core Schema that provides a conceptual framework for top-level Items type structures. FIG. 8A is a block diagram illustrating Items in the Core Schema, and FIG. 8B is a block diagram illustrating the property types in the Core Schema. The distinction made between files with different extensions (*.com, *.exe, *.bat, *.sys, etc.) and other such criteria in file-and-folder-based systems is analogous to the function of the Core Schema. In the Item-based hardware/software interface system, the Core Schema defines a set of core Item types that, directly (by Item type) or indirectly (by Item subtype), characterize all Items into one or more Core Schema Item types which the Item-based hardware/software interface system understands and can directly process in a predetermined and predictable way. The predefined Item types reflect the most common Items in the Item-based hardware/software interface system and thus a level of efficiency is gained by the Item-based hardware/software interface system understanding these predefined Item types that comprise the Core Schema.

In certain embodiments, the Core Schema is not extendable—that is, no additional Item types can be subtyped directly from the Item type in the Base Schema except for the specific predefined derived Item types that are part of the Core Schema. By preventing extensions to the Core Schema (that is, by preventing the addition of new Items to the Core Schema), the storage platform mandates the use of the Core Schema Item types since every subsequent Item type is necessarily a subtype of a Core Schema Item type. This structure enables a reasonable degree of flexibility in defining additional Item types while also preserving the benefits of having a predefined set of core Item types.

For various embodiments of the present invention, and in reference to FIG. 8A, the specific Item types supported by the Core Schema may include one or more of the following:

Categories: Items of this Item Type (and subtypes derived therefrom) represent valid Categories in the Item-based hardware/software interface system.

Commodities: Items that are identifiable things of value.

Devices: Items having a logical structure that supports information processing capabilities.

Documents: Items with content that is not interpreted by the Item-based hardware/software interface system but is instead interpreted by an application program corresponding to the document type.

Events: Items that record certain occurrences in the environment.

Locations: Items representing physical locations (e.g., geographical locations).

Messages: Items of communication between two or more principals (defined below).

Principals: Items having at least one definitively provable identity aside from an ItemId (e.g., the identification of a person, organization, group, household, authority, service, etc.).

Statements: Items having special information regarding the environment including, without limitation, policies, subscriptions, credentials, and so forth.

Likewise, and in reference to FIG. 8B, the specific property types supported by the Core Schema may include one or more of the following:

Certificates (derived from the foundational PropertyBase type in the Base Schema)

Principal Identity Keys (derived from the IdentityKey type in the Base Schema)

Postal Address (derived from the Property type in the Base Schema)

Rich Text (derived from the Property type in the Base Schema)

EAddress (derived from the Property type in the Base Schema)

IdentitySecurityPackage (derived from the Relationship type in the Base Schema)

RoleOccupancy (derived from the Relationship type in the Base Schema)

BasicPresence (derived from the Relationship type in the Base Schema)

These Items and Properties are further described by their respective properties set forth in FIGS. 8A and 8B.

5. Relationships

Relationships are binary relationships where one Item is designated as source and the other Item as target. The source Item and the target Item are related by the relationship. The source Item generally controls the life-time of the relationship. That is, when the source Item is deleted, the relationship between the Items is also deleted.

Figure 12:
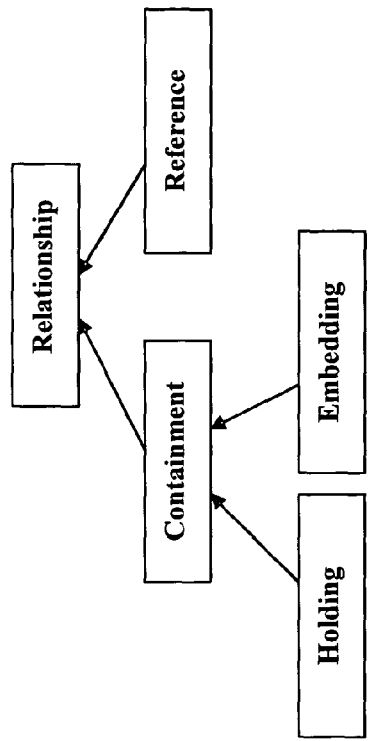
FIG. 12 is a diagram illustrating how relationships are classified, in accordance with an embodiment of the present invention.

Relationships are classified into: Containment and Reference relationships. The containment relationships control the life-time of the target Items, while the reference relationships do not provide any life-time management semantics. FIG. 12 illustrates the manner in which relationships are classified.

The Containment relationship types are further classified into Holding and Embedding relationships. When all holding relationships to an Item are removed, the Item is deleted. A holding relationship controls the life-time of the target through a reference counting mechanism. The embedding relationships enable modeling of compound Items and can be thought of as exclusive holding relationships. An Item can be a target of one or more holding relationships; but an Item can be target of exactly one embedding relationship. An Item that is a target of an embedding relationship can not be a target of any other holding or embedding relationships.

Reference relationships do not control the lifetime of the target Item. They may be dangling—the target Item may not exist. Reference relationships can be used to model references to Items anywhere in the global Item name space (i.e. including remote data stores).

Fetching an Item does not automatically fetch its relationships. Applications must explicitly request the relationships of an Item. In addition, modifying a relationship does not modify the source or the target Item; similarly, adding a relationship does not affect the source/target Item.

a) Relationship Declaration

The explicit relationship types are defined with the following elements:

A relationship name is specified in the Name attribute.

Relationship type, one of the following: Holding, Embedding, Reference. This is specified in the Type attribute.

Source and target endpoints. Each endpoint specifies a name and the type of the referenced Item.

The source endpoint field is generally of type ItemID (not declared) and it must reference an Item in the same data store as the relationship instance.

For Holding and Embedding relationships, the target endpoint field must be of type ItemIDReference and it must reference an Item in the same store as the relationship instance. For Reference relationships the target endpoint can be of any ItemReference type and can reference Items in other storage platform data stores.

Optionally one or more fields of a scalar or PropertyBase type can be declared. These fields may contain data associated with the relationship.

Relationship instances are stored in a global relationships table.

Every relationship instance is uniquely identified by the combination (source ItemID, relationship ID). The relationship ID is unique within a given source ItemID for all relationships sourced in a given Item regardless of their type.

The source Item is the owner of the relationship. While an Item designated as owner controls the life time of the relationship, the relationship itself is separate from the Items it relates. The storage platform API 322 provides mechanisms for exposing relationships associated with an Item.

Here is an example of a relationship declaration:

```
<Relationship Name="Employment" BaseType="Reference" >
    <Source Name="Employee" ItemType="Contact.Person"/>
    <Target Name="Employer" ItemType="Contact.Organization"
        ReferenceType="ItemIDReference" />
    <Property Name="StartDate" Type="the storage
        platformTypes.DateTime" />
    <Property Name="EndDate" Type="the storage
        platformTypes.DateTime" />
    <Property Name="Office" Type="the storage
        platformTypes.DateTime" />
</Relationship>
```

This is an example of a Reference relationship. The relationship can not be created if the person Item that is referenced by the source reference does not exist. Also, if the person Item is deleted, the relationship instances between the person and organization are deleted. However, if the Organization Item is deleted, the relationship is not deleted and it is dangling.

b) Holding Relationship

Holding relationships are used to model reference count based life-time management of the target Items.

An Item can be a source endpoint for zero or more relationships to Items. An Item that is not an embedded Item can be a target of in one or more holding relationships.

The target endpoint reference type must be ItemIDReference and it must reference an Item in the same store as the relationship instance.

Holding relationships enforce lifetime management of the target endpoint. The creation of a holding relationship instance and the Item that it is targeting is an atomic operation. Additional holding relationship instances can be created that are targeting the same Item. When the last holding relationship instance with a given Item as target endpoint is deleted the target Item is also deleted.

The types of the endpoint Items specified in the relationship declaration will generally be enforced when an instance of the relationship is created. The types of the endpoint Items can not be changed after the relationship is established.

Holding relationships play a key role in forming the Item namespace. They contain the "Name" property that defines the name of the target Item relative to the source Item. This relative name is unique for all the holding relationships sourced from a given Item. The ordered list of this relative names starting from the root Item to a given Item forms the full name to the Item.

The holding relationships form a directed acyclic graph (DAG). When a holding relationship is created the system ensures that a cycle is not created, thus ensuring that the Item namespace forms a DAG.

While the holding relationship controls the life time of the target Item, it does not control the operational consistency of the target endpoint Item. The target Item is operationally independent from the Item that owns it through a holding relationship. Copy, Move, Backup and other operations on an Item that is a source of a holding relationship do not affect the Item that is a target of the same relationship—for example that is, backing up a Folder Item does not automatically backup all the Items in the folder (targets of the FolderMember relationship).

The following is an example of a holding relationship:

```
<Relationship Name="FolderMembers" BaseType="Holding" >
    <Source Name="Folder" ItemType="Base.Folder"/>
    <Target Name="Item" ItemType="Base.Item"
        ReferenceType="ItemIDReference" />
</Relationship>
```

The FolderMembers relationship enables the concept of a Folder as a generic collection of Items.

c) Embedding Relationships

Embedding relationships model the concept of exclusive control of the lifetime of the target Item. They enable the concept of compound Items.

The creation of an embedding relationship instance and the Item that it is targeting is an atomic operation. An Item can be a source of zero or more embedding relationship. However, an Item can be a target of one and only one embedding relationship. An Item that is a target of an embedding relationship can not be a target of a holding relationship.

The target endpoint reference type must be ItemIDReference and it must reference an Item in the same data store as the relationship instance.

The types of the endpoint Items specified in the relationship declaration will generally be enforced when an instance of the relationship is created. The types of the endpoint Items can not be changed after the relationship is established.

Embedding relationships control the operational consistency of the target endpoint. For example the operation of serializing of an Item may include serialization of all the embedding relationships that source from that Item as well as all of their targets; copying an Item also copies all its embedded Items.

The following is an example declaration:

```
<Relationship Name="ArchiveMembers" BaseType="Embedding" >
    <Source Name="Archive" ItemType="Zip.Archive" />
    <Target Name="Member" ItemType="Base.Item "
        ReferenceType="ItemIDReference" />
    <Property Name="ZipSize" Type="the storage
        platformTypes.bigint" />
    <Property Name="SizeReduction" Type="the storage
        platformTypes.float" />
</Relationship>
``` d) Reference Relationships

The reference relationship does not control life time of the Item it references. Even more, the reference relationships do not guarantee the existence of the target, nor do they guarantee the type of the target as specified in the relationship declaration. This means that the reference relationships can be dangling. Also, the reference relationship can reference Items in other data stores. Reference relationships can be thought of as a concept similar to links in web pages.

An example of reference relationship declaration is the following:

```
<Relationship Name="DocumentAuthor" BaseType="Reference" >
    <Source ItemType="Document" ItemType="Base.Document"/>
    <Target ItemType="Author" ItemType="Base.Author"
        ReferenceType="ItemIDReference" />
```

-continued

```
    <Property Type="Role" Type="Core.CategoryRef" />
    <Property Type="DisplayName" Type="the storage
        platformTypes.nvarchar(256)" />
</Relationship>
```

Any reference type is allowed in the target endpoint. The Items that participate in a reference relationship can be of any Item type.

Reference relationships are used to model most non-lifetime management relationships between Items. Since the existence of the target is not enforced, the reference relationship is convenient to model loosely-coupled relationships. The reference relationship can be used to target Items in other data stores including stores on other computers.

e) Rules and Constraints

The following additional rules and constraints apply for relationships:

1. An Item must be a target of (exactly one embedding relationship) or (one or more holding relationships). One exception is the root Item. An Item can be a target of zero or more reference relationships
2. An Item that is a target of embedding relationship can not be source of holding relationships. It can be a source of reference relationships.
3. An Item can not be a source of holding relationship if it is promoted from file. It can be a source of embedding relationships and reference relationships.
4. An Item can that is promoted from a file can not be a target of an embedding relationship.

f) Ordering of Relationships

In at least one embodiment, the storage platform of the present invention supports ordering of relationships. The ordering is achieved through a property named "Order" in the base relationship definition. There is no uniqueness constraint on the Order field. The order of the relationships with the same "order" property value is not guaranteed, however it is guaranteed that they may be ordered after relationships with lower "order" value and before relationships with higher "order" field value.

Applications can get the relationships in the default order by ordering on the combination (SourceItemID, RelationshipID, Order). All relationship instances sourced from a given Item are ordered as a single collection regardless of the type of the relationships in the collection. This however guarantees that all relationships of a given type (e.g., FolderMembers) are an ordered subset of the relationship collection for a given Item.

The data store API 312 for manipulating relationships implement a set of operations that support ordering of relationships. The following terms are introduced to help explain the operations:

RelFirst is the first relationship in the ordered collection with order value OrdFirst;

RelLast is the last relationship in the ordered collection with order value OrdLast;

RelX is a given relationship in the collection with order value OrdX;

RelPrev is a closest relationship in the collection to RelX with order value OrdPrev smaller then OrdX; and RelNext is a closest relationship in the collection to RelX with order value OrdNext greater then OrdX.

InsertBeforeFirst(SourceItemID, Relationship)

Inserts the relationship as the first relationship in the collection. The value of the "Order" property of the new relationship may be smaller then OrdFirst.

InsertAfterLast(SourceItemID, Relationship)

Inserts the relationship as the last relationship in the collection. The value of the "Order" property of the new relationship may be greater then OrdLast.

InsertAt(SourceItemID, ord, Relationship)

Inserts a relationship with the specified value for the "Order" property.

InsertBefore(SourceItemID, ord, Relationship)

Inserts the relationship before the relationship with the given order value. The new relationship may be assigned "Order" value that is between OrdPrev and ord, noninclusive.

InsertAfter(SourceItemID, ord, Relationship)

Inserts the relationship after the relationship with the given order value. The new relationship may be assigned "Order" value that is between ord and OrdNext, non-inclusive.

MoveBefore(SourceItemID, ord, RelationshipID)

Moves the relationship with given relationship ID before the relationship with specified "Order" value. The relationship may be assigned a new "Order" value that is between OrdPrev and ord, non-inclusive.

MoveAfter(SourceItemID, ord, RelationshipID)

Moves the relationship with given relationship ID after the relationship with specified "Order" value. The relationship may be assigned a new order value that is between ord and OrdNext, non-inclusive.

As previously mentioned, every Item must be a member of an Item Folder. In terms of Relationships, every Item must have a relationship with an Item Folder. In several embodiments of the present invention, certain relationships are represented by Relationships existing between the Items.

As implemented for various embodiments of the present invention, a Relationship provides a directed binary relationship that is "extended" by one Item (the source) to another Item (the target). A Relationship is owned by the source Item (the Item that extended it), and thus the Relationship is removed if the source is removed (e.g., the Relationship is deleted when the source Item is deleted). Moreover, in certain instances, a Relationship may share ownership of (co-own) the target Item, and such ownership might be reflected in the IsOwned property (or its equivalent) of the Relationship (as shown in FIG. 7 for the Relationship property type). In these embodiments, creation of a new IsOwned Relationship automatically increments a reference count on the target Item, and deletion of such a Relationship may decrement the reference count on the target Item. For these specific embodiments, Items continue to exist if they have a reference count greater than zero, and are automatically deleted if and when the count reaches zero. Again, an Item Folder is an Item that has (or is capable of having) a set of Relationships to other Items, these other Items comprising the membership of the Item Folder. Other actual implementations of Relationships are possible and anticipated by the present invention to achieve the functionality described herein.

Regardless of actual implementation, a Relationship is a selectable connection from one object to another. The ability for an Item to belong to more than one Item Folder, as well as to one or more Categories, and whether these Items, Folders, and Categories are public or private, is determined by the meanings given to the existence (or lack thereof) in an Item-based structure. These logical Relationships are the meanings assigned to a set of Relationships, regardless of physical implementation, which are specifically employed to achieve the functionality described herein. Logical Relationships are established between the Item and its Item Folder(s) or Categories (and vice versa) because, in essence, Item Folders and Categories are each a special type of Item. Consequently, Item Folders and Categories can be acted upon the same way as any other Item—copied, added to an email message, embedded in a document, and so and so forth without limitation—and Item Folders and Categories can be serialized and de-serialized (imported and exported) using the same mechanisms as for other Items. (For example, in XML all Items might have a serialization format, and this format applies equally to Item Folders, Categories, and Items.)

The aforementioned Relationships, which represent the relationship between an Item and it Item Folder(s) can logically extend from the Item to the Item Folder, from the Item Folder to the Item, or both. A Relationship that logically extends from an Item to an Item Folder denotes that the Item Folder is public to that Item and shares its membership information with that Item; conversely, the lack of a logical Relationship from an Item to an Item Folder denotes that the Item Folder is private to that Item and does not share its membership information with that Item. Similarly, a Relationship that logically extends from an Item Folder to an Item denotes that the Item is public and sharable to that Item Folder, whereas the lack of a logical Relationship from the Item Folder to the Item denotes that the Item is private and non-sharable. Consequently, when an Item Folder is exported to another system, it is the "public" Items that are shared in the new context, and when an Item searches its Items Folders for other, sharable Items, it is the "public" Item Folders that provide the Item with information regarding sharable Items that belong thereto.

Figure 9:
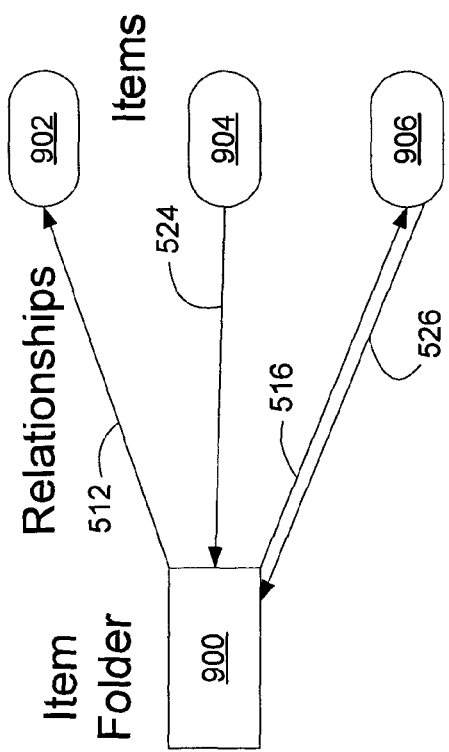
FIG. 9 is a block diagram illustrating an Item Folder, its member Items, and the interconnecting Relationships between the Item Folder and its member Items.

FIG. 9 is a block diagram illustrating an Item Folder (which, again, is an Item itself), its member Items, and the interconnecting Relationships between the Item Folder and its member Items. The Item Folder 900 has as members a plurality of Items 902, 904, and 906. Item Folder 900 has a Relationship 912 from itself to Item 902 which denotes that the Item 902 is public and sharable to Item Folder 900, its members 904 and 906, and any other Item Folders, Categories, or Items (not shown) that might access Item Folder 900. However, there is no Relationship from Item 902 to the Item Folder 900 which denotes that Item Folder 900 is private to Item 902 and does not share its membership information with Item 902. Item 904, on the other hand, does have a Relationship 924 from itself to Item Folder 900 which denotes that the Item Folder 900 is public and shares its membership information with Item 904. However, there is no Relationship from the Item Folder 900 to Item 904 which denotes that Item 904 is private and not sharable to Item Folder 900, its other members 902 and 906, and any other Item Folders, Categories, or Items (not shown) that might access Item Folder 900. In contrast with its Relationships (or lack thereof) to Items 902 and 904, Item Folder 900 has a Relationship 916 from itself to the Item 906 and Item 906 has a Relationship 926 back to Item Folder 900, which together denote that Item 906 is public and sharable to Item Folder 900, its members 902 and 904, and any other Item Folders, Categories, or Items (not shown) that might access Item Folder 900, and that Item Folder 900 is public and shares its membership information with Item 906.

As previously discussed, the Items in an Item Folder do not need to share a commonality because Item Folders are not "described." Categories, on the other hand, are described by a commonality that is common to all of its member Items.

Consequently the membership of a Category is inherently limited to Items having the described commonality and, in certain embodiments, all Items meeting the description of a Category are automatically made members of the Category. Thus, whereas Item Folders allow trivial type structures to be represented by their membership, Categories allow membership based on the defined commonality.

Of course Category descriptions are logical in nature, and therefore a Category may be described by any logical representation of types, properties, and/or values. For example, a logical representation for a Category may be its membership to comprise Items have one of two properties or both. If these described properties for the Category are "A" and "B", then the Categories membership may comprise Items having property A but not B, Items having property B but not A, and Items having both properties A and B. This logical representation of properties is described by the logical operator "OR" where the set of members described by the Category are Items having property A OR B. Similar logical operands (including without limitation "AND", "XOR", and "NOT" alone or in combination) can also be used describe a category as will be appreciated by those of skill in the art.

Despite the distinction between Item Folders (not described) and Categories (described), Categories Relationship to Items and Items Relationship to Categories essentially the same way as disclosed herein above for Item Folders and Items in many embodiments of the present invention.

Figure 10:
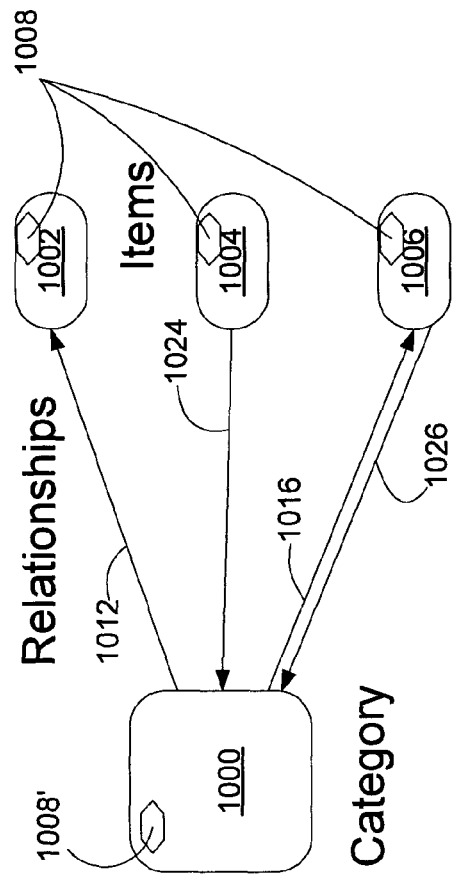
FIG. 10 is a block diagram illustrating a Category (which, again, is an Item itself), its member Items, and the interconnecting Relationships between the Category and its member Items.

FIG. 10 is a block diagram illustrating a Category (which, again, is an Item itself), its member Items, and the interconnecting Relationships between the Category and its member Items. The Category 1000 has as members a plurality of Items 1002, 1004, and 1006, all of which share some combination of common properties, values, or types 1008 as described (commonality description 1008') by the Category 1000. Category 1000 has a Relationship 1012 from itself to Item 1002 which denotes that the Item 1002 is public and sharable to Category 1000, its members 1004 and 1006, and any other Categories, Item Folders, or Items (not shown) that might access Category 1000. However, there is no Relationship from the Item 1002 to the Category 1000 which denotes that Category 1000 is private to Item 1002 and does not share its membership information with Item 1002. Item 1004, on the other hand, does have a Relationship 1024 from itself to Category 1000 which denotes that the Category 1000 is public and shares its membership information with Item 1004. However, there is no Relationship extended from Category 1000 to the Item 1004 which denotes that Item 1004 is private and not sharable to Category 1000, its other members 1002 and 1006, and any other Categories, Item Folders, or Items (not shown) that might access Category 1000. In contrast to its Relationships (or lack thereof) with Items 1002 and 1004, Category 1000 has a Relationship 1016 from itself to Item 1006 and Item 1006 has a Relationship 1026 back to Category 1000, which altogether denotes that Item 1006 is public and sharable to Category 1000, its Item members 1002 and 1004, and any other Categories, Item Folders, or Items (not shown) that might access Category 1000, and that the Category 1000 is public and shares its membership information with Item 1006.

Finally, because Categories and Item Folders are themselves Items, and Items may Relationship to each other, Categories may Relationship to Item Folders and vice versa, and Categories, Item Folders, and Items can Relationship to other Categories, Item Folders, and Item respectively in certain alternative embodiments. However, in various embodiments, Item Folder structures and/or Category structures are prohibited, at the hardware/software interface system level, from containing cycles. Where Item Folder and Category structures are akin to directed graphs, the embodiments that prohibit cycles are akin to directed acyclic graphs (DAGs) which, by mathematical definition in the art of graph theory, are directed graphs wherein no path starts and ends at the same vertex.

6. Extensibility

The storage platform is intended to be provided with an initial set of schemas 340, as described above. In addition, however, in at least some embodiments, the storage platform allows customers, including independent software vendor (ISVs), to create new schemas 344 (i.e. new Item and Nested Element types). This section addresses the mechanism for creating such schemas by extending the Item types and Nested Element types (or simply "Element" types) defined in the initial set of schemas 340.

Preferably, extension of the initial set of Item and Nested Element types is constrained as follows:

an ISV is allowed to introduce new Item types, i.e. subtype Base.Item;

an ISV is allowed to introduce new Nested Element types, i.e. subtype Base.NestedElement;

an ISV is allowed to introduce new extensions, i.e. subtype Base.NestedElement; but, an ISV cannot subtype any types (Item, Nested Element, or Extension types) defined by the initial set of storage platform schemas 340.

Since an Item type or Nested Element type defined by the initial set of storage platform schemas may not exactly match an ISV application's need, it is necessary to allow ISVs to customize the type. This is allowed with the notion of Extensions. Extensions are strongly typed instances but (a) they cannot exist independently and (b) they must be attached to an Item or Nested Element.

In addition to addressing the need for schema extensibility, Extensions are also intended to address the "multi-typing" issue. Since, in some embodiments, the storage platform may not support multiple inheritance or overlapping subtypes, applications can use Extensions as a way to model overlapping type instances (e.g. Document is a legal document as well a secure document).

a) Item Extensions

To provide Item extensibility, the data model further defines an abstract type named Base.Extension. This is a root type for the hierarchy of extension types. Applications can subtype Base.Extension to create specific extension types.

The Base.Extension type is defined in the Base schema as follows:

```
<Type Name="Base.Extension" IsAbstract="True">
    <Propety Name="ItemID"
        Type="the storage platformTypes.uniqueidentified"
        Nullable="false"
        MultiValued="false"/>
    <Property Name="ExtensionID"
        Type="the storage platformTypes.uniqueidentified"
        Nullable="false"
        MultiValued="false"/>
</Type>
```

The ItemID field contains the ItemID of the item that the extension is associated with. An Item with this ItemID must exist. The extension can not be created if the item with the given ItemID does not exist. When the Item is deleted all the extensions with the same ItemID are deleted. The tuple (ItemID,ExtensionID) uniquely identifies an extension instance.

The structure of an extension type is similar to that of an item type:

Extension types have fields;
Fields can be of primitive or nested element types; and
Extension types can be sub-typed.
The following restrictions apply for extension types
Extensions can not be sources and targets of relationships;
Extension type instances can not exist independently from an item; and
Extension types can not be used as field types in the storage platform type definitions There are no constraints on the types of extensions that can be associated with a given Item type. Any extension type is allowed to extend any item type. When multiple extension instances are attached to an item, they are independent from each other in both structure and behavior.

The extension instances are stored and accessed separately from the item. All extension type instances are accessible from a global extension view. An efficient query can be composed that will return all the instances of a given type of extension regardless of what type of item they are associated with. The storage platform APIs provides a programming model that can store, retrieve and modify extensions on items.

The extension types can be type sub-typed using the storage platform single inheritance model. Deriving from an extension type creates a new extension type. The structure or the behavior of an extension cannot override or replace the structure or behaviors of the item type hierarchy.

Similar to Item types, Extension type instances can be directly accessed through the view associated with the extension type. The ItemID of the extension indicates which item they belong to and can be used to retrieve the corresponding Item object from the global Item view.

The extensions are considered part of the item for the purposes of operational consistency. The Copy/Move, Backup/Restore and other common operations that the storage platform defines may operate on the extensions as part of the item.

Consider the following example. A Contact type is defined in the Windows Type set.

```
<Type Name="Contact" BaseType="Base.Item" >
    <Property Name="Name"
        Type="String"
        Nullable="false"
        MultiValued="false"/>
    <Property Name="Address"
        Type="Address"
        Nullable="true"
        MultiValued="false"/>
</Type>
```

A CRM application developer would like to attach a CRM application extension to the contacts stored in the storage platform. The application developer would define a CRM extension that would contain the additional data structure that the application can manipulate.

```
<Type Name="CRMExtension" BaseType="Base.Extension" >
    <Property Name="CustomerID"
        Type="String"
        Nullable="false"
        MultiValued="false"/>
    ...
</Type>
```

An HR application developer may want to also attach additional data with the Contact. This data is independent from the CRM application data. Again the application developer can create an extension

```
<Type Name="HRExtension" EBaseType="Base.Extension" >
    <Property Name="EmployeeID"
        Type="String"
        Nullable="false"
        MultiValued="false"/>
    ...
</Type>
```

CRMExtension and HRExtension are two independent extensions that can be attached to Contact items. They are created and accessed independently of each other.

In the above example, the fields and methods of the CRMExtension type cannot override fields or methods of the Contact hierarchy. It should be noted that instances of the CRMExtension type can be attached to Item types other than Contact.

When the Contact item is retrieved, its item extensions are not automatically retrieved. Given a Contact item, its related item extensions can be accessed by querying the global extension view for extensions with the same ItemId.

All CRMExtension extensions in the system can be accessed through the CRMExtension type view, regardless of which item they belong to. All item extension of an item share the same item id. In the above example, the Contact item instance and the attached CRMExtension and HRExtension instances the same ItemID.

The following table summarizes the similarities and differences between Item, Extension and NestedElement types:

| | Item vs ItemExtension vs NestedElement | | |
| --- | --- | --- | --- |
| | Item | Item Extension | NestedElement |
| Item ID | Has its own item id | Shares the item id of the item | Does not have its own item id. Nested element is part of the item |

| Item vs ItemExtension vs NestedElement | | | |
|---|---|---|---|
| | Item | Item Extension | NestedElement |
| Storage | Item hierarchy is stored in its own tables | Item extension hierarchy is stored in its own tables | Stored with item |
| Query/Search | Can query item tables | Can query item extension tables | Can generally be queried only within the containing item context |
| Query/Search scope | Can search across all instances of an item type | Can search across all instances of an item extension type | Can generally only search within nested element type instances of a singe (containing) item |
| Relationship semantics | Can have Relationships to items | No Relationships to item extensions | No Relationships to nested elements |
| Association to items | Can be related to other items via holding, embedded and soft Relationships | Can generally only be related via extensions. The extension semantics is similar to embedded item semantics | Related to item via fields. Nested elements are part of the item | b) Extending NestedElement Types

Nested Element types are not extended with the same mechanism as the Item types. Extensions of nested elements are stored and accessed with the same mechanisms as fields of nested element types.

The data model defines a root for nested element types named Element:

```
<Type Name="Element"
    IsAbstract="True">
        <Property Name="ElementID"
            Type="the storage platformTypes.uniqueidentifier"
            Nullable="false"
            MultiValued="false"/>
</Type>
```

The NestedElement type inherits from this type. The NestedElement element type additionally defines a field that is a multi-set of Elements.

```
<Type Name="NestedElement" BaseType="Base.Element"
    IsAbstract="True">
        <Property Name="Extensions"
            Type="Base.Element"
            Nullable="false"
            MultiValued="true"/>
</Type>
```

The NestedElement extensions are different from item extensions in the following ways:

Nested element extensions are not extension types. They do not belong to the extension type hierarchy that is rooted in the Base.Extension type.

Nested element extensions are stored along with the other fields of the item and are not globally accessible—a query can not be composed that retrieves all instances of a given extension type.

These extensions are stored the same way as other nested elements (of the item) are stored. Like other nested sets, the NestedElement extensions are stored in a UDT. They are accessible through the Extensions field of the nested element type.

The collection interfaces used to access multi-valued properties is also used for accessing and iterating over set of type extensions.

The following table summarizes and compares Item Extensions and NestedElement extensions.

| Item extensions vs NestedElement extensions | | |
|---|---|---|
| | Item Extension | NestedElement Extension |
| Storage | Item extension hierarchy is stored in its own tables | Stored like nested elements |
| Query/Search | Can query item extension tables | Can generally only be queried within the containing item context |
| Query/Search scope | Can search across all instances of an item extension type | Can generally only search within nested element type instances of a singe (containing) item |
| Programmability | Need special extension APIs and special querying on extension tables | NestedElement extensions are like any other multi-valued field of nested element; normal nested element type APIs are used |
| Behavior | Can associate behavior | No behavior permitted (?) |
| Relationship semantics | No Relationships to item extensions | No Relationships to NestedElement extensions |
| Item ID | Shares the item id of the item | Does not have its own item id. NestedElement extension is part of the item |

D. Database Engine

As mentioned above, the data store is implemented on a database engine. In the present embodiment, the database engine comprises a relational database engine that implements the SQL query language, such as the Microsoft SQL Server engine, with object relational extensions. This section describes the mapping of the data model that the data store implements to the relational store and provides information on the logical API consumed by storage platform clients, in accordance with the present embodiment. It is understood, however, that a different mapping may be employed when a different database engine is employed. Indeed, in addition to implementing the storage platform conceptual data model on a relational database engine, it can also be implemented on other types of databases, e.g. object-oriented and XML databases.

An object-oriented (OO) database system provides persistence and transactions for programming language objects (e.g. C++, Java). The storage platform notion of an "item" maps well to an "Object" in object-oriented systems, though embedded collections would have to be added to Objects. Other storage platform type concepts, like inheritance and nested element types, also map object-oriented type systems. Object-oriented systems typically already support object identity; hence, item identity can be mapped to object identity. The item behaviors (operations) map well to object methods. However, object-oriented systems typically lack organizational capabilities and are poor in searching. Also, object-oriented systems to do not provide support for unstructured and semi-structured data. To support the complete storage platform data model described herein, concepts like relationships, folders, and extensions would need to be added to the object data model. In addition, mechanisms like promotions, synchronization, notifications, and security would need to be implemented.

Similar to object-oriented systems, XML databases, based on XSD (XML Schema Definition), support a single-inheritance based type system. The item type system of the present invention could be mapped to the XSD type model. XSDs also do not provide support for behaviors. The XSDs for items would have to be augmented with item behaviors. XML databases deal with single XSD documents and lack organization and broad search capabilities. As with object-oriented databases, to support the data model described herein, other concepts like relationships, and folders would need to be incorporated into such XML databases; also, mechanisms like synchronization, notifications and security would need to be implemented.

1. Data Store Implementation Using UDTs

In the present embodiment, the relational database engine 314, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types (hereinafter: UDTs) provide a mechanism for type extensibility above and beyond the native scalar type system by enabling users to extend the type system by defining complex, structured types. Once defined by a user, a UDT can be used anywhere in the type system that a built-in scalar type might be used.

In accordance with an aspect of the present invention, the storage platform schemas are mapped to UDT classes in the database engine store. Data store Items are mapped to UDT classes deriving from the Base.Item type. Like Items, Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be: the type of a column in a row, the type of a parameter of a routine in T-SQL, or the type of a variable in T-SQL.

The following example illustrates the basics of UDTs. Assume that MapLib.dll has the assembly called MapLib. In this assembly, there's a class called Point, under the namespace BaseTypes:

```
namespace BaseTypes
{
    public class Point
    {
        //returns the distance from the specified point.
        public double Distance(Point p)
        {
            // return the distance between Point p and this Point
        }
        // other stuff in the class
    }
}
```

The following T-SQL code binds the class Point to a SQL Server UDT called Point. The first step invokes "CreateAssembly", which loads the MapLib assembly into the database. The second step invokes "Create Type" to create the User Defined Type "Point" and bind it to the managed type BaseTypes.Point:

```
CREATE ASSEMBLY MapLib
FROM '\\mysrv\share\MapLib.dll'
go
CREATE TYPE Point
EXTERNAL NAME 'BaseTypes.Point'
go
```

Once created, the "Point" UDT can be used as a column in a table and methods can be invoked in T-SQL as shown below:

```
Create table Cities(
    Name varchar(20),
    State varchar(20),
    Location Point)
-- Retrieve the Distance of the cities
-- from co-ordinates (32,23)
Declare @p point(32, 23), @distance float
Select Location::Distance(@p)
From Cities
```

The mapping of storage platform schemas to UDT classes is fairly straightforward at a high level. Generally, a storage platform Schema is mapped to a CLR namespace. A storage platform Type is mapped to a CLR class. The CLR class inheritance mirrors the storage platform Type inheritance, and a storage platform Property is mapped to a CLR class property.

Figures 28, 29:
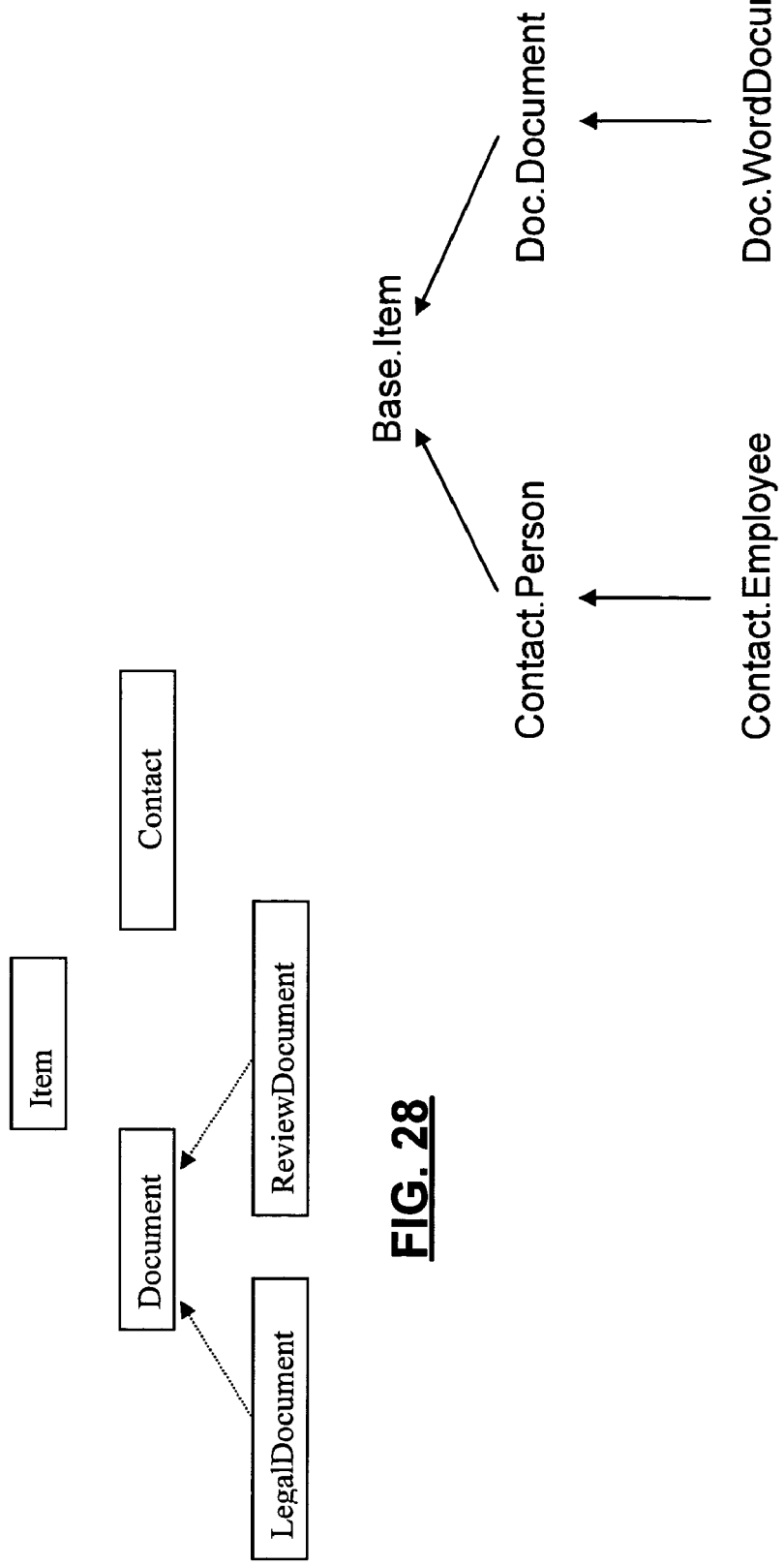
FIG. 28 is a diagram illustrating the concept of an Item search view, in accordance with an embodiment of one aspect of the present invention.
FIG. 29 is a diagram illustrating an exemplary Item hierarchy in accordance with an embodiment of the present invention.

The Item hierarchy illustrated in FIG. 29 is used as an example in this document. It shows the Base.Item type from which all Item types are derived, along with a set of derived Item types (e.g., Contact.Person and Contact. Employee), with inheritance indicated by arrows.

2. Item Mapping

Given the desirability for Items to be globally searchable, and the support in the relational database of the present embodiment for inheritance and type substitutability, one possible implementation for Item storage in the database store would be to store all Items in a single table with a column of type Base.Item. Using type substitutability, Items of all types could be stored, and searches could be filtered by Item type and sub-type using Yukon's "is of (Type)" operator.

However, due to concerns about the overhead associated with such an approach, in the present embodiment, the Items are divided by top-level type, such that Items of each type "family" are stored in a separate table. Under this partitioning scheme, a table is created for each Item type inheriting directly from Base.Item. Types inheriting below these are stored in the appropriate type family table using type substitutability, as described above. Only the first level of inheritance from Base.Item is treated specially. For the example Item hierarchy shown in FIG. 29, this results in the following type family tables:

```
create table Contact.[Table!Person] (
    _Item Contact.Person not null,
    {Change tracking information}
)
create table Doc.[Table!Document] (
    _Item Doc.Document not null,
    {Change tracking information}
)
```

A "shadow" table is used to store copies of globally searchable properties for all Items. This table may be maintained by the Update( ) method of the storage platform API, through which all data changes are made. Unlike the type family tables, this global Item table contains only the top-level scalar properties of the Item, not the full UDT Item object. The structure of the global Item table is as follows:

```
create table Base.[Table!Item] (
    ItemID    uniqueidentifier not null    constraint
       [PK_Clu_Item!ItemID] primary key clustered,
    TypeID    uniqueidentifier  not null,
    {Additional Properties of Base.Item},
    {Change tracking information}
)
```

The global Item table allows navigation to the Item object stored in a type family table by exposing an ItemID and a TypeID. The ItemID will generally uniquely identify the Item within the data store. The TypeID may be mapped using metadata, which is not described here, to a type name and the view containing the Item.

Since finding an Item by its ItemID may be a common operation, both in the context of the global Item table and otherwise, a GetItem( ) function is provided to retrieve an Item object given an Item's ItemID. This function has the following declaration: Base.Item Base.GetItem (uniqueidentifier ItemID)

For convenient access and to hide implementation details to the extent possible, all queries of Items might be against views built on the Item tables described above. Specifically, views may be created for each Item type against the appropriate type family table. These type views may select all Items of the associated type, including sub-types. For convenience, in addition to the UDT object, the views may expose columns for all of the top-level fields of that type, including inherited fields. Views for the example Item hierarchy shown in FIG. 29 are as follows:

```
create view Contact.Person as
    select _Item.ItemID, {Properties of Base.Item},
        {Properties of Contact.Person}, {Change tracking
        information}, _Item
    from Contact.[Table!Person]
--Note that the Contact.Employee view uses a "where" predicate
-- to restrict the set of found Items to instances of Contact.Employee
create view Contact.Employee as
    select _Item.ItemID, {Properties of Base.Item},
        {Properties of Contact.Person}, {Properties of
        Contact.Employee},
            {Change tracking information}, cast
            (_Item as Contact.Employee)
    from Contact.[Table!Person]
    where _Item is of (Contact.Employee)
create view Doc.Document as
    select _Item.ItemID, {Properties of Base.Item},
        {Properties of Doc.Document}, {Change tracking
        information}, _Item
    from Doc.[Table!Document]
--Note that the Doc.WordDocument view uses a "where" predicate
-- to restrict the set of found Items to instances of Doc.WordDocument
create view Doc.WordDocument as
    select _Item.ItemID, {Properties of Base.Item},
        {Properties of Doc.Document}, {Properties of
        Doc.WordDocument},
            {Change tracking information}, cast
            (_Item as Doc.WordDocument)
    from Doc.[Table!Document]
    where _Item is of (Doc.WordDocument)
```

For completeness, a view may also be created over the global Item table. This view may initially expose the same columns as the table:

```
create view Base.Item as
    select ItemID, TypeID, {Properties of Base.Item},
        {Change tracking information}
        from Base.[Table!Item]
```

3. Extension Mapping

Extensions are very similar to Items and have some of the same requirements. As another root type supporting inheritance, Extensions are subject to many of the same considerations and trade-offs in storage. Because of this, a similar type family mapping is applied to Extensions, rather than a single table approach. Of course, in other embodiments, a single table approach could be used.

In the present embodiment, an Extension is associated with exactly one Item by ItemID, and contains an ExtensionID that is unique in the context of the Item. The Extension table has the following definition:

```
create table Base.[Table!Extension] (
    ItemID uniqueidentifier not null,
    ExtensionID uniqueidentifier not null,
    TypeID    uniqueidentifier not null,
    {Properties of Base.Extension},
    {Change tracking information},
    constraint [PK_Clu_Extension!ItemID!ExtensionID]
        primary key clustered (ItemID asc, ExtensionID asc)
)
```

As with Items, a function might be provided to retrieve an Extension given its identity, which consists of an ItemID and ExtensionID pair. This function has the following declaration:

Base.Extension Base.GetExtension (uniqueidentifier ItemID, uniqueidentifier ExtensionID,)

A View is created for each Extension type, similar to the Item type views. Assume an Extension hierarchy parallel to the example Item hierarchy, with the following types: Base.Extension, Contact.PersonExtension, Contact.EmployeeExtension. The following views may be created:

```
create view Base.Extension as
    select ItemID, ExtensionID, TypeID, {Properties of
    Base.Extension}, {Change tracking information}
    from Base.[Table!Extension]
create view Contact.[Extension!PersonExtension] as
    select _Extension.ItemID, _Extension.ExtensionID,
    {Properties of Base.Extension, {Properties of
        Contact.PersonExtension},
            {Change tracking information}, _Extension
    from Base.[Table!PersonExtension]
create view Contact.[Extension!EmployeeExtension] as
    select _Extension.ItemID, _Extension.Extension ID,
    {Properties of Base.Extension}, {Properties of
        Contact.PersonExtension},
            {Properties of Contact.EmployeeExtension},
            {Change tracking information},
            cast (_Extension as Contact.EmployeeExtension)
    from Base.[Table!PersonExtension]
    where _Extension is of (Contact.EmployeeExtension)
```

4. Nested Element Mapping

Nested Elements are types that can be embedded in Items, Extensions, Relationships, or other Nested Elements to form deeply nested structures. Like Items and Extensions, Nested Elements are implemented as UDT's, but they are stored within an Items and Extensions. Therefore, Nested Elements have no storage mapping beyond that of their Item and Extension containers. In other words, there are no tables in the system which directly store instances of NestedElement types, and there are no views dedicated specifically to Nested Elements.

5. Object Identity

Each entity in the data model, i.e., each Item, Extension and Relationship, has a unique key value. An Item is uniquely identified by its ItemId. An Extension is uniquely identified by a composite key of (ItemId, ExtensionID). A Relationship is identified by a composite key (ItemId, RelationshipId). ItemId, ExtensionId and RelationshipID are GUID values.

6. SQL Object Naming

All objects created in the data store can be stored in a SQL schema name derived from the storage platform schema name. For example, the storage platform Base schema (often called "Base") may produce types in the "[System.Storage]" SQL schema such as "[System.Storage].Item". Generated names are prefixed by a qualifier to eliminate naming conflicts. Where appropriate, an exclamation character (!) is used as a separator for each logical part of the name. The table below outlines the naming convention used for objects in the data store. Each schema element (Item, Extension, Relationship and View), is listed along with the decorated naming convention used to access instances in the data store.

| Object | Name Decoration | Description | Example |
| --- | --- | --- | --- |
| Master Item Search View | Master!Item | Provides a summary of items in the current item domain. | [System.Storage].[Master!Item] |
| Typed Item search view | ItemType | Provides all property data from item and any parent type(s). | [AcmeCorp.Doc].[OfficeDoc] |
| Master Extension Search View | Master!Extension | Provides a summary of all extensions in the current item domain. | [System.Storage].[Master!Extension] |
| Typed extension search view | Extension!extensionType | Provides all property data for extension. | [AcmeCorp.Doc].[Extension!StickyNote] |
| Master Relationship View | Master!Relationship | Provides a summary of all relationships in the current item domain. | [System.Storage].[Master!Relationship] |
| Relationship view | Relationship!relationshipName | Provides all data associated with a given relationship | [AcmeCorp.Doc].[Relationship!AuthorsFromDocument] |
| View | View!viewName | Provides the columns/types based on the schema view definition. | [AcmeCorp.Doc].[View!DocumentTitles] |

7. Column Naming

When mapping any object model into a store, the possibility of naming collisions occur due to additional information stored along with an application object. In order to avoid naming collisions, all non-type specific columns (columns which do not map directly to a named Property in a type declaration) is be prefixed with an underscore (_) character. In the present embodiment, underscore (_) characters are disallowed as the beginning character of any identifier property. Further, in order to unify naming between CLR and the data store, all properties of a storage platform types or schema element (relationship, etc.) should have a capitalized first character.

8. Search Views

Views are provided by the storage platform for searching stored content. A SQL view is provided for each Item and Extension type. Further, views are provided to support Relationships and Views (as defined by the Data Model). All SQL views and underlying tables in the storage platform are read-only. Data may be stored or changed using the Update( ) method of the storage platform API, as described more fully below.

Each view explicitly defined in a storage platform schema (defined by the schema designer, and not automatically generated by the storage platform) is accessible by the named SQL view [<schema-name>].[View!<view-name>]. For example, a view named "BookSales" in the schema "AcmePublisher.Books" would be accessible using the name "[AcmePublisher.Books].[View!BookSales]". Since the output format of a view is custom on a per-view basis (defined by an arbitrary query provided by the party defining the view), the columns are directly mapped based on the schema view definition.

All SQL search views in the storage platform data store use the following ordering convention for columns:

1. Logical "key" column (s) of view result such as ItemId, ElementId, RelationshipID, . . .
2. Metadata information on type of result such as TypeId.
3. Change tracking columns such as CreateVersion, UpdateVersion, . . .
4. Type specific column(s) (Properties of the declared type)
5. Type specific views (family views) also contain an object column which returns the object Members of each type family are searchable using a series of Item views, with there being one view per Item type in the data store.

a) Item

Each Item search view contains a row for each instance of an Item of the specific type or its subtypes. For example, the view for Document could return instances of Document, LegalDocument and ReviewDocument. Given this example, the Item views can be conceptualized as shown in FIG. 28.

(1) Master Item Search View

Each instance of a storage platform data store defines a special Item view called the Master Item View. This view provides summary information on each Item in the data store. The view provides one column per Item type property, a column which described the type of the Item and several columns which are used to provide change tracking and synchronization information. The master item view is identified in a data store using the name "[System.Storage].[Master!Item]".

| Column | Type | Description |
|---|---|---|
| ItemId | ItemId | The storage platform identity of the Item |
| _TypeId | TypeId | The TypeId of the Item - identifies the exact type of the Item and can be used to retrieve information on the type using a Metadata catalog. |
| _RootItemId | ItemId | The ItemId of the first non-embedded ancestor that controls the lifetime of this item. |
| <global change tracking> | . . . | Global change tracking information |
| <Item props> | n/a | One column per Item type property |

(2) Typed Item Search Views

Each Item type also has a search view. While similar to the root Item view, this view also provides access to the Item object via the "_Item" column. Each typed item search view is identified in a data store using the name [schemaName].[itemTypeName]. For example [AcmeCorp.Doc].[OfficeDoc].

| Column | Type | Description |
|---|---|---|
| ItemId | ItemId | The storage platform identity of the Item |
| <type change tracking> | . . . | Type change tracking information |
| <parent props> | <property specific> | One column per parent property |
| <item props> | <property specific> | One column per exclusive property of this type |
| _Item | CLR type of Item | CLR object - type of declared Item | b) Item Extensions

All Item Extensions in a WinFS Store are also accessible using search views.

(1) Master Extension Search View

Each instance of a data store defines a special Extension view called the Master Extension View. This view provides summary information on each Extension in the data store. The view has a column per Extension property, a column which describes the type of the Extension and several columns which are used to provide change tracking and synchronization information. The master extension view is identified in a data store using the name "[System.Storage].[Master!Extension]".

| Column | Type | Description |
|---|---|---|
| ItemId | ItemId | The storage platform identity of the Item with which this extension is associated |
| ExtensionId | ExtensionId (GUID) | Id of this extension instance |
| _TypeId | TypeId | The TypeId of the Extension - identifies the exact type of the extension and can be used to retrieve information on the extension using the Metadata catalog. |

-continued

| Column | Type | Description |
|---|---|---|
| <global change tracking> | ... | Global change tracking information |
| <ext properties> | <property specific> | One column per Extension type property |

(2) Typed Extension Search Views

Each Extension type also has a search view. While similar to the master extension view, this view also provides access to the Item object via the _Extension column. Each typed extension search view is identified in a data store using the name [schemaName].[Extension!extensionTypeName]. For example [AcmeCorp.Doc].[Extension!OfficeDocExt].

| Column | Type | Description |
|---|---|---|
| ItemId | ItemId | The storage platform identity of the Item with which this extension is associated |
| ExtensionId | ExtensionId (GUID) | Id of this extension instance |
| <type change tracking> | ... | Type change tracking information |
| <parent props> | <property specific> | One column per parent property |
| <ext props> | <property specific> | One column per exclusive property of this type |
| _Extension | CLR type of Extension instance | CLR object - type of declared Extension | c) Nested Elements

All nested elements are stored within Items, Extensions or Relationships instances. As such, they are accessed by querying the appropriate Item, Extension, or Relationship search view.

d) Relationships

As discussed above, Relationships form the fundamental unit of linking between Items in a storage platform data store.

(1) Master Relationship Search View

Each data store provides a Master Relationship View. This view provides information on all relationship instances in the data store. The master relationship view is identified in a data store using the name "[System.Storage].[Master!Relationship]".

| Column | Type | Description |
|---|---|---|
| ItemId | ItemId | Identity of source endpoint (ItemId) |
| RelationshipId | RelationshipId (GUID) | The id of the relationship instance |
| _RelTypeId | RelationshipTypeId | The RelTypeId of the Relationship - identifies the type of the relationship instance using the Metadata catalog. |
| <global change tracking> | ... | Global change tracking information. |
| TargetItemReference | ItemReference | Identity of target endpoint |
| _Relationship | Relationship | Instance of the Relationship object for this instance |

(2) Relationship Instance Search Views

Each declared Relationship also has a search view which returns all instances of the particular relationship. While similar to the master relationship view, this view also provides named columns for each property of the relationship data. Each relationship instance search view is identified in a data store using the name [schemaName].[Relationship!relationshipName]. For example [AcmeCorp.Doc].[Relationship!DocumentAuthor].

| Column | Type | Description |
|---|---|---|
| ItemId | ItemId | Identify of source endpoint (ItemId) |
| RelationshipId | RelationshipId (GUID) | The id of the relationship instance |
| <type change tracking> | ... | Type change tracking information |
| TargetItemReference | ItemReference | Identity of target endpoint |
| <source name> | ItemId | Named property of source endpoint identity (alias for ItemId) |
| <target name> | ItemReference or derived class | Named property of target endpoint identity (alias and cast for TargetItemReference) |
| <rel property> | <property specific> | One column per property of the relationship definition |
| _Relationship | CLR type of Relationship instance | CLR object - type of declare Relationship |

9. Updates

All views in the storage platform data store are read-only. In order to create a new instance of a data model element (item, extension or relationship), or to update an existing instance, the ProcessOperation or ProcessUpdategram methods of the storage platform API must be used. The ProcessOperation method is a single stored procedure defined by the data store which consumes an "operation" that details an action to be performed. The ProcessUpdategram method is a stored procedure which takes an ordered set of operations, known as an "updategram", which collectively detail a set of actions to be performed.

The operation format is extensible and provides various operations over the schema elements. Some common operations include:

1. Item operations:
    a. CreateItem (Creates a new item in the context of an embedding or holding relationship)
    b. UpdateItem (updates an existing Item)
2. Relationship operations:
    a. CreateRelationship (creates an instance of a reference or holding relationship)
    b. UpdateRelationship (updates a relationship instance)
    c. DeleteRelationship (removes a relationship instances)
3. Extension operations:
    a. CreateExtension (adds an extension to an existing Item)
    b. UpdateExtension (updates an existing extension)
    c. DeleteExtension (deletes an extension)

10. Change Tracking & Tombstones

Change tracking and tombstone services are provided by the data store, as discussed more fully below. This section provides an outline of the change tracking information exposed in a data store.

a) Change Tracking

Each search view provided by the data store contains columns used to provide change tracking information; the columns are common across all Item, Extension and Relationship views. Storage platform Schema Views, defined explicitly by schema designers, do not automatically provide change tracking information—such information is provided indirectly through the search views on which the view itself is built.

For each element in the data store, change tracking information is available from two places—the "master" element view and the "typed" element view. For example, change tracking information on the AcmeCorp.Document.Document Item type is available from the Master Item View "[System.Storage].[Master!Item]" and typed Item search view [AcmeCorp.Document].[Document].

(1) Change Tracking in "Master" Search Views

Change tracking information in the master search views provides information on the creation and update versions of an element, information on which sync partner created the element, which sync partner last updated the element and the version numbers from each partner for creation and update. Partners in sync relationships (described below) are identified by partner key. A single UDT object named _ChangeTrackingInfo of type [System.Storage.Store].ChangeTrackingInfo contains all this information. The type is defined in the System.Storage schema._ChangeTrackingInfo is available in all global search views for Item, Extension and Relationship. The type definition of ChangeTrackingInfo is:

```
<Type Name="ChangeTrackingInfo" BaseType="Base.NestedElement">
    <FieldProperty Name="CreationLocalTS"
        Type="SqlTypes.SqlInt64"
        Nullable="False" />
    <FieldProperty Name="CreatingPartnerKey"
        Type="SqlTypes.SqlInt32"        Nullable="False" />
    <FieldProperty Name="CreatingPartnerTS"
        Type="SqlTypes.SqlInt64"        Nullable="False" />
    <FieldProperty Name="LastUpdateLocalTS"
        Type="SqlTypes.SqlInt64"        Nullable="False" />
    <FieldProperty Name="LastUpdatingPartnerKey"
        Type="SqlTypes.SqlInt32"        Nullable="False" />
    <FieldProperty Name="LastUpdatingPartnerTS"
        Type="SqlTypes.SqlInt64"
        Nullable="False" />
</Type>
```

These properties contain the following information:

| Column | Description |
| --- | --- |
| _CreationLocalTS | Creation time stamp by the local machine |
| _CreatingPartnerKey | PartnerKey of the partner who created this entity. If the entity was locally created, this is the local machine's PartnerKey. |
| _CreatingPartnerTS | Timestamp of the time at which this entity was created at the partner corresponding to _CreatingPartnerKey. |
| _LastUpdateLocalTS | Local timestamp corresponding to the update time at the local machine |
| _LastUpdatingPartnerKey | PartnerKey of the partner who last updated this entity. If the last update to the entity was done locally, this is the local machine's PartnerKey. |
| _LastUpdatingPartnerTS | Timestamp of the time at which this entity was updated at the partner corresponding to _LastUpdatingPartnerKey. |

(2) Change Tracking in "Typed" Search Views

In addition to providing the same information as the global search view, each typed search view provides additional information recording the sync state of each element in the sync topology.

| Column | Type | Description |
| --- | --- | --- |
| <global change tracking> | . . . | Information from global change tracking |
| _ChangeUnitVersions | MultiSet<ChangeUnitVersion> | Description of version numbers of the change units within the particular element |
| _ElementSyncMetadata | ElementSyncMetadata | Additional version-independent metadata about this item that is only of interest to the Synchronization runtime. |
| _VersionSyncMetadata | VersionSyncMetadata | Additional version-specific metadata about this version that is only of interest to the Synchronization runtime | b) Tombstones

The data store provides tombstone information for Items, Extensions and Relationships. The tombstone views provide information about both live and tombstoned entities (items, extensions and relationships) in one place. The item and extension tombstone views do not provide access to the corresponding object, while the relationship tombstone view provides access to the relationship object (the relationship object is NULL in the case of a tombstoned relationship).

(1) Item Tombstones

Item tombstones are retrieved from the system via the view [System.Storage].[Tombstone!Item].

| Column | Type | Description |
|---|---|---|
| ItemId | ItemID | Identity of the Item |
| _TypeID | TypeId | Type of the Item |
| <Item properties> | ... | Properties defined for all items |
| _RootItemId | ItemID | ItemID of the first non-embedding item which contains this item. |
| _ChangeTrackingInfo | CLR instance of type ChangeTrackingInfo | Change tracking information for this item |
| _IsDeleted | BIT | This is a flag that is 0 for live items, and 1 for tombstoned items. |
| _DeletionWallclock | UTCDATETIME | The UTC wall clock date time according to the partner which deleted the item. It is NULL if the Item is live. |

(2) Extension Tombstones

Extension tombstones are retrieved from the system using the view [System.Storage].[Tombstone!Extension]. Extension change tracking information is similar to that provided for Items with the addition of the ExtensionID property.

| Column | Type | Description |
|---|---|---|
| ItemID | ItemID | Identity of the Item which owns the Extension |
| ExtensionId | ExtensionId | Extension Id of the Extension |
| _TypeID | TypeId | Type of the extension |
| _ChangeTrackingInfo | CLR instance of type ChangeTrackingInfo | Change tracking information for this extension |
| _IsDeleted | BIT | This is a flag that is 0 for live items, and 1 for tombstoned extensions. |
| _DeletionWallclock | UTCDATETIME | The UTC wall clock date time according to the partner which deleted the extension. It is NULL if the extension is live. |

(3) Relationships Tombstone

Relationship tombstones are retrieved from the system via the view [System.Storage].[Tombstone!Relationship]. Relationships tombstone information is similar to that provided for Extensions. However, additional information is provided on the target ItemRef of the relationship instance. In addition, the relationship object is also selected.

| Column | Type | Description |
|---|---|---|
| ItemID | ItemID | Identity of the Item which owned the relationship (identity of relationship source endpoint) |
| RelationshipId | RelationshipId | RelationshipId of the relationship |
| _TypeID | TypeId | Type of the relationship |
| _ChangeTrackingInfo | CLR instance of type ChangeTrackingInfo | Change tracking information for this relationship |
| _IsDeleted | BIT | This is a flag that is 0 for live items, and 1 for tombstoned extensions. |
| _DeletionWallclock | UTCDATETIME | The UTC wall clock date time according to the partner which deleted the relationship. It is NULL if the relationship is live. |
| _Relationship | CLR instance of a Relationship | This is the relationship object for live relationship. It is NULL for tombstoned relationships. |
| TargetItemReference | ItemReference | Identity of target endpoint |

(4) Tombstone Cleanup

In order to prevent unbounded growth of tombstone information, the data store provides a tombstone cleanup task. This task determines when tombstone information may be discarded. The task computes a bound on the local create/update version and then truncates the tombstone information by discarding all earlier tombstone versions.

11. Helper APIs and Functions

The Base mapping also provides a number of helper functions. These functions are supplied to aid common operations over the data model.

a) Function [System.Storage].GetItem

```
Returns an Item object given an ItemId
//
Item GetItem (ItemId ItemId)
``` b) Function [System.Storage].GetExtension

```
// Returns an extension object given an ItemId and ExtensionId
//
Extension GetExtension (ItemId ItemId, ExtensionId ExtensionId)
``` c) Function [System.Storage].GetRelationship

```
// Returns an relationship object given an ItemId and RelationshipId
//
Relationship GetRelationship (ItemId ItemId, RelationshipId RelationshipId)
```

12. Metadata

There are two types of metadata represented in the Store: instance metadata (the type of an Item, etc), and type metadata.

a) Schema Metadata

Schema metadata is stored in the data store as instances of Item types from the Meta schema.

b) Instance Metadata

Instance metadata is used by an application to query for the type of an Item and finds the extensions associated with an Item. Given the ItemId for an Item, an application can query the global item view to return the type of the Item and use this value to query the Meta.Type view to return information on the declared type of the Item. For example,

```
// Return metadata Item object for given Item instance
//
SELECT m._Item AS metadataInfoObj
FROM [System.Storage].[Item] i INNER JOIN
[Meta].[Type] m ON i._TypeId = m.ItemId
WHERE i.ItemId = @ItemId
```

E. Security

This section describes a security model for the storage platform of the present invention, in accordance with one embodiment 1. Overview In accordance with the present embodiment, the granularity at which the security policy of the storage platform is specified and enforced is at the level of various operations on an item in a given data store; there is no ability to secure parts of an item separately from the whole. The security model specifies the set of principals who can be granted or denied access to perform these operations on an item through Access Control Lists (ACL's). Each ACL is an ordered collection of Access Control Entries (ACE's).

The security policy for an item can be completely described by the discretionary access control policy and the system access control policy. Each of these is a set of ACL's. The first set (DACL's) describes the discretionary access granted to the various principals by the owner of the item while the second set of ACL's is referred to as the SACL's (System Access Control Lists) which specify how the system auditing is done when an object is manipulated in certain ways. In addition to these, each item in the data store is associated with a SID that corresponds to the owner of the item (Owner SID).

The primary mechanism for organizing items in a storage platform data store is that of the containment hierarchy. The containment hierarchy is realized using holding relationships between items. The holding relationship between two items A and B expressed as "A contains B" enables the item A to influence the lifetime of the item B. Generally, an item in the data store cannot exist until there is a holding relationship from another item to it. The holding relationship, in addition to controlling the lifetime of the item, provides the necessary mechanism for propagating the security policy for an item.

The security policy specified for each item consists of two parts—a part that is explicitly specified for that item and a part that is inherited from the parent of the item in the data store. The explicitly defined security policy for any item consists of two parts—a part that governs access to the item under consideration and a part that influences the security policy inherited by all its descendants in the containment hierarchy. The security policy inherited by a descendant is a function of the explicitly defined policy and the inherited policy.

Since the security policy is propagated through holding relationships and can also be overridden at any item, it is necessary to specify how the effective security policy for an item is determined. In the present embodiment, an item in the data store containment hierarchy inherits an ACL along every path from the root of the store to the item.

Within the inherited ACL for any given path, the ordering of the various ACE's in the ACL determines the final security policy that is enforced. The following notation is used to describe the ordering of ACE's in an ACL. The ordering of the ACE's in an ACL that is inherited by an item is determined by the following two rules—

The first rule stratifies the ACEs inherited from the various items in a path to the item I from the root of the containment hierarchy. The ACE's inherited from a closer container takes precedence over the entries inherited from a distant container. Intuitively, this allows an administrator the ability to override ACE's inherited from farther up in the containment hierarchy. The rule is as follows:

For all inherited ACL's L on item I

For all items I1, I2

For all ACE's A1 and A2 in L,

I1 is an ancestor of I2 and

I2 is an ancestor of I3 and

A1 is an ACE inherited from I1 and

A2 is an ACE inherited from I2

Implies

A2 precedes A1 in L

The second rule orders the ACE's that deny access to an item ahead of the ACE's that grant access to an item.

For all inherited ACL's L on item I

For all items I1

For all ACE's A1 and A2 in L,

I1 is an ancestor of I2 and

A1 is an ACCESS_DENIED_ACE inherited from I1 and

A2 is an ACCESS_GRANTED_ACE inherited from I1

Implies

A1 precedes A2 in L

In the case of a containment hierarchy being a tree, there is exactly one path from the root of the tree to the item and the item has exactly one inherited ACL. Under these circumstances, the ACL inherited by an item matches the ACL inherited by a file (item) in the existing Windows security model in terms of the relative ordering of the ACE's within them.

However, the containment hierarchy in the data store is a directed acyclic graph (DAG) because multiple holding relationships are permitted to items. Under these conditions, there are multiple paths to an item from the root of the containment hierarchy. Since an item inherits an ACL along every path each item is associated with a collection of ACL's as opposed to a single one. Note that this is different from the traditional file system model, where exactly one ACL is associated with a file or folder.

There are two aspects that need to be elaborated when the containment hierarchy is a DAG as opposed to a tree. A description is needed of how the effective security policy for an item is computed when it inherits more than one ACL from its parents, and how they are organized and represented has a direct bearing on the administration of the security model for a storage platform data store.

The following algorithm evaluates the access rights for a given principal to a given item. Throughout this document, the following notation is used to describe the ACL's associated with an item.

Inherited_ACLs(ItemId)—the set of ACL's inherited by an item whose item identity is ItemId from it's parents in the store.

Explicit_ACL(ItemId)—the ACL explicitly defined for the item whose identity is ItemId.

```
NTSTATUS
ACLAccessCheck(
    PSID              pOwnerSid,
    PDACL             pDacl,
    DWORD             DesiredAccess,
    HANDLE            ClientToken,
    PPRIVILEGE_SET    pPrivilegeSet,
    DWORD             *pGrantedAccess)
```

The above routine returns STATUS_SUCCESS if the desired access was not explicitly denied, and the pGrantedAccess determines which of the rights desired by the user were granted by the specified ACL. If any of the desired access was explicitly denied, the routine returns STATUS_ACCESS_DENIED.

explicit policy is defined we are in effect defining a policy that is inherited by all its descendants in the containment hierarchy. The effective ACL's inherited by all of the descendants is obtained by taking each of the ACL's inherited by the item and adding the inheritable ACE's in the explicit ACL to the beginning of the ACL. This is referred to as the set of inheritable ACL's associated with the item.

In the absence of any explicit specification of security in the containment hierarchy rooted at a folder item, the security specification of the folder applies to all the descendants of that item in the containment hierarchy. Thus, every item for which an explicit security policy specification is provided, defines a region of identically protected items, and the effective ACL's for all the items in the region is the set of inheritable ACL's for that item. This would completely define the regions in the case of a containment hierarchy that is a tree. If each region were to be associated with a number, then it would be sufficient to merely include the region to which an item belongs along with the item.

However, for containment hierarchies that are DAGs, the points in the containment hierarchy at which the effective

```
NTSTATUS
WinFSItemAccessCheck(
    WINFS_ITEMID      ItemId,
    DWORD             DesiredAccess,
    HANDLE            ClientToken,
    PPRIVILEGE_SET    pPrivilegeSet)
{
    NTSTATUS          Status;
    PDACL             pExplicitACL = NULL;
    PDACL             pInheritedACLs = NULL;
    DWORD             NumberOfInheritedACLs = 0;
    pExplicitACL = GetExplicitACLForItem(ItemId);
    GetInheritedACLsForItem(ItemId,&pInheritedACLs,&NumberOfInheritedACLs);
    Status = ACLAccessCheck(
                    pOwnerSid,
                    pExplicitACL,
                    DesiredAccess,
                    ClientToken,
                    pPrivilegeSet,
                    &GrantedAccess);
    if (Status != STATUS_SUCCESS)
            return Status;
    if (DesiredAccess == GrantedAccess)
            return STATUS_SUCCESS;
    for (
    i = 0;
    (i < NumberOfInheritedACLs && Status == STATUS_SUCCESS);
    i++ ) {
    GrantedAccessForACL = 0;
                    Status = ACLAccessCheck(
                        pOwnerSid,
                        pExplicitACL,
                        DesiredAccess,
                        ClientToken,
                        pPrivilegeSet,
                        &GrantedAccessForACL);
                    if (Status == STATUS_SUCCESS) {
                        GrantedAccess |= GrantedAccessForACL;
                    }
            }
    If ((Status == STATUS_SUCCESS) &&
        (GrantedAccess != DesiredAccess)) {
            Status = STATUS_ACCESS_DENIED;
    }
    return Status;
}
```

The sphere of influence of the security policy defined at any item covers all the descendants of the item in the containment hierarchy defined on the data store. For all items where in an explicit ACL has been specified. Typically these are the points in the containment hierarchy where in the administrator has explicitly specified an ACL. The second is items that have more than one parent, and the parents have different security policies associated with them. Typically, these are the items that are the confluence points of security policy specified for the volume and indicate the beginning of a new security policy.

With this definition, all the items in the data store fall into one of two categories—those that are the root of an identically protected security region and those that are not. The items that do not define security regions belong to exactly one security region. As in the case of trees, the effective security for an item can be specified by specifying the region to which an item belongs along with the item. This leads to a straight forward model for administering the security of a storage platform data store based upon the various identically protected regions in the store.

2. Detailed Description of the Security Model

This section provide details of how items are secured by describing how the individual rights within a Security Descriptor and its contained ACL's affect various operations.

a) Security Descriptor structure

Before describing the details of the security model, a basic discussion of security descriptors is helpful. A security descriptor contains the security information associated with a securable object. A security descriptor consists of a SECURITY_DESCRIPTOR structure and its associated security information. A security descriptor can include the following security information:

1. SID's for the owner and primary group of an object.
2. A DACL that specifies the access rights allowed or denied to particular users or groups.
3. A SACL that specifies the types of access attempts that generate audit records for the object.
4. A set of control bits that qualify the meaning of a security descriptor or its individual members.

Preferably, applications are not able to directly manipulate the contents of a security descriptor. There are functions for setting and retrieving the security information in an object's security descriptor. In addition, there are functions for creating and initializing a security descriptor for a new object.

A discretionary access control list (DACL) identifies the trustees that are allowed or denied access to a securable object. When a process tries to access a securable object, the system checks the ACEs in the object's DACL to determine whether to grant access to it. If the object does not have a DACL, the system grants full access to everyone. If the object's DACL has no ACEs, the system denies all attempts to access the object because the DACL does not allow any access rights. The system checks the ACEs in sequence until it finds one or more ACEs that allow all the requested access rights, or until any of the requested access rights are denied.

A system access control list (SACL) enables administrators to log attempts to access a secured object. Each ACE specifies the types of access attempts by a specified trustee that cause the system to generate a record in the security event log. An ACE in a SACL can generate audit records when an access attempt fails, when it succeeds, or both. A SACL may also raise an alarm when an unauthorized user attempts to gain access to an object.

All types of ACEs contain the following access control information:

1. A security identifier (SID) that identifies the trustee to which the ACE applies.
2. An access mask that specifies the access rights controlled by the ACE.
3. A flag that indicates the type of ACE.
4. A set of bit flags that determine whether child containers or objects can inherit the ACE from the primary object to which the ACL is attached.

The following table lists the three ACE types supported by all securable objects.

| Type | Description |
| --- | --- |
| Access-denied ACE | Used in a DACL to deny access rights to a trustee. |
| Access-allowed ACE | Used in a DACL to allow access rights to a trustee. |
| System-audit ACE | Used in a SACL to generate an audit record when the trustee attempts to exercise the specified access rights. |

(1) Access Mask Format

All securable objects arrange their access rights using the access mask format shown in the FIG. 26. In this format, the low-order 16 bits are for object-specific access rights, the next 7 bits are for standard access rights, which apply to most types of objects, and the 4 high-order bits are used to specify generic access rights that each object type can map to a set of standard and object-specific rights. The ACCESS_SYSTEM_SECURITY bit corresponds to the right to access the object's SACL.

(2) Generic Access Rights

Generic rights are specified in the 4 high-order bits within the mask. Each type of securable object maps these bits to a set of its standard and object-specific access rights. For example, a file object maps the GENERIC_READ bit to the READ_CONTROL and SYNCHRONIZE standard access rights and to the FILE_READ_DATA, FILE_READ_EA, and FILE_READ_ATTRIBUTES object-specific access rights. Other types of objects map the GENERIC_READ bit to whatever set of access rights is appropriate for that type of object.

Generic access rights can be used to specify the type of access needed when opening a handle to an object. This is typically simpler than specifying all the corresponding standard and specific rights. The following table shows the constants defined for the generic access rights.

| Constant | Generic meaning |
| --- | --- |
| GENERIC_ALL | Read, write, and execute access |
| GENERIC_EXECUTE | Execute access |
| GENERIC_READ | Read access |
| GENERIC_WRITE | Write access |

(3) Standard Access Rights

Each type of securable object has a set of access rights that correspond to operations specific to that type of object. In addition to these object-specific access rights, there is a set of standard access rights that correspond to operations common to most types of securable objects. The following table shows the constants defined for the standard access rights.

| Constant | Meaning |
| --- | --- |
| DELETE | The right to delete the object. |
| READ_CONTROL | The right to read the information in the object's security descriptor, not including the information in the SACL. |

-continued

| Constant | Meaning |
|---|---|
| SYNCHRONIZE | The right to use the object for synchronization. This enables a thread to wait until the object is in the signaled state. Some object types do not support this access right. |
| WRITE_DAC | The right to modify the DACL in the object's security descriptor. |
| WRITE_OWNER | The right to change the owner in the object's security descriptor. | b) Item Specific Rights

In the access mask structure of FIG. 26, item specific rights are placed in the Object Specific Rights section (low order 16-bits). Because in the present embodiment, the storage platform exposes two sets of APIs to administer security—Win32 and the storage platform API, the file system object specific rights must be considered in order to motivate the design of the storage platform object specific rights.

(1) File and Directory Object Specific Rights

Consider the following table:

| Directory | Directory Description | File | File Description | Value |
|---|---|---|---|---|
| FILE_LIST_DIRECTORY | Right to list the contents of the directory | FILE_READ_DATA | Right to read the corresponding file data | 0x0001 |
| FILE_ADD_FILE | Right to create a file in the directory | FILE_WRITE_DATA | Right to write data to the file | 0x0002 |
| FILE_ADD_SUBDIRECTORY | Right to create a subdirectory | FILE_APPEND_DATA | Right to append data to the file | 0x0004 |
| FILE_READ_EA | Right to read extended file attributes | FILE_READ_EA | Right to read extended file attributes | 0x0008 |
| FILE_WRITE_EA | Right to write extended file attributes | FILE_WRITE_EA | Right to write extended file attributes | 0x0010 |
| FILE_TRAVERSE | Right to traverse the directory. | FILE_EXECUTE | For a native code file, the right to execute the file. | 0x0020 |
| FILE_DELETE_CHILD | Right to delete a directory and all the files it contains | None | None | 0x0040 |
| FILE_READ_ATTRIBUTES | Right to read directory attributes | FILE_READ_ATTRIBUTES | Right to read file attributes | 0x0080 |
| FILE_WRITE_ATTRIBUTES | Right to write directory attributes | FILE_WRITE_ATTRIBUTES | Right to write file attributes | 0x0100 |

Referring to the foregoing table, note that file systems make a fundamental distinction between files and directories, which is why the file and directory rights overlap on the same bits. File systems define very granular rights, allowing applications to control behavior on these objects. For instance they allow applications to distinguish among Attributes (FILE_READ/WRITE_ATTRIBUTES), Extended Attributes and the DATA stream associated with the file.

A goal of the security model of the storage platform of the present invention is to simplify the rights assignment model so applications operating on data store items (Contacts, Emails, etc.) generally do not have a need to distinguish between attributes, extended attributes and data streams, for example. However, for files and folders, the granular Win32 rights are preserved and the semantics of access via the storage platform are defined so that compatibility with Win32 applications can be provided. This mapping is discussed with each of the item rights specified below.

The following item rights are specified with their associated allowable operations. The equivalent Win32 rights backing each of these item rights is also provided.

(2) WinFSItemRead

This right allows read access to all elements of the item, including the items linked to the item via embedded relationships. It also allows enumeration of items linked to this item via holding relationships (a.k.a., directory listing). This includes the names of items linked via reference relationships. This right maps to:

File:

(FILE_READ_DATA|SYNCHRONIZE)

Folder:

(FILE_LIST_DIRECTORY|SYNCHRONIZE)

The semantics are that a security application could set WinFSItemReadData and specify the rights mask as a combination of the file rights specified above.

(3) WinFSItemReadAttributes

This right allows read access to basic attributes of the Item, much as file systems distinguish between basic file attributes and data streams. Preferably, these basic attributes are those that reside in the base item that all items derive from. This right maps to:

File:

(FILE_READ_ATTRIBUTES)

Folder:

(FILE_READ_ATTRIBUTES)

(4) WinFSItemWriteAttributes

This right allows write access to basic attributes of the Item, much as file systems distinguish between basic file attributes and data streams. Preferably, these basic attributes reside in the base item that all items derive from. This right maps to:

File:

(FILE_WRITE_ATTRIBUTES)

Folder:

(FILE_WRITE_ATTRIBUTES)

(5) WinFSItemWrite

This right allows the ability to write to all elements of the item, including items linked via embedded relationships. This right also allows the ability to add or delete embedded relationships to other items. This right maps to:

File:
(FILE_WRITE_DATA)
Folder:
(FILE_ADD_FILE)

In the storage platform data store, there is no distinction between items and folders, since items can also have holding Relationships to other items in the data store. Hence, if you have FILE_ADD_SUBDIRECTORY (or FILE_APPEND_DATA) rights, you can have an item be the source of Relationships to other items.

(6) WinFSItemAddLink

This right allows the ability to add holding Relationships to items in the store. It should be noted that since the security model for multiple holding Relationships changes the security on an item and the changes can bypasses WRITE_DAC if coming from a higher point in the hierarchy, WRITE_DAC is required on the destination item in order to be able to create a Relationship to it. This right maps to:

File:
(FILE_APPEND_DATA)
Folder:
(FILE_ADD_SUBDIRECTORY)

(7) WinFSItemDeleteLink

This right allows the ability to delete a holding to an item even if the right to delete that item is not granted to the principal. This is consistent with the file system model and helps with purge. This right maps to:

File:
(FILE_DELETE_CHILD)—Note that file systems do not have a file equivalent to this right, but we have the notion of items having holding Relationships to others and hence carry this right for non-folders as well.
Folder:
(FILE_DELETE_CHILD)

(8) Rights to Delete an Item

An item gets deleted if the last holding Relationship to the item disappears. There is no explicit notion of deleting an item. There is a purge operation which deletes all holding Relationships to an item, but that is a higher level facility and not a system primitive.

Any item specified using a path can be unlinked if either one of two conditions is satisfied: (1) the parent item along that path grants write access to the subject, or (2) the standard rights on the item itself grant DELETE. When the last Relationship is removed, the item disappears from the system. Any item specified using the ItemID can be unlinked if the standard rights on the item itself grant DELETE.

(9) Rights to Copy an Item

An item can be copied from a source to a destination folder if the subject is granted WinFSItemRead on the item and WinFSItemWrite on the destination folder.

(10) Rights to Move an Item

Move file in the file system requires just the DELETE right on the source file and FILE_ADD_FILE on the destination directory, since it preserves the ACL on the destination. However, a flag can be specified in the MoveFileEx call (MOVEFILE_COPY_ALLOWED) that lets an application specify that it in the case of a cross-volume move, it can tolerate CopyFile semantics. There are 4 potential choices with respect to what happens with the security descriptor upon a move:

1. Carry the entire ACL with the file—default intra-volume move semantics.
2. Carry the entire ACL with the file and mark the ACL as protected.
3. Carry just the explicit ACEs across and re-inherit on the destination.
4. Carry nothing and re-inherit on the destination—default inter-volume move semantics—same as copy file.

In the present security model, if an application specifies the MOVEFILE_COPY_ALLOWED flag, the fourth option is performed for both the inter- and intra-volume cases. If this flag is not specified, the second option is performed unless the destination is also in the same security region (i.e., same inheritance semantics). A storage platform level move implements the fourth choice as well and requires READ_DATA on the source, much as a copy would.

(11) Rights to View the Security Policy on an Item

An item's security can be viewed if the item grants the standard right READ_CONTROL to the subject.

(12) Rights to Change the Security Policy on an Item

An item's security can be changed if the item grants the standard right WRITE_DAC to the subject. However, since the data store provides implicit inheritance, this has implications on how security can be changed on hierarchies. The rule is that if the root of the hierarchy grants WRITE_DAC, then the security policy is changed on the entire hierarchy regardless of whether specific items within the hierarchy (or DAG) do not grant WRITE_DAC to the subject.

(13) Rights that Don't have a Direct Equivalent

In the present embodiment, FILE_EXECUTE (FILE_TRAVERSE for directories) do not have a direct equivalent in the storage platform. The model keeps these for Win32 compatibility, but does not have any access decisions made for items based on these rights. As for FILE_READ/WRITE_EA, because data store items do not have notions of extended attributes, semantics for this bit are not provided. However, the bit remains for Win32 compatibility.

3. Implementation

All the items that define identically protected regions have an entry associated with them in a security table. The security table is defined as follows:

| Item Identity | Item Ordpath | Explicit Item ACL | Path ACLs | Region ACLs |
| --- | --- | --- | --- | --- |

The Item Identity entry is the Item Identity of the root of an identically protected security region. The Item Ordpath entry is the ordpath associated with the root of the identically protected security region. The Explicit Item ACL entry is the explicit ACL defined for the root of the identically protected security region. In some cases this can be NULL, e.g., when a new security region is defined because the item has multiple parents belonging to different regions. The Path ACLs entry is the set of ACL's inherited by the item, and the Region ACLs entry is the set of ACL's defined for the identically protected security region associated with the item.

The computation of effective security for any item in a given store leverages this table. In order to determine the security policy associated with an item, the security region associated with the item is obtained and the ACL's associated with that region are retrieved.

As the security policy associated with an item is changed either by directly adding explicit ACL's or indirectly by adding holding Relationships that result in the formation of new security regions, the security table is kept up to date to ensure that the above algorithm for determining the effective security of an item is valid.

The various changes to the store and the accompanying algorithms to maintain the security table are as follows:

a) Creating a New Item in a Container

When an item is newly created in a container, it inherits all the ACL's associated with the container. Since the newly created item has exactly one parent it belongs to the same region as its parent. Thus there is no need to create a new entry in the security table.

b) Adding an Explicit ACL to an Item.

When an ACL is added to an item, it defines a new security region for all its descendants in the containment hierarchy that belong to the same security region as the given item itself. For all the items that belong to other security regions but are descendants of the given item in the containment hierarchy, the security region remains unchanged but the effective ACL associated with the region is changed to reflect the addition of the new ACL.

The introduction of this new security region can trigger further region definitions for all those items which have multiple holding Relationships with ancestors that straddle the old security region and the newly defined security region. For all such items a new security region needs to be defined and the procedure repeated.

Figure 27:
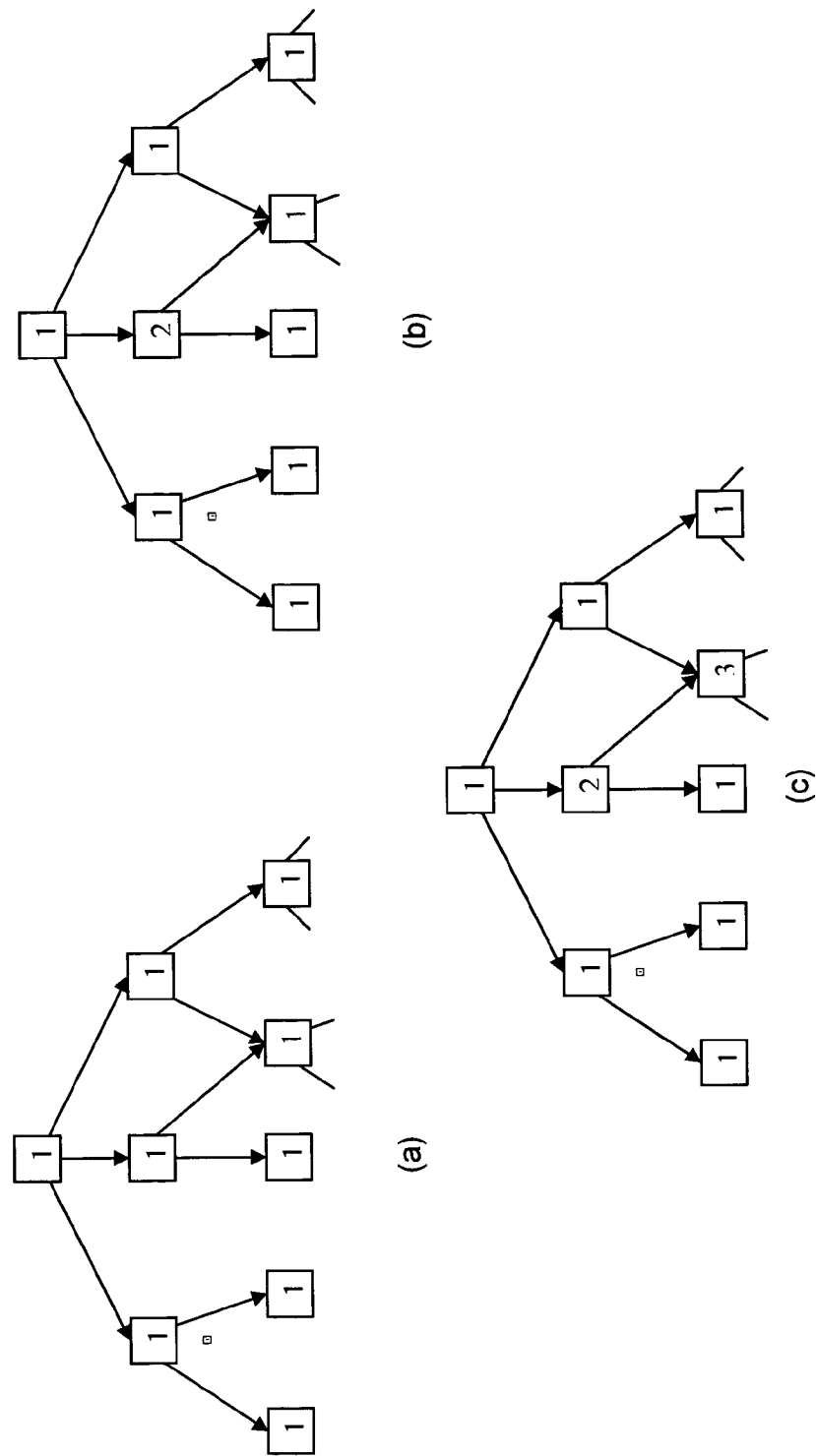
FIGS. 27(*a*), (*b*), and (*c*) depict a new identically protected security region being carved out of an existing security region, in accordance with an embodiment of one aspect of the present invention.

FIGS. 27(a), (b), and (c) depict a new identically protected security region being carved out of an existing security region by introducing a new explicit ACL. This is indicated by the node marked 2. However, the introduction of this new region results in an additional region 3 being created because of an item having multiple holding Relationships.

The following sequence of updates to the security tables reflect the factoring of the identically protected security regions.

c) Adding a Holding Relationship to an Item

When a holding Relationship is added to an item it gives rise to one of three possibilities. If the target of the holding Relationship, i.e., the item under consideration is the root of a security region, the effective ACL associated with the region is changed and no further modifications to the security table is required. If the security region of the source of the new holding Relationship is identical to the security region of the existing parents of the item no changes are required. However, if the item now has parents that belong to different security regions, then a new security region is formed with the given item as the root of the security region. This change is propagated to all the items in the containment hierarchy by modifying the security region associated with the item. All the items that belong to the same security region as the item under consideration and its descendants in the containment hierarchy need to be changed. Once the change is made, all the items that have multiple holding Relationships must be examined to determine if further changes are required. Further changes may be required if any of these items have parents of different security regions.

d) Deleting a Holding Relationship from an Item

When a holding Relationship is deleted from an item it is possible to collapse a security region with its parent region if certain conditions are satisfied. More precisely this can be accomplished under the following conditions: (1) if the removal of the holding Relationship results in an item that has one parent and no explicit ACL is specified for that item; (2) if the removal of the holding Relationship results in an item whose parent's are all in the same security region and no explicit ACL is defined for that item. Under these circumstances the security region can be marked to be the same as the parent. This marking needs to be applied to all the items whose security region corresponds to the region being collapsed.

e) Deleting an Explicit ACL from an Item

When an explicit ACL is deleted from an item, it is possible to collapse the security region rooted at that item with that of its parents. More precisely, this can be done if the removal of the explicit ACL results in an item whose parents in the containment hierarchy belong to the same security region. Under these circumstances, the security region can be marked to be the same as the parent and the change applied to all the items whose security region corresponds to the region being collapsed.

f) Modifying an ACL Associated with an Item

In this scenario, no new additions to the security table are required. The effective ACL associated with the region is updated and the new ACL change is propagated to the security regions that are affected by it.

F. Notifications and Change Tracking

According to another aspect of the present invention, the storage platform provides a notifications capability that allows applications to track data changes. This feature is primarily intended for applications which maintain volatile state or execute business logic on data change events. Applications register for notifications on items, item extensions and item relationships. Notifications are delivered asynchronously after data changes have been committed. Applications may filter notifications by item, extension and relationship type as well as type of operation.

According to one embodiment, the storage platform API 322 provides two kinds of interfaces for notifications. First, applications register for simple data change events triggered by changes to items, item extensions and item relationships. Second, applications create "watcher" objects to monitor sets of items, item extensions and relationships between items. The state of a watcher object can be saved and re-created after a system failure or after a system has gone off-line for an extended period of time. A single notification may reflect multiple updates.

1. Storage Change Events

This section provide a few examples of how the notification interfaces provided by the storage platform API 322 are used.

a) Events

Items, ItemExtensions and ItemRelationships expose data change events which are used by applications to register for data change notifications. The following code sample shows the definition of the ItemModified and ItemRemoved event handlers on the base Item class.

```
// Events
   public event ItemModifiedEventHandler Item_ItemModified;
   public event ItemRemovedEventHandler Item_ItemRemoved;
```

All notifications carry sufficient data to retrieve the changed item from the data store. The following code sample shows how to register for events on an Item, ItemExtension, or ItemRelationship:

```
myItem.ItemModified += new
    ItemModifiedEventHandler(this.onItemUpdate);
myItem.ItemRemoved += new
    ItemRemovedEventHandler(this.onItemDelete);
```

In the present embodiment, the storage platform guarantees that applications will be notified if the respective item has been modified or deleted since last delivering a notification or in case of a new registration since last fetched from the data store.

b) Watchers

In the present embodiment, the storage platform defines watcher classes for monitoring objects associated with a (1) folder or folder hierarchy, (2) an item context or (3) a specific item. For each of the three categories, the storage platform provides specific watcher classes which monitor associated items, item extensions or item relationships, e.g. the storage platform provides the respective FolderItemWatcher, FolderRelationshipWatcher and FolderExtensionWatcher classes.

When creating a watcher, an application may request notifications for pre-existing items, i.e. items, extensions or relationships. This option is mostly for applications which maintain a private item cache. If not requested, applications receive notifications for all updates which occur after the watcher object has been created.

Together with delivering notifications, the storage platform supplies a "WatcherState" object. The WatcherState can be serialized and saved on disk. The watcher state can subsequently be used to re-create the respective watcher after a failure or when reconnecting after going off-line. The newly re-created watcher will re-generate un-acknowledged notifications. Applications indicate delivery of a notification by calling the "Exclude" method on the respective watcher state supplying a reference to a notification.

The storage platform delivers separate copies of the watcher state to each event handler. Watcher states received on subsequent invocations of the same event handler presume delivery of all previously received notifications By way of example, the following code sample shows the definition of a FolderItemWatcher.

```
public class FolderItemWatcher : Watcher
{
    // Constructors
    public FolderItemWatcher_Constructor(Folder folder);
    public FolderItemWatcher_Constructor1(Folder folder,
    Type itemType);
    public FolderItemWatcher_Constructor2(ItemContext context,
    ItemId folderId);
    public FolderItemWatcher_Constructor3(Folder folder,
    Type itemType,
    FolderItemWatcherOptions options);
    public FolderItemWatcher_Constructor4(ItemContext context,
    ItemId folderId, Type itemType);
    public FolderItemWatcher_Constructor5(ItemContext context,
    ItemId folderId, Type itemType,
    FolderItemWatcherOptions options);
    // Properties
    public ItemId FolderItemWatcher_FolderId {get;}
    public Type FolderItemWatcher_ItemType {get;}
    public FolderItemWatcherOptions FolderItemWatcher_Options {get;}
    // Events
    public event ItemChangedEventHandler
    FolderItemWatcher_ItemChanged;
}
```

The following code sample shows how to create a folder watcher object for monitoring the contents of a folder. The watcher generates notifications, i.e. events, when new music items are added or existing music items are updated or deleted. Folder watchers either monitor a particular folder or all folders within a folder hierarchy.

```
myFolderItemWatcher = new FolderItemWatcher(myFolder,
    typeof(Music));
myFolderItemWatcher.ItemChanged += new
    ItemChangedEventHandler(this.onItemChanged);
```

2. Change Tracking and Notification Generation Mechanism

Figure 13:
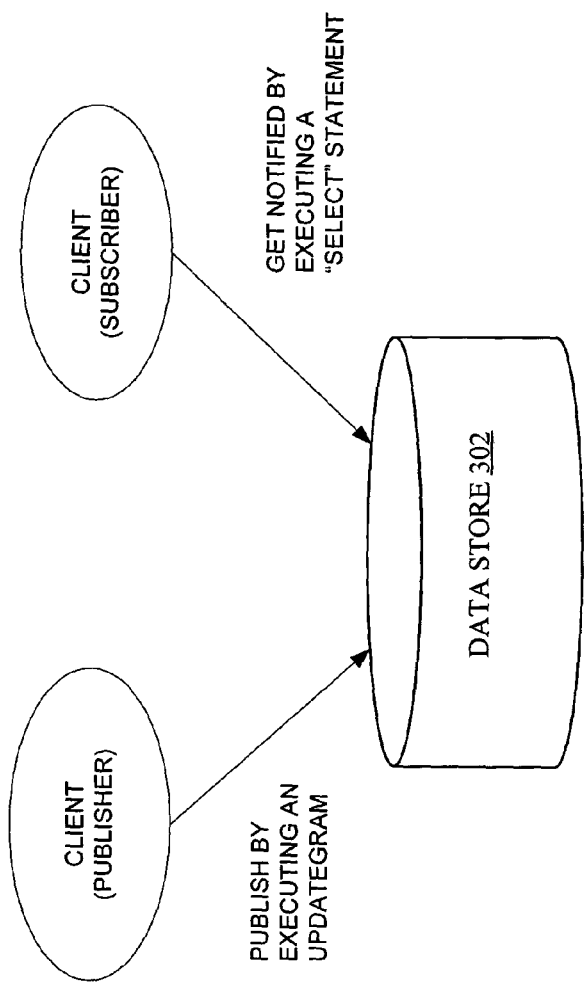
FIG. 13 is a diagram illustrating a notification mechanism, in accordance with an embodiment of the present invention.

The storage platform provides a simple, yet efficient mechanism to track data changes and generate notifications. A client retrieves notifications on the same connection used to retrieve data. This greatly simplifies security checks, removes latencies and constraints on possible network configurations. Notifications are retrieved by issuing select statements. To prevent polling, clients may use a "waitfor" feature provided by the database engine 314. FIG. 13 shows the basic storage platform notification concept. This waitfor query may be executed synchronously, in which case the calling thread is blocked until results are available, or asynchronously, in which case the thread is not blocked and results are returned on a separate thread, when available.

A combination of "waitfor" and "select" is attractive for monitoring data changes which fit into a particular data range as changes can be monitored by setting a notification lock on the respective data range. This holds for many common storage platform scenarios. Changes to individual items can be efficiently monitored by setting notification locks on the respective data range. Changes to folders and folder trees can be monitored by setting notification locks on path ranges. Changes to types and its subtypes can be monitored by setting notification locks on type ranges.

In general, there are three distinct phases associated with processing notifications: (1) data change or even detection, (2) subscription matching and (3) notification delivery. Excluding synchronous notification delivery, i.e. notification delivery as part of the transaction performing the data change, the storage platform can implement two forms of notification delivery:

1) Immediate Event Detection: Event detection and subscription matching is performed as part of the update transaction. Notifications are inserted into a table monitored by the subscriber; and 2) Deferred Event Detection: Event detection and subscription matching is performed after the update transaction has been committed. Subsequently the actual subscriber or an intermediary detects events and generates notifications.

Immediate event detection requires additional code to be executed as part of update operations. This allows the capture of all events of interest including events indicating a relative state change.

Deferred event detection removes the need to add additional code to update operations. Event detection is done by the ultimate subscriber. Deferred event detection naturally batches event detection and event delivery and fits well with the query execution infrastructure of the database engine 314 (e.g., SQL Server).

Deferred event detection relies on a log or trace left by update operations. The storage platform maintains a set of logical timestamps together with tombstones for deleted data items. When scanning the data store for changes, clients supply a timestamp which defines a low watermark for detecting changes and a set of timestamps to prevent duplicate notifications. Applications might receive notifications for all changes which happened after the time indicated by the low watermark.

Sophisticated applications with access to core views can further optimize and reduce the number of SQL statements necessary to monitor a potentially large set of items by creating private parameter and duplicate filter tables. Applications with special needs such as those having to support rich views can use the available change tracking framework to monitor data changes and refresh their private snapshots.

Preferably, therefore, in one embodiment, the storage platform implements a deferred event detection approach, as described more fully below.

a) Change Tracking

All items, extensions and item relationship definitions carry a unique identifier. Change tracking maintains a set of logical timestamps to record creation, update and deletion times for all data items. Tombstone entries are used to represent deleted data items.

Applications use that information to efficiently monitor whether a particular item, item extension or item relationship has been newly added, updated or deleted since the application last accessed the data store. The following example illustrates this mechanism.

```
create table [item-extension-relationship-table-template] (
    identifier uniqueidentifier not null default newid( )
    created bigint,     not null, -- @ @ dbts when created
    updated bigint,     not null, -- @ @ dbts when last updated
    ...
)
```

All deleted items, item extensions and relationships are recorded in a corresponding tombstone table. A template is shown below.

```
create table [item-extension-relationship-tombstone table-template] (
    identifier uniqueidentifier not null,
    deleted bigint      not null, -- @ @ dbts when deleted,
    created bigint      not null, -- @ @ dbts when created
    upated bigint       not null, -- @ @ dbts when last updated
    ...
)
```

For efficiency reasons, the storage platform maintains a set of global tables for items, item extensions, relationships and pathnames. Those global lookup tables can be used by applications to efficiently monitor data ranges and retrieve associated timestamp and type information.

b) Timestamp Management

Logical timestamps are "local" to a database store, i.e. storage platform volume. Timestamps are monotonically increasing 64-bit values. Retaining a single timestamp is often sufficient to detect whether a data change occurred after last connecting to a storage platform volume. However, in most realistic scenarios, a few more timestamps need to be kept to check for duplicates. The reasons are explained below.

Relational database tables are logical abstractions built on top of a set of physical data structures, i.e. B-Tree's, heaps etc. Assigning a timestamp to a newly created or updated record is not an atomic action. Inserting that record into the underlying data structures may happen at different times, thus applications may see records out of order.

Figure 14:
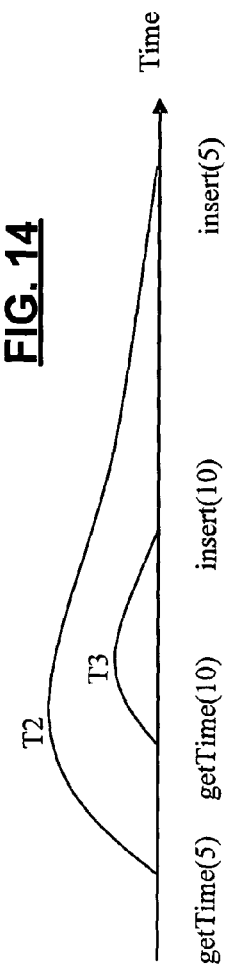
FIG. 14 is a diagram illustrating an example in which two transactions are both inserting a new record into the same B-Tree.

FIG. 14 shows two transactions both inserting a new record into the same B-Tree. Since transaction T3 inserts its record before transaction T2's insert is scheduled, an application scanning the B-Tree may see the records inserted by transaction T3 before those inserted by T2. Thus, the reader may incorrectly assume that he has seen all records created up to time "10". To resolve this issue, the database engine 314 provides a function which returns a low water mark up to which all updates have committed and been inserted into the respective underlying data structures. In the example above, the low watermark returned would be "5," assuming that the reader started before transaction T2 had been committed. The low watermark provided by the database engine 314 allows applications to efficiently determine which items to ignore when scanning the database or a data range for data changes. In general, ACID transactions are assumed to last a very short time thus, low watermarks are expected to be very close to the most recently dispensed timestamp. In the presence of long lasting transactions, applications might have to keep individual timestamps to detect and discard duplicates.

c) Data Change Detection—Event Detection

Figure 15:
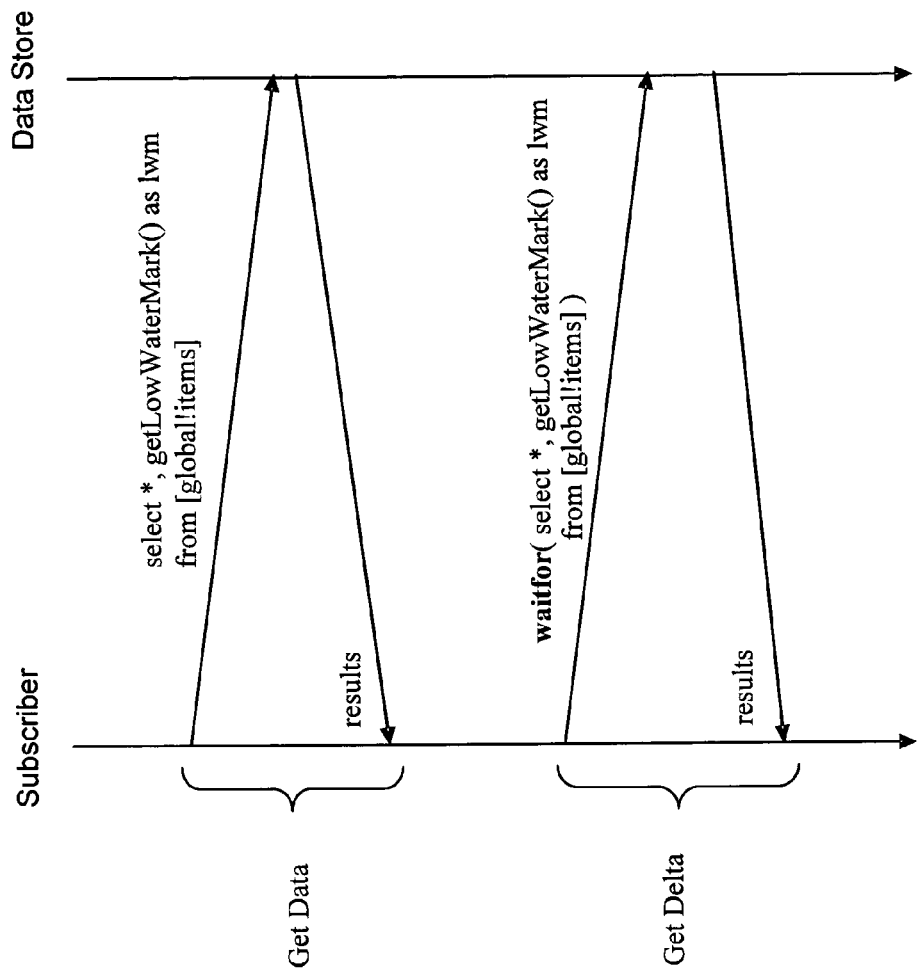
FIG. 15 illustrates a data change detection process in accordance with an embodiment of the present invention.

When querying the data store, applications obtain a low watermark. Subsequently, applications use that watermark to scan the data store for entries whose creation, update or delete timestamp is greater than the low watermark returned. FIG. 15 illustrates this process.

To prevent duplicate notifications, applications remember timestamps which are greater than the low watermark returned and use those to filter out duplicates. Applications create session local temporary tables to efficiently handle a large set of duplicate timestamps. Before issuing a select statement, an application inserts all duplicate timestamps previously returned and deletes those which are older than the last low watermark returned, as illustrated below.

```
delete from $duplicates where ts < @ oldLowWaterMark;
insert into $duplicates(ts) values( . . . ), . . . , ( . . . );
waitfor( select *, getLowWaterMark( ) as newLowWaterMark
    from [global!items]
        where updated >= @oldLowWaterMark
        and updated not in (select * from $duplicates))
```

G. Synchronization

According to another aspect of the present invention, the storage platform provides a synchronization service 330 that (i) allows multiple instances of the storage platform (each with its own data store 302) to synchronize parts of their content according to a flexible set of rules, and (ii) provides an infrastructure for third parties to synchronize the data store of the storage platform of the present invention with with other data sources that implement proprietary protocols.

Storage platform-to-storage platform synchronization occurs among a group of participating replicas. For example, with reference to FIG. 3, it may be desirable to provide synchronization between the data store 302 of the storage platform 300 with another remote data store 338 under the control of another instance of the storage platform, perhaps running on a different computer system. The total membership of this group is not necessarily known to any given replica at any given time.

Different replicas can make the changes independently (i.e. concurrently). The process of synchronization is defined as making every replica aware of the changes made by other replicas. This synchronization capability is inherently multi-master.

The synchronization capability of the present invention allows replicas to:
  determine which changes another replica is aware of;
  request information about changes that this replica is not aware of;
  convey information about changes that the other replica is not aware of;
  determine when two changes are in conflict with each other;
  apply changes locally;
  convey conflict resolutions to other replicas to ensure convergence; and
  resolve the conflicts based on specified policies for conflict resolutions.

1. Storage Platform-to-Storage Platform Synchronization

The primary application of the synchronization service 330 of the storage platform of the present invention is to synchronize multiple instances of the storage platform (each with its own data store). The synchronization service operates at the level of the storage platform schemas (rather than the underlying tables of the database engine 314). Thus, for example, "Scopes" are used to define synchronization sets as discussed below.

The synchronization service operates on the principle of "net changes". Rather than recording and sending individual operations (such as with transactional replication), the synchronization service sends the end-result of those operations, thus often consolidating the results of multiple operations into a single resulting change.

The synchronization service does not in general respect transaction boundaries. In other words, if two changes are made to a storage platform data store in a single transaction, there is no guarantee that these changes are applied at all other replicas atomically—one may show up without the other. The exception to this principle is that if two changes are made to the same Item in the same transaction, then these changes are guaranteed to be sent and applied to other replicas atomically. Thus, Items are the consistency units of the synchronization service.

a) Synchronization (Sync) Controlling Applications

Any application can connect to the synchronization service and initiate a sync operation. Such an application provides all of the parameters needed to perform synchronization (see sync profile below). Such applications are referred to herein as Sync Controlling Applications (SCAs).

When synchronizing two storage platform instances, sync is initiated on one side by an SCA. That SCA informs the local synchronization service to synchronize with the remote partner. On the other side, the synchronization service is awoken by the messages sent by the synchronization service from the originating machine. It responds based on the persistent configuration information (see mappings below) present on the destination machine. The synchronization service can be run on schedule or in response to events. In these cases, the synchronization service implementing the schedule becomes the SCA.

To enable synchronization, two steps need to be taken. First, the schema designer must annotate the storage platform schema with appropriate sync semantics (designating Change Units as described below). Second, synchronization must be properly configured on all of the machines having an instance of the storage platform that is to participate in the synchronization (as described below).

b) Schema annotation

A fundamental concept of the synchronization service is that of a Change Unit. A Change Unit is a smallest piece of schema that is individually tracked by the storage platform. For every Change Unit, the synchronization service may be able to determine whether it changed or did not change since the last sync.

Designating Change Units in the schema serves several purposes. First, it determines how chatty the synchronization service is on the wire. When a change is made inside a Change Unit, the entire Change Unit is sent to the other replicas, since the synchronization service does not know which part of the Change Unit was changed. Second, it determines the granularity of conflict detection. When two concurrent changes (these terms are defined in detail in subsequent sections) are made to the same change unit, the synchronization service raises a conflict; on the other hand, if concurrent changes are made to different change units, then no conflict is raised and the changes are automatically merged. Third, it strongly affects the amount of meta-data kept by the system. Much of the synchronization service meta-data is kept per-Change Unit; thus, making Change Units smaller increases the overhead of sync.

Defining Change Units requires finding the right trade-offs. For that reason, the synchronization service allows schema designers to participate in the process.

In one embodiment, the synchronization service does not support Change Units that are larger than an element. However, it does support the ability for schema designers to specify smaller change units than an element—namely, grouping multiple attributes of an element into a separate Change Unit. In that embodiment, this is accomplished using the following syntax:

```
<Type Name="Appointment" MajorVersion="1"
MinorVersion="0" ExtendsType="Base.Item"
        Extends Version="1">
    <Field Name="MeetingStatus" Type="the storage
    platformTypes.uniqueidentifier" Nullable="False"/>
    <Field Name="OrganizerName" Type="the storage
    platformTypes.nvarchar(512)" Nullable="False"/>
    <Field Name="OrganizerEmail" Type="the storage
    platformTypes.nvarchar(512)"
        TypeMajorVersion="1"      MultiValued="True"/>
    ...
    <ChangeUnit Name="CU_Status">
        <Field Name="MeetingStatus"/>
    </ChangeUnit>
    <ChangeUnit Name="CU_Organizer"/>
        <Field Name="OrganizerName" />
        <Field Name="OrganizerEmail" />
    </ChangeUnit>
    ...
</Type>
``` c) Sync Configuration

A group of storage platform partners that wish to keep certain parts of their data in sync are referred to as a sync community. While the members of the community want to stay in sync, they do not necessarily represent the data in exactly the same way; in other words, sync partners may transform the data they are synchronizing.

In a peer-to-peer scenario, it is impractical for peers to maintain transformation mappings for all of their partners. Instead, the synchronization service takes the approach of defining "Community Folders". A community folder is an abstraction that represents a hypothetical "shared folder" that all community members are synchronizing with.

This notion is best illustrated by an example. If Joe wants to keep My Documents folders of his several computers in sync, Joe defines a community folder called, say, JoesDocuments. Then, on every computer, Joe configures a mapping between the hypothetical JoesDocuments folder and the local My Documents folder. From this point on, when Joe's computers synchronize with each other, they talk in terms of documents in JoesDocuments, rather than their local items. This way, all Joe's computers understand each other without having to know who the others are—the Community Folder becomes the lingua franca of the sync community.

Configuring the synchronization service consists of three steps: (1) defining mappings between local folders and community folders; (2) defining sync profiles that determine what gets synchronized (e.g. whom to sync with and which subsets should be sent and which received); and (3) defining the schedules on which different sync profiles should run, or running them manually.

(1) Community Folder—Mappings

Community Folder mappings are stored as XML configuration files on individual machines. Each mapping has the following schema:

/mappings/communityFolder

This element names the community folder that this mapping is for. The name follows the syntax rules of Folders.

/mappings/localFolder

This element names the local folder that the mapping transforms into. The name follows the syntax rules of Folders. The folder must already exist for the mapping to be valid. The items within this folder are considered for synchronization per this mapping.

/mappings/transformations

This element defines how to transform items from the community folder to the local folder and back. If absent or empty, no transformations are performed. In particular, this means that no IDs are mapped. This configuration is primarily useful for creating a cache of a Folder.

/mappings/transformations/mapIDs

This element requests that newly generated local IDs be assigned to all of the items mapped from the community folder, rather than reusing community IDs. The Sync Runtime will maintain ID mappings to convert items back and forth.

/mappings/transformations/localRoot

This element requests that all root items in the community folder be made children of the specified root.

/mappings/runAs

This element controls under whose authority requests against this mapping are processed. If absent, sender is assumed.

/mappings/runAs/sender

The presence of this element indicates that the sender of messages to this mapping must be impersonated, and requests processed under his credentials.

(2) Profiles

A Sync Profile is a total set of parameters needed to kick off synchronization. It is supplied by an SCA to the Sync Runtime to initiate sync. Sync profiles for storage platform-to-storage platform synchronization contain the following information:

Local Folder, to serve as the source and destination for changes;

Remote Folder name to synchronize with—this Folder must be published from the remote partner by way of a mapping as defined above;

Direction—the synchronization service supports send-only, receive-only, and send-receive sync;

Local Filter—selects what local information to send to the remote partner. Expressed as a the storage platform query over the local folder;

Remote Filter—selects what remote information to retrieve from the remote partner—expressed as a storage platform query over the community folder;

Transformations—defines how to transform items to and from the local format;

Local security—specifies whether the changes retrieved from the remote endpoint are to be applied under the permissions of the remote endpoint (impersonated) or the user initiating the sync locally; and Conflict resolution policy—specifies whether conflicts should be rejected, logged, or automatically resolved—in the latter case, it specifies which conflict resolver to use, as well as the configuration parameters for it.

The synchronization service provides a runtime CLR class that allows simple building of Sync Profiles. Profiles can also be serialized to and from XML files for easy storage (often alongside schedules). However, there is no standard place in the storage platform where all the profiles are stored; SCAs are welcome to construct a profile on the spot without ever persisting it. Note that there is no need to have a local mapping to initiate sync. All sync information can be specified in the profile. The mapping is, however, required in order to respond to sync requests initiated by the remote side.

(3) Schedules

In one embodiment, the synchronization service does not provide its own scheduling infrastructure. Instead, it relies on another component to peform this task—the Windows Scheduler available with the Microsoft Windows operating system. The synchronization service includes a command-line utility that acts as an SCA and triggers synchronization based on a sync profile saved in an XML file. This utility makes it very easy to configure the Windows Scheduler to run synchronization either on schedule, or in response to events such as user logon or logoff.

d) Conflict Handling

Conflict handling in the synchronization service is divided into three stages: (1) conflict detection, which occurs at change application time—this step determines if a change can be safely applied; (2) automatic conflict resolution and logging—during this step (that takes place immediately after the conflict is detected) automatic conflict resolvers are consulted to see if the conflict can be resolved—if not, the conflict can be optionally logged; and (3) conflict inspection and resolution—this step takes place if some conflicts have been logged, and occurs outside of the context of the sync session—at this time, logged conflicts can be resolved and removed from the log.

(1) Conflict Detection

In the present embodiment, the synchronization service detects two types of conflicts: knowledge-based and constraint-based.

(a) Knowledge-Based Conflicts

A knowledge-based conflict occurs when two replicas make independent changes to the same Change Unit. Two changes are called independent if they are made without knowledge of each other—in other words, the version of the first is not covered by the knowledge of the second and vice versa. The synchronization service automatically detects all such conflicts based on the replicas' knowledge as described above.

It is sometimes helpful to think of conflicts as forks in the version history of a change unit. If no conflicts occur in the life of a change unit, its version history is a simple chain—each change occurring after the previous one. In the case of a knowledge-based conflict, two changes occur in parallel, causing the chain to split and become a version tree.

(b) Constraint-based conflicts

There are cases where independent changes violate an integrity constraint when applied together. For instance, two replicas creating a file with the same name in the same directory could cause such a conflict to occur.

A constraint-based conflict involves two independent changes Oust like a knowledge-based one), but they do not affect the same change unit. Rather, they affect different change units but with a constraint existing between them.

The synchronization service detects constraint violations at change application time and raises constraint-based conflicts automatically. Resolving constraint-based conflicts usually requires custom code that modifies the changes in such as way as to not violate the constraint; The synchronization service does not provide a general-purpose mechanism for doing so.

(2) Conflict Processing

When a conflict is detected, the synchronization service can take one of three actions (selected by the sync initiator in the Sync Profile): (1) reject the change, returning it back to sender; (2) log a conflict into a conflict log; or (3) resolve the conflict automatically.

If the change is rejected, the synchronization service acts as if the change did not arrive at the replica. A negative acknowledgement is sent back to the originator. This resolution policy is primarily useful on head-less replicas (such as file servers) where logging conflicts is not feasible. Instead, such replicas force the others to deal with the conflicts by rejecting them.

Sync initiators configure conflict resolution in their Sync Profiles. The synchronization service supports combining multiple conflict resolvers in a single profile in the following ways—first, by specifying a list of conflict resolvers to be tried one after another, until one of them succeeds; and second, by associating conflict resolvers with conflict types, e.g. directing update-update knowledge-based conflicts to one resolver, but all the other conflicts to the log.

(a) Automatic Conflict Resolution

The synchronization service provides a number of default conflict resolvers. This list includes:

local-wins: disregard incoming changes if in conflict with locally stored data;

remote-wins: disregard local data if in conflict with incoming changes;

last-writer-wins: pick either local-wins or remote-wins per change unit based on the timestamp of the change (note that the synchronization service in general does not rely on clock values; this conflict resolver is the sole exception to that rule);

Deterministic: pick a winner in a manner that is guaranteed to be the same on all replicas, but not otherwise meaningful—one embodiment of the synchronization services uses lexicographic comparisons of partner IDs to implement this feature.

In addition, ISVs can implement and install their own conflict resolvers. Custom conflict resolvers may accept configuration parameters; such parameters must be specified by the SCA in the Conflict Resolution section of the Sync Profile.

When a conflict resolver handles a conflict, it returns the list of operations that need to be performed (in lieu of the conflicting change) back to the runtime. The synchronization service then applies these operations, having properly adjusted remote knowledge to include what the conflict handler has considered.

It is possible that another conflict is detected while applying the resolution. In such a case, the new conflict must be resolved before the original processing resumes.

When thinking of conflicts as branches in the version history of an item, conflict resolutions can be viewed as joins—combining two branches to form a single point. Thus, conflict resolutions turn version histories into DAGs.

(b) Conflict Logging

A very particular kind of a conflict resolver is the Conflict Logger. The synchronization service logs conflicts as Items of type ConflictRecord. These records are related back to the items that are in conflict (unless the items themselves have been deleted). Each conflict record contains: the incoming change that caused the conflict; the type of the conflict: update-update, update-delete, delete-update, insert-insert, or constraint; and the version of the incoming change and the knowledge of the replica sending it. Logged conflicts are available for inspection and resolution as described below.

(c) Conflict Inspection and Resolution

The synchronization service provides an API for applications to examine the conflict log and to suggest resolutions of the conflicts in it. The API allows application to enumerate all conflicts, or conflicts related to a given Item. It also allows such applications to resolve logged conflicts in one of three ways: (1) remote wins—accepting the logged change and overwriting the conflicting local change; (2) local wins—ignoring conflicting parts of the logged change; and (3) suggest new change—where the application proposes a merge that, in its opinion, resolves the conflict. Once conflicts are resolved by an application, the synchronization service removes them from the log.

(d) Convergence of Replicas and Propagation of Conflict Resolutions

In complex synchronization scenarios, the same conflict can be detected at multiple replicas. If this occurs, several things can happen: (1) the conflict can be resolved on one replica, and the resolution be sent to the other; (2) the conflict is resolved on both replicas automatically; or (3) the conflict is resolved on both replicas manually (through the conflict inspection API).

To ensure convergence, the synchronization service forwards conflict resolutions to other replicas. When a change that resolves a conflict arrives at a replica, the synchronization service automatically finds any conflict records in the log that are resolved by this update and eliminates them. In this sense, a conflict resolution at one replica is binding on all the other replicas.

If different winners are chosen by different replicas for the same conflict, the synchronization service applies the principle of binding conflict resolution and picks one of the two resolutions to win over the other automatically. The winner is picked in a deterministic fashion that is guaranteed to produce the same results at all times (one embodiment uses replica ID lexicographic comparisons).

If different "new changes" are suggested by different replicas for the same conflict, the synchronization service treats this new conflict as a special conflict and uses the Conflict Logger to prevent it from propagating to other replicas. Such situation commonly arises with manual conflict resolution.

2. Synchronizing to Non-Storage Platform Data Stores

According to another aspect of the storage platform of the present invention, the storage platform provides an architecture for ISVs to implement Sync Adapters that allow the storage platform to synchronize to legacy systems such as Microsoft Exchange, AD, Hotmail, etc. Sync Adapters benefit from the many Sync Service provided by the synchronization service, as described below.

Despite the name, Sync Adapters do not need to be implemented as plug-ins into some storage platform architecture. If desired, a "sync adapter" can simply be any application that utilizes the synchronization service runtime interfaces to obtain services such as change enumeration and application.

In order to make it simpler for others to configure and run synchronization to a given backend, Sync Adapter writers are encouraged to expose the standard Sync Adapter interface, which runs sync given the Sync Profile as described above. The profile provides configuration information to the adapter, some of which adapters pass to the Sync Runtime to control runtime services (e.g. the Folder to synchronize).

a) Sync Services

The synchronization service provides a number of sync services to adapter writers. For the rest of this section, it is convenient to refer to the machine on which the storage platform is doing synchronization as the "client" and the non-storage platform backend that the adapter is talking to as the "server".

(1) Change Enumeration

Based on the change-tracking data maintained by the synchronization service, Change Enumeration allows sync adapters to easily enumerate the changes that have occurred to a data store Folder since the last time synchronization with this partner was attempted.

Changes are enumerated based on the concept of an "anchor"—an opaque structure that represents information about the last synchronization. The anchor takes the form of the storage platform Knowledge, as described in the proceeding sections. Sync adapters utilizing change enumeration services fall into two broad categories: those using "stored anchors" vs. those using "supplied anchors".

The distinction is based on where the information about the last sync is stored—on the client, or on the server. It is often easier for adapters to store this information on the client—the backend is often not capable of conveniently storing this information. On the other hand, if multiple clients synchronize to the same backend, storing this information on the client is inefficient and in some cases incorrect—it makes one client unaware of the changes that the other client has already pushed up to the server. If an adapter wants to use a server-stored anchor, the adapter needs to supply it back to the storage platform at the time of change enumeration.

In order for the storage platform to maintain the anchor (either for local or remote storage), the storage platform needs to be made aware of the changes that were successfully applied at the server. These and only these changes can be included in the anchor. During change enumeration, Sync Adapters use an Acknowledgement interface to report which changes were successfully applied. At the end of synchronization, adapters using supplied anchors must read the new anchor (which incorporates all of the successfully-applied changes) and send it to their backend.

Often, Adapters need to store adapter-specific data along with the items they insert into the storage platform data store. Common examples of such data are remote IDs and remote versions (timestamps). The synchronization service provides a mechanism for storing this data, and Change Enumeration provides a mechanism to receive this extra data along with the changes being returned. This eliminates the need for adapters to re-query the database in most cases.

(2) Change Application

Change Application allows Sync Adapters to apply changes received from their backend to the local storage platform. Adapters are expected to transform the changes to the storage platform schema.

The primary function of change application is to automatically detect conflicts. As in the case of Storage Platform-to-Storage Platform sync, a conflict is defined as two overlapping changes being made without knowledge of each other. When adapters use Change Application, they must specify the anchor with respect to which conflict detection is performed. Change Application raises a conflict if an overlapping local change that is not covered by the adapter's knowledge is detected. Similar to Change Enumeration, adapters may use either stored or supplied anchors. Change Application supports efficient storage of adapter-specific meta-data. Such data may be attached by the adapter to the changes being applied, and might be stored by the synchronization service. The data might be returned on next change enumeration.

(3) Conflict Resolution

The Conflict Resolution mechanisms described above (logging and automatic resolution options) are available to sync adapters as well. Sync adapters may specify the policy for conflict resolution when applying changes. If specified, conflicts may be passed on to the specified conflict handler and resolved (if possible). Conflicts can also be logged. It is possible that the adapter may detect a conflict when attempting to apply a local change to the backend. In such a case, the adapter may still pass the conflict on to the Sync Runtime to be resolved according to policy. In addition, Sync Adapters may request that any conflicts detected by the synchronization service be sent back to them for processing. This is particularly convenient in the case where the backend is capable of storing or resolving conflicts.

b) Adapter Implementation

While some "adapters" are simply applications utilizing runtime interfaces, adapters are encouraged to implement the standard adapter interfaces. These interfaces allow Sync Controlling Applications to: request that the adapter perform synchronization according to a given Sync Profile; cancel ongoing synchronization; and receive progress reporting (percentage complete) on an ongoing sync.

3. Security

The synchronization service strives to introduce as little as possible into the security model implemented by the storage platform. Rather than defining new rights for synchronization, existing rights are used. Specifically, anyone who can read a data store Item can enumerate changes to that item;

anyone who can write to a data store Item can apply changes to that item; and anyone who can extend a data store Item can associate sync meta-data with that item.

The synchronization service does not maintain secure authorship information. When a change is made at replica A by user U and forwarded to replica B, the fact that the change was originally made at A (or by U) is lost. If B forwards this change to replica C, this is done under B's authority, not that of A. This leads to the following limitation: if a replica is not trusted to make its own changes to an item, it cannot forward changes made by others.

When the synchronization service is initiated, it is done by a Sync Controlling Application. The synchronization service impersonates the identity of the SCA and performs all operations (both locally and remotely) under that identity. To illustrate, observe that user U cannot cause the local synchronization service to retrieve changes from a remote storage platform for items that user U does not have read access.

4. Manageability

Monitoring a distributed community of replicas is a complex problem. The synchronization service may use a "sweep" algorithm to collect and distribute information about the status of the replicas. The properties of the sweep algorithm ensure that information about all configured replicas is eventually collected and that failing (non-responsive) replicas are detected.

This community-wide monitoring information is made available at every replica. Monitoring tools can be run at an arbitrarily-chosen replica to examine this monitoring information and make administrative decisions. Any configuration changes must be made directly at the affected replicas.

H. Traditional File System Interoperability

As mentioned above, the storage platform of the present invention is, in at least some embodiments, intended to be embodied as an integral part of the hardware/software interface system of a computer system. For example, the storage platform of the present invention may be embodied as an integral part of an operating system, such as the Microsoft Windows family of operating systems. In that capacity, the storage platform API becomes a part of the operating system APIs through which application programs interact with the operating system. Thus, the storage platform becomes the means through which application programs store information on the operating system, and the Item based data model of the storage platform therefore replaces the traditional files system of such an operating system. For example, as embodied in the Microsoft Windows family of operating systems, the storage platform might replace the NTFS file system implemented in that operating system. Presently, application programs access the services of the NTFS file system through the Win32 APIs exposed by the Windows family of operating systems.

Recognizing, however, that completely replacing the NTFS file system with the storage platform of the present invention would require recoding of existing Win32-based application programs and that such recoding may be undesirable, it would be beneficial for the storage platform of the present invention to provide some interoperability with existing file systems, such as NTFS. In one embodiment of the present invention, therefore, the storage platform enables application programs which rely on the Win32 programming model to access the contents of both the data store of the storage platform as well as the traditional NTFS file system. To this end, the storage platform uses a naming convention that is a superset of the Win32 naming conventions to facilitate easy interoperability. Further, the storage platform supports accessing files and directories stored in a storage platform volume through the Win32 API.

1. Model for Interoperability

According to this aspect of the present invention, and in accordance with the exemplay embodiment discussed above, the storage platform implements one namespace in which non-file and file items can be organized. With this model, the following advantages are achieved:

1. Folders in the data store can contain both file and non-file items, thus presenting a single namespace for file and schematized data. Moreover, it also provides a uniform security, sharing and administration model for all user data.

2. Since file and non-file items are both accessible using the storage platform APIs and no special rules are imposed for files in this approach, it presents a cleaner programming model for application developers to work against.

3. All namespace operations pass through the storage platform and hence are handled synchronously. It is important to note that deep property promotion (driven off of file contents) still happens asynchronously, but the synchronous operations provide a much more predictable environment for users and applications.

As a consequence of this model, in the present embodiment, search capabilities may not be provided over data sources that are not migrated into the storage platform data store. This includes removable media, remote servers and files on the local disk. A Sync Adapter is provided which manifests proxy items (shortcuts+promoted metadata) in the storage platform for items residing in foreign file systems. Proxy items do not attempt to mimic files either in terms of the namespace hierarchy of the data source or in terms of security.

The symmetry achieved on the namespace and programming model between file and non-file content provides a better path for applications to migrate content from file systems to more structured items in the storage platform data store over time. By providing a native file item type in the storage platform data store, application programs can transition file data into the storage platform while still being able to manipulate this data via Win32. Eventually, application programs might migrate to the storage platform API completely and structure their data in terms of storage platform Items rather than files.

2. Data Store Features

In order to provide the desired level of interoperability, in one embodiment, the following features of the storage platform data store are implemented.

a) Not a volume

The storage platform data store is not exposed as a separate file system volume. The storage platform leverages FILESTREAMs directly hosted on NTFS. Thus, there is no change to the on-disk format, thereby obviating any need to expose the storage platform as a new file system at the volume level.

Instead, a data store (namespace) is constructed corresponding to an NTFS volume. The database and FILESTREAMs backing this portion of the namespace is located on the NTFS volume with which the storage platform data store is associated. A data store corresponding to the system volume is also provided.

b) Store Structure

Figure 16:
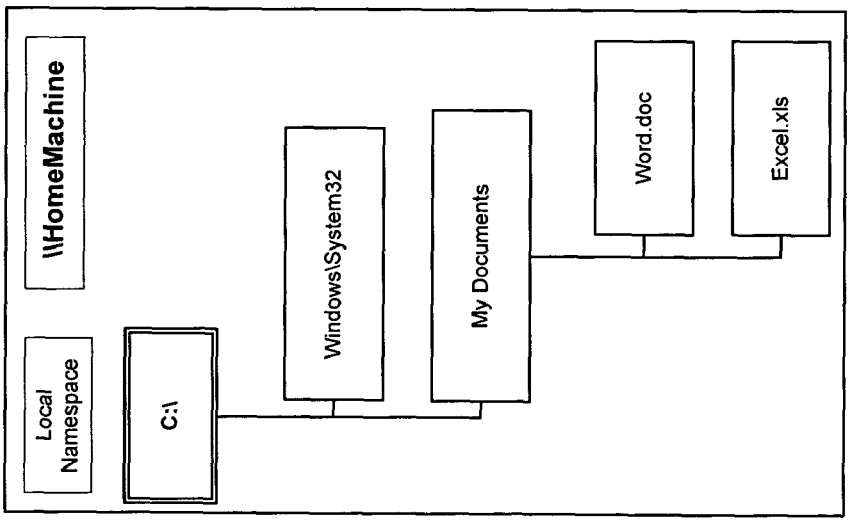
FIG. 16 illustrates an exemplary directory tree.

The structure of the store is best illustrated with an example. Consider, as an example, the directory tree on the system volume of a machine named HomeMachine, as illustrated in FIG. 16. In accordance with the file system interoperability feature of the present invention, corresponding to the c:\ drive, there is a storage platform data store exposed to the Win32 APIs via a UNC share, called, for example, "WinFSOnC." This makes the associated data store accessible via the following UNC name: \\HomeMachine\WinFSOnC.

Figure 17:
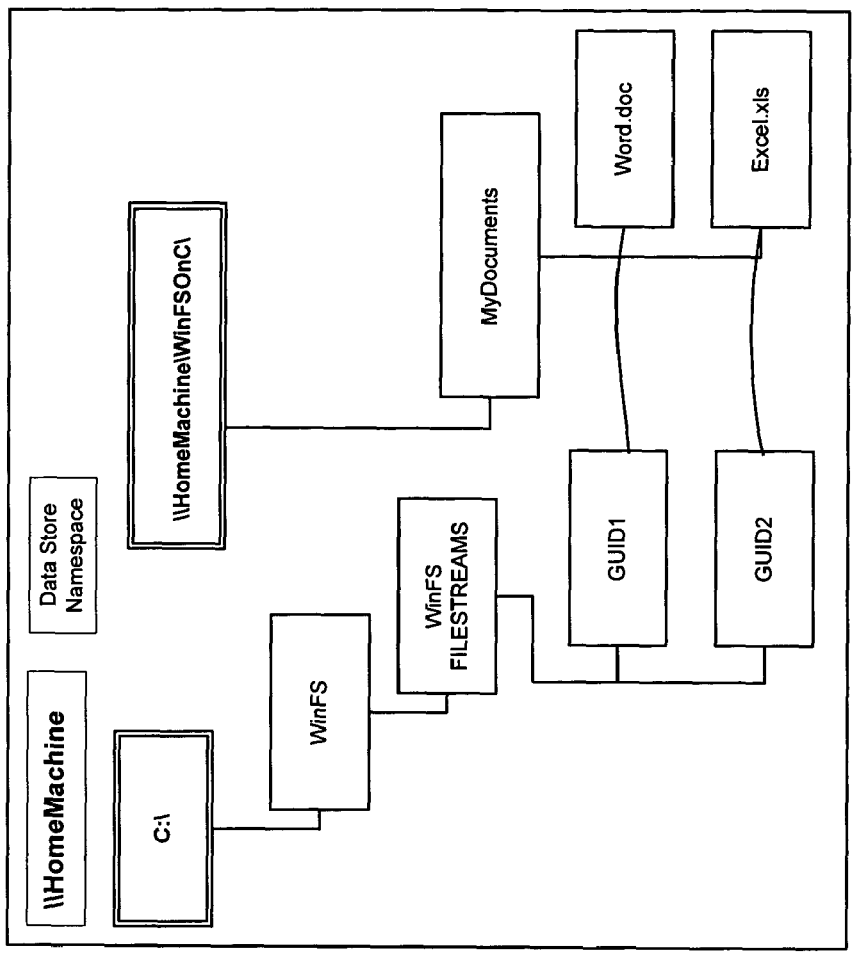
FIG. 17 shows an example in which an existing folder of a directory-based file system is moved into the storage platform data store in accordance with an aspect of the present invention.

In this embodiment, files and/or folders need to be migrated from NTFS to the storage platform explicitly. So, if a user desires to move the My Documents folder into the storage platform data store in order to avail his or herself of all the extra search/categorization features offered by the storage platform, the hierarchy would look as shown in FIG. 17. It is important to note that these folders are actually moved in this example. Another point to note is that the namespace moves into the storage platform, the actual streams are renamed as FILESTREAMs with appropriate pointers hooked up within the storage platform.

c) Not All Files Are Migrated

Files that correspond to user data or that need the searching/categorization that the storage platform provides are candidates for migration into the storage platform data store. Preferably, in order to limit issues of application program compatibility with the storage platform, the set of files that are migrated to the storage platform of the present invention, in the context of the Microsft Windows operating system, are limited to the files in the MyDocuments folder, Internet Explorer (IE) Favorites, IE History, and Desktop .ini files in the Documents and Settings directory. Preferably, migrating Windows system files is not permitted.

d) NTFS Namespace Access to Storage Platform Files

In the embodiment described herein, it is desirable that files migrated into the storage platform not be accessed via the NTFS namespace even though the actual file streams are stored in NTFS. This way, complicated locking and security considerations that arise from a multi-headed implementation are avoided.

e) Expected Namespace/Drive Letters

Access to files and folders in the storage platform is provided via a UNC name of the form <machine name>\<WinfsShareName>. For the class of applications that require drive letters for operation, a drive letter can be mapped to this UNC name.

I. Storage Platform API

As mentioned above, the storage platform comprises an API that enables application programs to access the features and capabilities of the storage platform discussed above and to access items stored in the data store. This section describes one embodiment of a storage platform API of the storage platform of the present invention.

Figure 19:
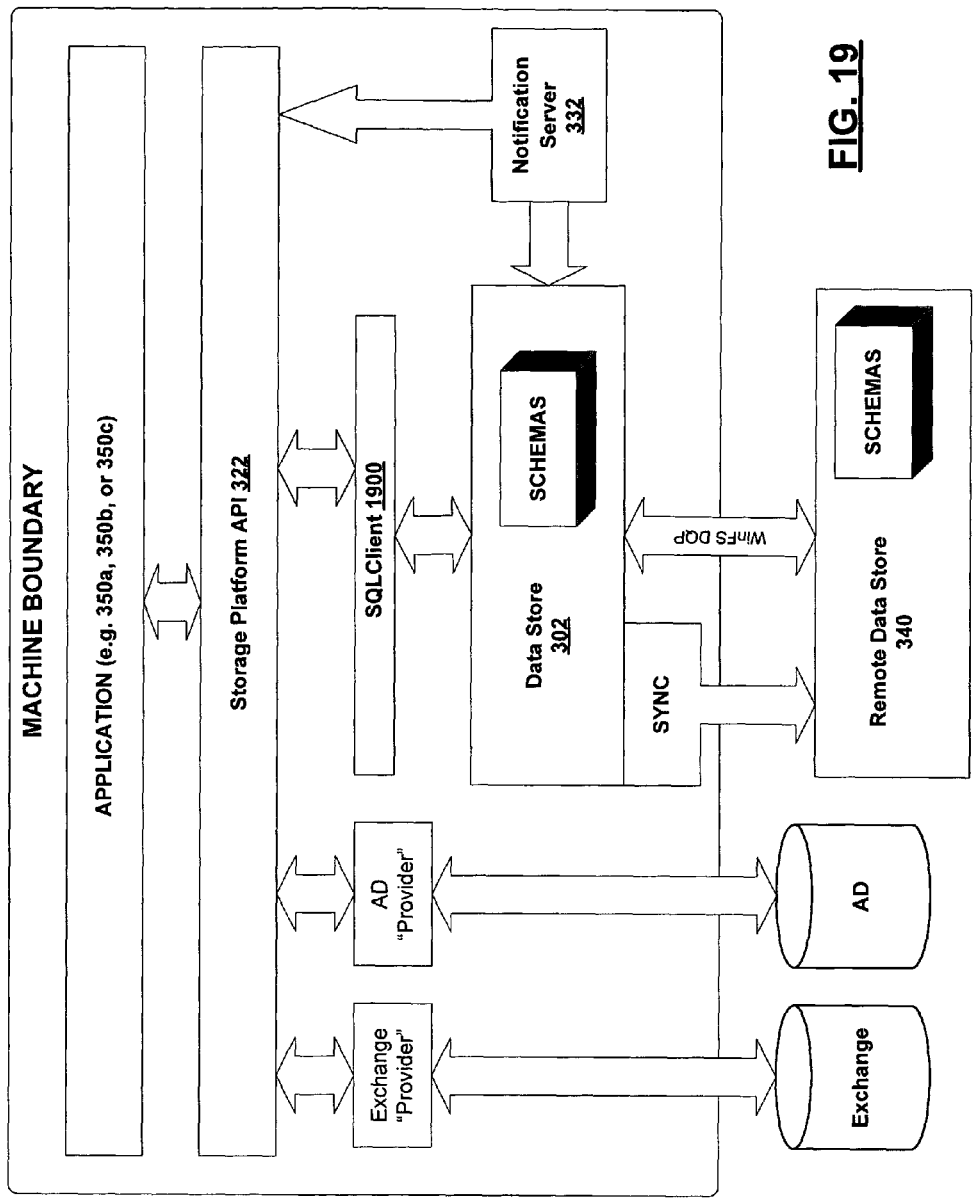
FIG. 19 illustrates the basic architecture of the storage platform API.

FIG. 19 illustrates the basic architecture of the storage platform API, in accordance with the present embodiment. The storage platform API uses SQLClient 1900 to talk to the local data store 302 and may also use SQLClient 1900 to talk to remote data stores (e.g., data store 340). The local store 302 may also talk to the remote data store 340 using either DQP (Distributed Query Processor) or through the the storage platform synchronization service ("Sync") described above. The storage platform API 322 also acts as the bridge API for data store notifications, passing application's subscriptions to the notification engine 332 and routing notifications to the application (e.g., application 350a, 350b, or 350c), as also described above. In one embodiment, the storage platform API 322 may also define a limited "provider" architecture so that it can access data in Microsoft Exchange and AD.

1. Overview

The data access mechanism of the present embodiment of the storage platform API of the present invention addresses four areas: query, navigation, actions, events.

Query

In one embodiment, the storage platform data store is implemented on a relational database engine 314; as a result, the full expressive power of the SQL language is inherent in the storage platform. Higher level query objects provide a simplified model for querying the store, but may not encapsulate the full expressive power of the storage.

Navigation

The storage platform data model builds a rich, extensible type system on the underlying database abstractions. For the developer, the storage platform data is a web of items. The storage platform API enables navigation from item to item via filtering, relationships, folders, etc. This is a higher level of abstraction than the base SQL queries; at the same time, it allows rich filtering and navigation capabilities to be used with familiar CLR coding patterns.

Actions

The storage platform API exposes common actions on all items—Create, Delete, Update; these are exposed as methods on objects. In addition, domain specific actions such as SendMail, CheckFreeBusy, etc. are also available as methods. The API framework uses well defined patterns that ISVs can use to add value by defining additional actions.

Events

Data in the storage platform is dynamic. To let applications react when data in the store is changed, the API exposes rich eventing, subscription, and notification capabilities to the developer.

2. Naming and Scopes

It is useful to distinguish between namespace and naming. The term namespace, as it's commonly used, refers to the set of all names available within some system. The system could be an XML schema, a program, the web, the set of all ftp sites (and their contents), etc. Naming is the process or algorithm used to assign unique names to all entities of interest within a namespace. Thus, naming is of interest because it is desirable to unambiguously refer to a given unit within a namespace. Thus, the term "namespace," as used herein, refers to the set of all names available in all the storage platform instances in the universe. Items are the named entities in the the storage platform namespace. The UNC naming convention is used to ensure uniqueness of item names. Every item in every the storage platform store in the universe is addressable by a UNC name.

The highest organizational level in the the storage platform namespace is a service—which is simply an instance of the storage platform. The next level of organization is a volume. A volume is the largest autonomous container of items. Each storage platform instance contains one or more volumes. Within a volume are items. Items are the data atoms in the storage platform.

Data in the real world is almost always organized according to some system that makes sense in a given domain. Underlying all such data organization schemes is the notion of dividing the universe of our data into named groups. As discussed above, this notion is modeled in the storage platform by the concept of a Folder. A Folder is a special type of Item; there are 2 types of Folders: Containment Folders and Virtual Folders.

Figure 18:
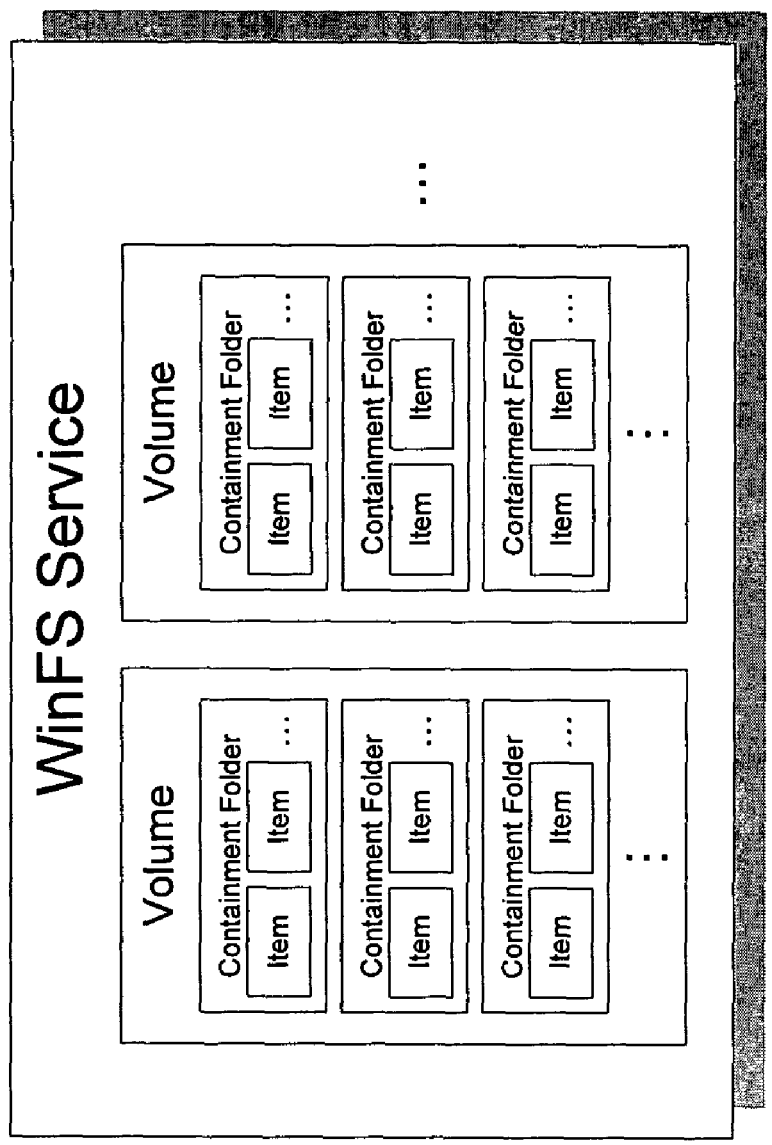
FIG. 18 illustrates the concept of Containment Folders, in accordance with an aspect of the present invention.

Referring to FIG. 18, a Containment Folder is an item which contains holding Relationships to other Items and is the equivalent of the common concept of a file system folder. Each Item is "contained" within at least one containment folder.

A Virtual Folder is a more dynamic way of organizing a collection of Items; it is simply a name given a set of Items—the set is either enumerated explicitly or specified by a query. The Virtual Folder is itself an Item and can be thought of as representing a set of (non-holding) Relationships to a set of Items.

Sometimes, there is the need to model a tighter notion of containment; for example, a Word document embedded in an email message is, in a sense, bound more tightly to its container than, for example, a file contained within a folder. This notion is expressed by the concept of Embedded Items. An Embedded Item has a special kind of relationship which references another Item; the referenced Item can be bound to or otherwise manipulated only within the context of the containing Item.

Finally, the storage platform provides the notion of categories as a way of classification of Items and Elements. Every Item or Element in the storage platform can have associated with it one or more categories. A category is, in essence, simply a name that is tagged on to the Item/Element. This name can be used in searches. The storage platform data model allows the definition of a hierarchy of categories, thus enabling a tree-like classification of data.

An unambiguous name for an item is the triplet: (<serviceName, <volumeID>, <ItemID>). Some items (specifically, Folders and VirtualFolders) are collections of other items. This gives rise to an alternative way of identifying items: (<serviceName>, <volumeID>, <itemPath>).

The storage platform names include the notion of a service context: a service context is a name which maps to a (<volumeName>, <path>) pair. It identifies an item or a set of items—for instance, a folder, virtual folder, etc. With the concept of service contexts, the UNC name for any item in the the storage platform namespace becomes:

\\<serviceName>\<serviceContext>\<itemPath>

Users can create and delete service contexts. Also, the root directory in each volume has a pre-defined context: volumename$.

An ItemContext scopes a query (for example, a Find operation) by limiting the results returned to those Items that live within a specified path.

3. Storage Platform API Components

Figure 20:
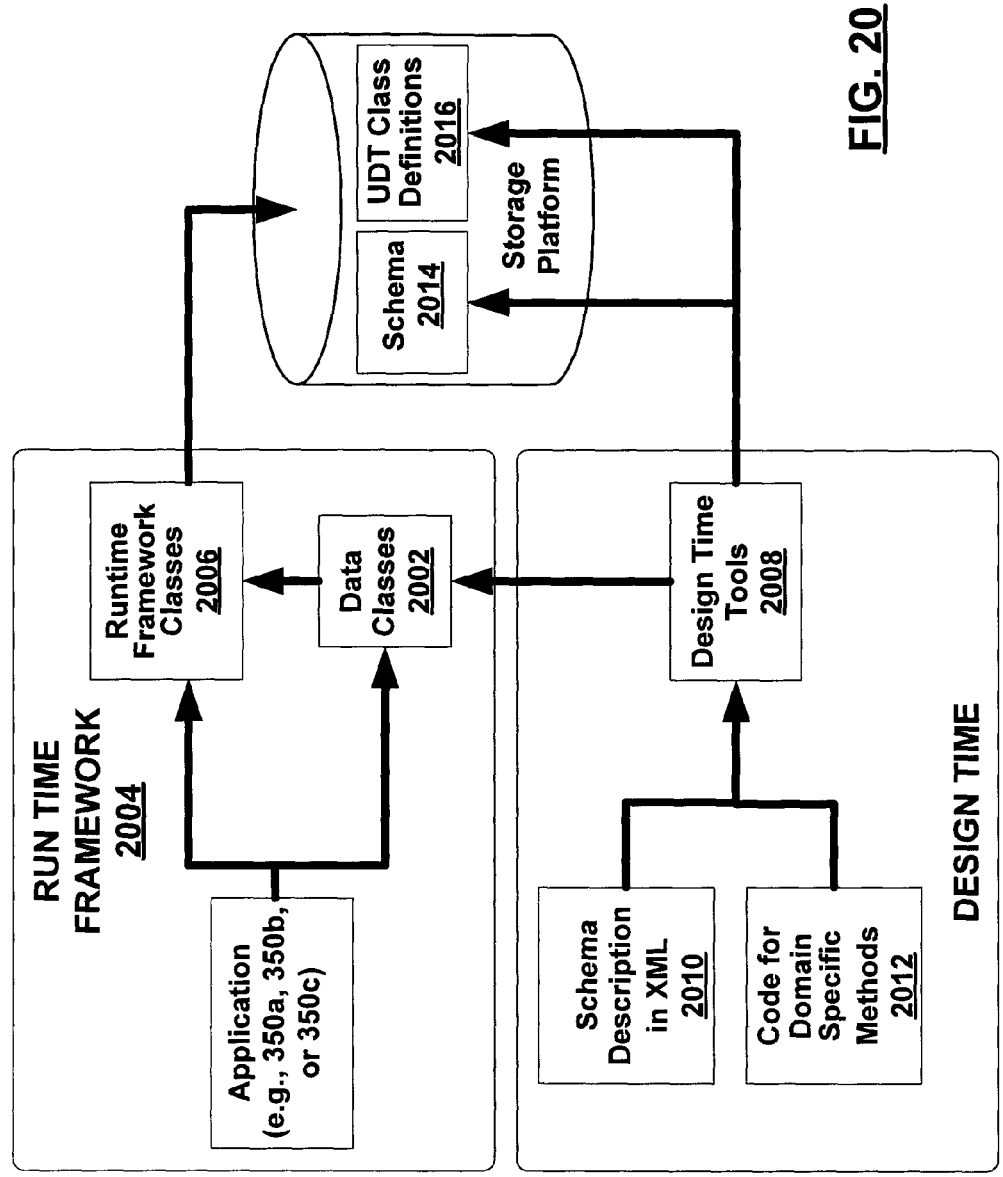
FIG. 20 schematically represents the various components of the storage platform API stack.

FIG. 20 schematically represents the various components of the storage platform API, in accordance with the present embodiment of the invention. The storage platform API consists of the following components: (1) data classes 2002, which represent the storage platform element and item types, (2) runtime framework 2004, which manages object persistence and provides support classes 2006; and (3) tools 2008, which are used to generate CLR classes from the storage platform schemas.

According to one aspect of the present invention, at design time, the schema author submits a schema document 2010 and code for domain methods2012 to the set of storage platform API design time tools 2008. These tools generate the client side data classes 2002 and the store schema 2014 and store class definitions 2016 for that schema. "Domain" refers to a particular schema; for instance, we talk about domain methods for classes in the Contacts schema, etc. These data classes 2002 are used at runtime by the application developer, in concert with the storage platform API runtime framework classes 2006, to manipulate the storage platform data.

Figure 21A:
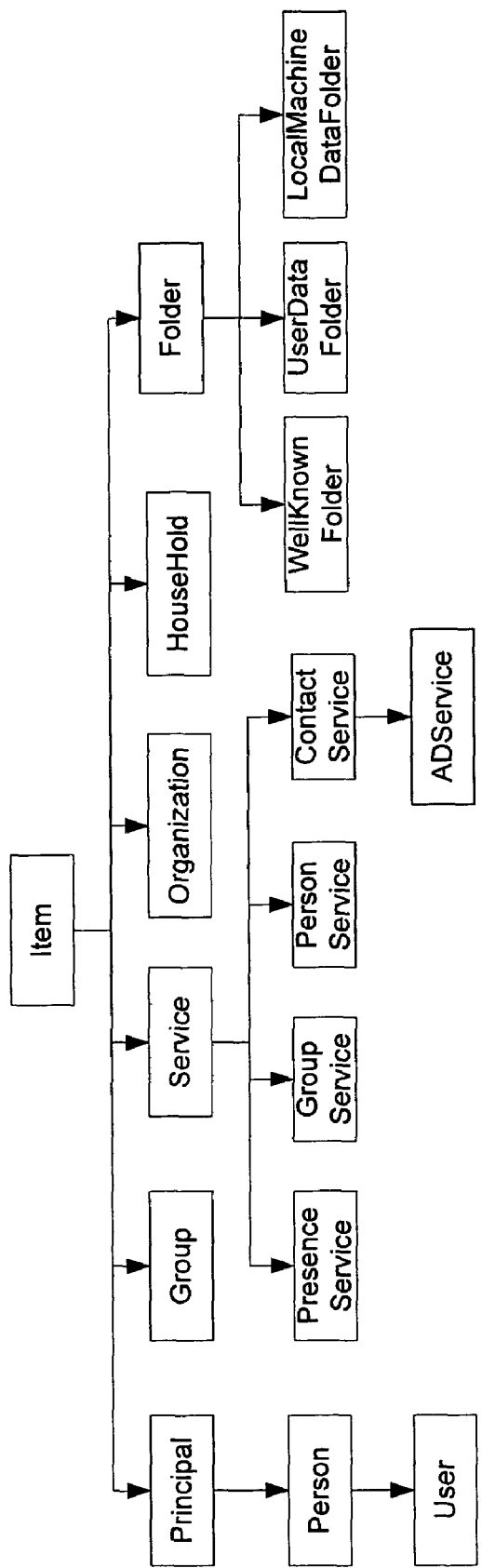
FIGS. 21A and 21B are a pictorial representation of an exemplary Contacts schema (Items and Elements)
Figure 21B:
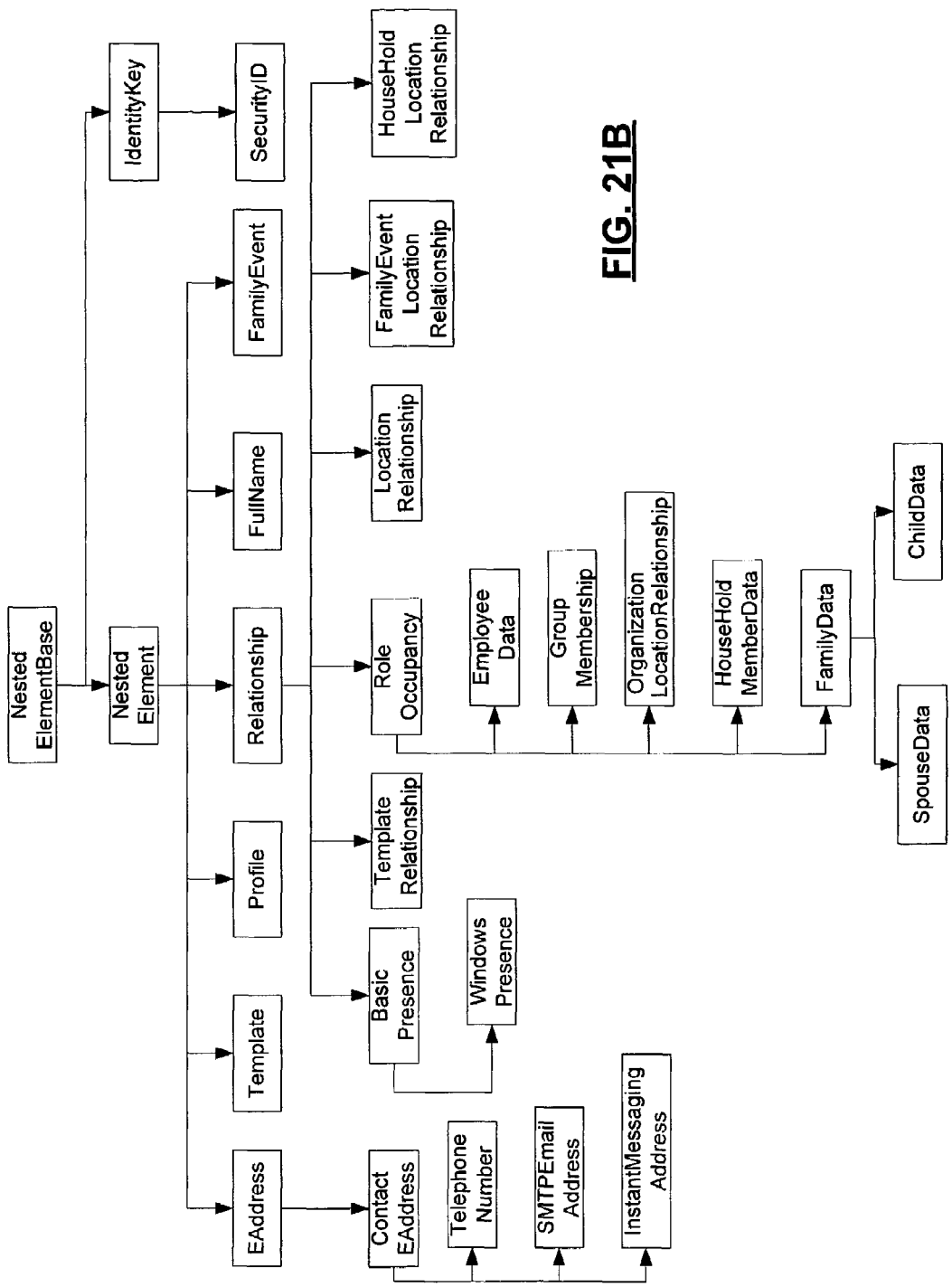

For purposes of illustrating various aspects of the storage platform API of the present invention, examples are presented based on an exemplary Contacts schema. A pictorial representation of this exemplary schema is illustrated in FIGS. 21A and 21B.

4. Data Classes

According to an aspect of the present invention, each Item, Item Extension, and Element type, as well as each Relationship, in the storage platform data store has a corresponding class in the storage platform API. Roughly, the fields of the type map to the fields of the class. Each item, item extension, and element in the storage platform is available as an object of the corresponding class in the storage platform API. The developer can query for, create, modify, or delete these objects.

The storage platform comprises an initial set of schemas. Each schema defines a set of Item and Element types, and a set of Relationships. The following is one embodiment of an algorithm for generating data classes from these schema entities:

For each schema S:

For each Item, I, in S a class named System.Storage.S.I is generated. This class has the following members:

- Overloaded constructors, including constructors that allow a new item's initial folder and name to be specified.
- A property for each field in I. If the field is multi-valued, the property will be a collection of the corresponding Element type.
- An overloaded static method which finds multiple items matching the filter (for example, a method named "FindAll").
- An overloaded static method which finds a single item matching a filter (for example, a method named "FindOne").
- A static method which finds an item given its id (for example, a method named "FindByID").
- A static method which finds an item given its name relative to an ItemContext (for example, a method named "FindByName").
- A method which saves changes to the item (for example, a method named "Update").
- Overloaded static Create methods which create new instances of the item. These methods allow the item's initial folder to be specified in various ways.

For each Element, E, in S a class named System.Storage.S.E is generated. This class has the following members:

- A property for each field in E. If the field is multi-valued, the property will be a collection of the corresponding Element types.

For each Element, E, in S a class named System.Storage.S.ECollection is generated. This class follows general .NET Framework guidelines for strongly typed collection classes. For Relationship based element types, this class will also include the following members:

- An overloaded method which finds multiple Item objects that match a filter which implicitly includes the item in which the collection appears in the source role. The overloads include some that allow filtering based on Item sub-type (for example, a method named "FindAllTargetItems").
- An overloaded method which finds a single Item object that matches a filter which implicitly includes the item in which the collection appears in the source role. The overloads include some that allow filter based on Item sub-type (for example, a method named "FindOneTargetItem").
- An overloaded method which finds objects of the nested element type that match a filter which implicitly includes the item in which the collection appears in the source role (for example, a method named "FindAllRelationships").
- An overloaded method whichs find objects of the nested element type that match a filter which implicitly includes the item in which the collection appears in the source role (for example, a method named "FindAllRelationshipsForTarget").
- An overloaded method which finds a single object of the nested element type that matches a filter which implicitly includes the item in which the collection appears in the source role (for example, a method named "FindOneRelationship").
- An overloaded method which finds a single object of the nested element type that matches a filter which implicitly includes the item in which the collection appears in the source role (for example, a method named "FindOneRelationshipForTarget").

For Relationship, R, in S a class named System.Storage.S.R is generated. This class will have one or two sub-classes, depending on if one or both relationship roles specify an end point field.

Classes are also generated in this manner for each Item Extension that has been created.

The data classes exist in the System.Storage.<schemaName>namespace, where <schemaName> is the name of the corresponding schema—such as Contacts, Files, etc. For example, all classes corresponding to the Contacts schema are in the System.Storage.Contacts namespace.

By way of example, with reference to FIGS. 21A and 21B, the contacts schema results in the following classes, contained in the System.Storage.Contact namespace:

Items: Item, Folder, WellKnownFolder, LocalMachineDataFolder, UserDataFolder, Principal, Service, GroupService, PersonService, PresenceService, ContactService, ADService, Person, User, Group, Organization, HouseHold Elements: NestedElementBase, NestedElement, IdentityKey, SecurityID, EAddress, ContactEAddress, TelehoneNumber, SMTPEAddress, InstantMessagingAddress, Template, Profile, FullName, FamilyEvent, BasicPresence, WindowsPresence, Relationship, TemplateRelationship, LocationRelationship, FamilyEventLocationRelationship, HouseHoldLocationRelationship, RoleOccupancy, EmployeeData, GroupMemberShip, OrganizationLocationRelationship, HouseHoldMemberData, FamilyData, SpouseData, ChildData By way of further example, the detailed structure of the Person type, as defined in the Contacts schema, is shown in XML below:

```
<Type Name="Person" MajorVersion="1" MinorVersion="0"
    ExtendsType="Core.Principal" ExtendsVersion="1">
  <Field Name="Birthdate" Type="the storage
    platformTypes.datetime"
      Nullable="true" TypeMajorVersion="1"/>
  <Field Name="Gender" Type="Base.CategoryRef"
      Nullable="true" MultiValued="false"
      TypeMajorVersion="1"/>
  <Field Name="PersonalNames" Type="Contact.FullName"
      Nullable="true" MultiValued="true"
      TypeMajorVersion="1"/>
  <Field Name="PersonalEAddresses" Type="Core.EAddress"
      Nullable="true" MultiValued="true"
      TypeMajorVersion="1"/>
  <Field Name="PersonalPostalAddresses"
      Type="Core.PostalAddress" Nullable="true"
      MultiValued="true" TypeMajorVersion="1"/>
  <Field Name="PersonalPicture" Type="the storage
    platformTypes.image"
      Nullable="true" TypeMajorVersion="1"/>
  <Field Name="Notes" Type="Core.RichText"
    Nullable="true"
      MultiValued="true" TypeMajorVersion="1"/>
  <Field Name="Profession" Type="Base.CategoryRef"
      Nullable="true" MultiValued="true"
      TypeMajorVersion="1"/>
  <Field Name="DataSource" Type="Base.IdentityKey"
      Nullable="true" MultiValued="true"
      TypeMajorVersion="1"/>
  <Field Name="ExpirationDate" Type="the storage
    platformTypes.datetime"
      Nullable="true" TypeMajorVersion="1"/>
  <Field Name="HasAllAddressBookData" Type="the
    storage platformTypes.bit"
      Nullable="true" TypeMajorVersion="1"/>
  <Field Name="EmployeeOf" Type="Contact.EmployeeData"
      Nullable="true" MultiValued="true"
      TypeMajorVersion="1"/>
</Type>
```

This type results in the following class (only the public members are shown):

```
partial public class Person :
    System.Storage.Core.Principal,
    System.Windows.Data.IDataUnit
{
    public System.Data.SqlTypes.SqlDateTime
        Birthdate { get; set; }
    public System.Storage.Base.CategoryRef
        Gender { get; set: }
    public System.Storage.Contact.FullNameCollection
        PersonalNames { get; }
    public System.Storage.Core.EAddressCollection
        PersonalEAddresses { get; }
    public System.Storage.Core.PostalAddressCollection
        PersonalPostalAddresses { get; }
    public System.Data.SqlTypes.SqlBinary
        PersonalPicture { get; set; }
    public System.Storage.Core.RichTextCollection
        Notes { get; }
    public System.Storage.Base.CategoryRefCollection
        Profession { get; }
    public System.Storage.Base.IdentityKeyCollection
        DataSource { get; }
    public System.Data.SqlTypes.SqlDateTime
        Expiration Date { get; set; }
```

```
public System.Data.SqlTypes.SqlBoolean
    HasAllAddressBookData { get; set; }
public System.Storage.Contact.EmployeeDataCollection
    EmployeeOf { get; }
public Person( );
public Person( System.Storage.Base.Folder folder, string name );
public static new System.Storage.FindResult
    FindAll( System.Storage.ItemStore store );
public static new System.Storage.FindResult
    FindAll(
        System.Storage.ItemStore store,
        string filter );
public static new Person
    FindOne(
        System.Storage.ItemStore store,
        string filter );
public new event
    System.Windows.Data.PropertyChangedEventHandler
        PropertyChangedHandler;
public static new Person
    FindByID(
        System.Storage.ItemStore store,
        long item_key );
}
```

As yet another example, the detailed structure of the TelephoneNumber type, as defined in the Contacts schema, is shown in the XML below:

```
<Type Name="TelephoneNumber" ExtendsType="Core.EAddress"
    MajorVersion="1" MinorVersion="0" ExtendsVersion="1">
    <Field Name="CountryCode" Type="the storage
    platformTypes.nvarchar(50)"
        Nullable="true" MultiValued="false"
        TypeMajorVersion="1"/>
    <Field Name="AreaCode" Type="the storage
    platformTypes.nvarchar(256)"
        Nullable="true" TypeMajorVersion="1"/>
    <Field Name="Number" Type="the storage
    platformTypes.nvarchar(256)"
        Nullable="true" TypeMajorVersion="1"/>
    <Field Name="Extension" Type="the storage
    platformTypes.nvarchar(256)"
        Nullable="true" TypeMajorVersion="1"/>
    <Field Name="PIN" Type="the storage
    platformTypes.nvarchar(50)"
        Nullable="true" TypeMajorVersion="1"/>
</Type>
```

This type results in the following class (only the public members are shown):

```
partial public class TelephoneNumber :
    System.Storage.Core.EAddress,
    System.Windows.Data.IDataUnit
{
    public System.Data.SqlTypes.SqlString CountryCode
        { get; set; }
    public System.Data.SqlTypes.SqlString AreaCode
        { get; set; }
    public System.Data.SqlTypes.SqlString Number
        { get; set; }
    public System.Data.SqlTypes.SqlString Extension
        { get; set; }
    public System.Data.SqlTypes.SqlString PIN
        { get; set; }
    public TelephoneNumber( );
    public new event
        System.Windows.Data.PropertyChangedEventHandler
            PropertyChangedHandler;
}
```

The hierarchy of classes resulting from a given schema directly reflects the hierarchy of types in that schema. As an example, consider the Item types defined in the Contacts schema (see, FIGS. 21A and 21B). The class hierarchy corresponding to this in the storage platform API would be as follows:

```
Object
    DataClass
        ElementBase
            RootItemBase
                Item
                    Principal
                        Group
                        Household
                        Organization
                        Person
                            User
                        Service
                            PresenceService
                            ContactService
                            ADService
            RootNestedBase
                . . . (Element classes)
```

Yet another schema, the schema that allows representing all the audio/video media in the system (ripped audio files, audio CDs, DVDs, home videos, etc.), enables users/applications to store, organize, search through, and manipulate different kinds of audio/video media. The base media document schema is generic enough to represent any media, and the extensions to this base schema are designed to handle domain-specific properties separately for audio and video media. This schema, and many, many others, are envisioned to operate directly or indirectly under the Core Schema.

5. Runtime Framework

The basic storage platform API programming model is object persistence. Application programs (or "applications") execute a search on a store and retrieve objects representing the data in the store. Applications modify the retrieved objects or create new objects, then cause their changes to be propagated into the store. This process is managed by an ItemContext object. Searches are executed using an ItemSearcher object and search results are accessible via a FindResult object.

a) Runtime Framework Classes

According to another inventive aspect of the storage platform API, the runtime framework implements a number of classes to support the operation of the data classes. These framework classes define a common set of behaviors for the data classes and, together with the data classes, provide the basic programming model for the storage platform API. Classes in the runtime framework belong to the System.Storage namespace. In the present embodiment, the framework classes comprise the following main classes: ItemContext, ItemSearcher, and FindResult. Other minor classes, enum values, and delegates may also be provided.

(1) ItemContext

An ItemContext object (i) represents a set of item domains that an application program wants to search, (ii) maintains state information for each object that represents the state of the data as retrieved from the storage platform, and (iii) manages the transactions used when interacting with the storage platform and any file system with which the storage platform may interoperate.

As an object persistence engine, ItemContext provides the following services:

1. Deserializes data read from the store into objects.
2. Maintains object identity (the same object is used to represent a given item no matter how many times that item is included in the result of queries).
3. Tracks object state.

ItemContext also performs a number of services unique to the storage platform:

1. Generates and executes the storage platform update gram operations necessary to persist changes.
2. Creates connections to multiple data stores as necessary to enable the seamless navigation of reference relationships and to allow objects retrieved from a multi-domain search to be modified and saved.
3. Insures that file backed items are properly updated when changes to the object(s) representing that item are saved.
4. Manages transactions across multiple storage platform connections and, when updating data stored in file backed items and file stream properties, the transacted file system.
5. Performs item creation, copy, move, and delete operations that take storage platform relationship semantics, file backed items, and stream typed properties into account.

Appendix A provides a source code listing of the ItemContext class, in accordance with one embodiment thereof.

(2) ItemSearcher

The ItemSearcher class supports simple searches, which return whole Item objects, streams of Item objects, or streams of values projected from Items. ItemSearcher encapsulates the core functionality that is common to all of these: the concept of a target type and parameterized filters that are applied to that target type. The ItemSearcher also allows searchers to be pre-compiled, or prepared, as an optimization when the same search will be executed multiple types. Appendix B provides a source code listing of the ItemSearcher class and several closely related classes, in accordance with one embodiment thereof.

(a) Target Type

The search target type is set when constructing an ItemSearcher. The target type is a CLR type that is mapped to a queryable extent by the data store. Specifically, it is a CLR type that is mapped to item, relationship, and item extension types as well as schematized views.

When retrieving a searcher using the ItemContext.GetSearcher method, the searcher's target type is specified as a parameter. When a static GetSearcher method is invoked on an item, relationship, or item extension type (e.g. Person.GetSearcher), the target type is the item, relationship, or item extension type.

Search expressions provided in an ItemSearcher (for example, the search filter and through find options, or projection definitions) are always relative to the search target type. These expressions may specify properties of the target type (including properties of nested elements) and may specify joins to relationship and item extensions as described elsewhere.

The search target type is made available via a read only property (for example, an ItemSearcher.Type property).

(b) Filters

The ItemSearcher contains a property to specify filters (for example, a property named "Filters" as a collection of SearchExpression objects) that define the filter used in the search. All filters in the collection are combined using a logical and operator when the search is executed. The filter may contain parameter references. Parameter values are specified through the Parameters property.

(c) Preparing Searches

In situations where the same search is to be executed repeatedly, possibly with only parameter changes, some performance improvement can be gained by pre-compiling, or preparing, the search. This is accomplished with a set of prepare methods on the ItemSearcher (for example, a method to prepare a Find that returns one or more Items, perhaps named "PrepareFind", and a method to prepare a Find that returns a projection, perhaps named "PrepareProject"). For example:

```
ItemSearcher searcher = . . . ;
PreparedFind pf = searcher.PrepareFind( );
. . .
result = pf.FindAll( );
. . .
result = pf.FindAll( );
```

(d) Find Options

There are a number of options that can be applied to a simple search. These may be specified, for example, in a FindOptions object and passed to the Find methods. For example:

```
ItemSearcher searcher = Person.GetSearcher( context );
FindOptions options = new FindOptions( );
options.MaxResults = 10;
options.SortOptions.Add( "PersonalNames.Surname",
SortOrder.Ascending );
FindResult result = searcher.FindAll( options );
```

As a convenience, sort options may also be passed directly to the Find methods:

```
ItemSearcher searcher = Person.GetSearcher( context );
FindResult result = searcher.FindAll(
    new SortOption( "PersonalNames.Surname",
    SortOrder.Ascending ) );
```

The DelayLoad option determines if the values of large binary properties are loaded when the search results are retrieved or if loading is delayed until they are referenced. The MaxResults option determines the maximum number of results that are returned. This is equivalent to specifying TOP in a SQL query. It is most often used in conjunction with sorting.

A sequence of SortOption objects can be specified (for example, using a FindOptions.SortOptions property). The search results will be sorted as specified by the first SortOption object, then by as specified by the second SortOption object, etc. The SortOption specifies a search expression that indicates the property that will be used for sorting. The expression specifies one of the following:

1. a scalar property in the search target type;
2. a scalar property in a nested element that is reachable from the search target type by traversing single valued properties; or
3. the result of an aggregation function with a valid argument (for example, Max applied to a scalar property in a nested element that is reachable from the search target type by traversing a multi-valued property or a relationship).

For example, assuming the search target type is System.Storage.Contact.Person:

1. "Birthdate"—valid, birthdate is a scalar property of the Person type;
2. "PersonalNames.Surname"—Invalid, PersonalNames is a multi-valued property and no aggregation function was used;
3. "Count(PersonalNames)"—Valid, the count of PersonalNames.
4. "Case(Contact.MemberOfHousehold).Household.HouseholdEAddresses.StartDat e"—Invalid, uses relationship and multi-valued properties without an aggregation function.
5. "Max(Cast(Contact.MemberOfHousehold).Household.HouseholdEAddresses.Star tDate)"—Valid, most recent household e-address start date.

(3) Item Result Stream ("FindResult")

The ItemSearcher (for example, through the FindAll method) returns an object that can be used to access the objects returned by the search (for example, a "FindResult" object). Appendix C provides a source code listing of the FindResult class and several closely related classes, in accordance with one embodiment thereof.

There are two distinct methods for getting results from a FindResult object: using the reader pattern defined by IObjectReader (and IAsyncObjectReader) and using the enumerator pattern as defined by IEnumerable and IEnumerator. The enumerator pattern is standard in the CLR and supports language constructs like C#'s foreach. For example:

```
ItemSearcher searcher = Person.GetSearcher( context );
searcher.Filters.Add( "PersonalNames.Surname = 'Smith'" );
FindResult result = searcher.FindAll( );
foreach( Person person in result ) . . . ;
```

The reader pattern is supported because it allows results to be processed more efficiently by eliminating a data copy in some cases. For example:

```
ItemSearcher searcher = Person.GetSearcher( context );
searcher.Filters.Add( "PersonalNames.SurName = 'Smith'" );
FindResult result = searcher.FindAll( );
while( result.Read( ) )
{
    Person person = (Person)result.Current;
    . . .
}
```

In addition, the reader pattern supports asynchronous operation:

```
ItemSearcher searcher = Person.GetSearcher( context );
searcher.Filters.Add( "PersonalNames.SurName = 'Smith'" );
FindResult result = searcher.FindAll( );
IAysncResult asyncResult = result.BeginRead( new AsyncCallback( MyCallback ) );
void MyCallback( IAsyncResult asyncResult )
{
    if( result.EndRead( asyncResult ) )
    {
        Person person = (Person)result.Current;
        . . .
    }
}
```

In the present embodiment, a FindResult should be closed when it is no longer needed. This can be done by calling the Close method or using language constructs such as C#'s using statement. For example:

```
ItemSearcher searcher = Person.GetSearcher( context );
searcher.Filters.Add( "PersonalNames.SurName = 'Smith'");
using( FindResult result = searcher.FindAll( ) )
{
    while( result.Read( ) )
    {
        Person person = (Person)result.Current;
        . . .
    }
}
``` b) Runtime Framework in Operation

Figure 22:
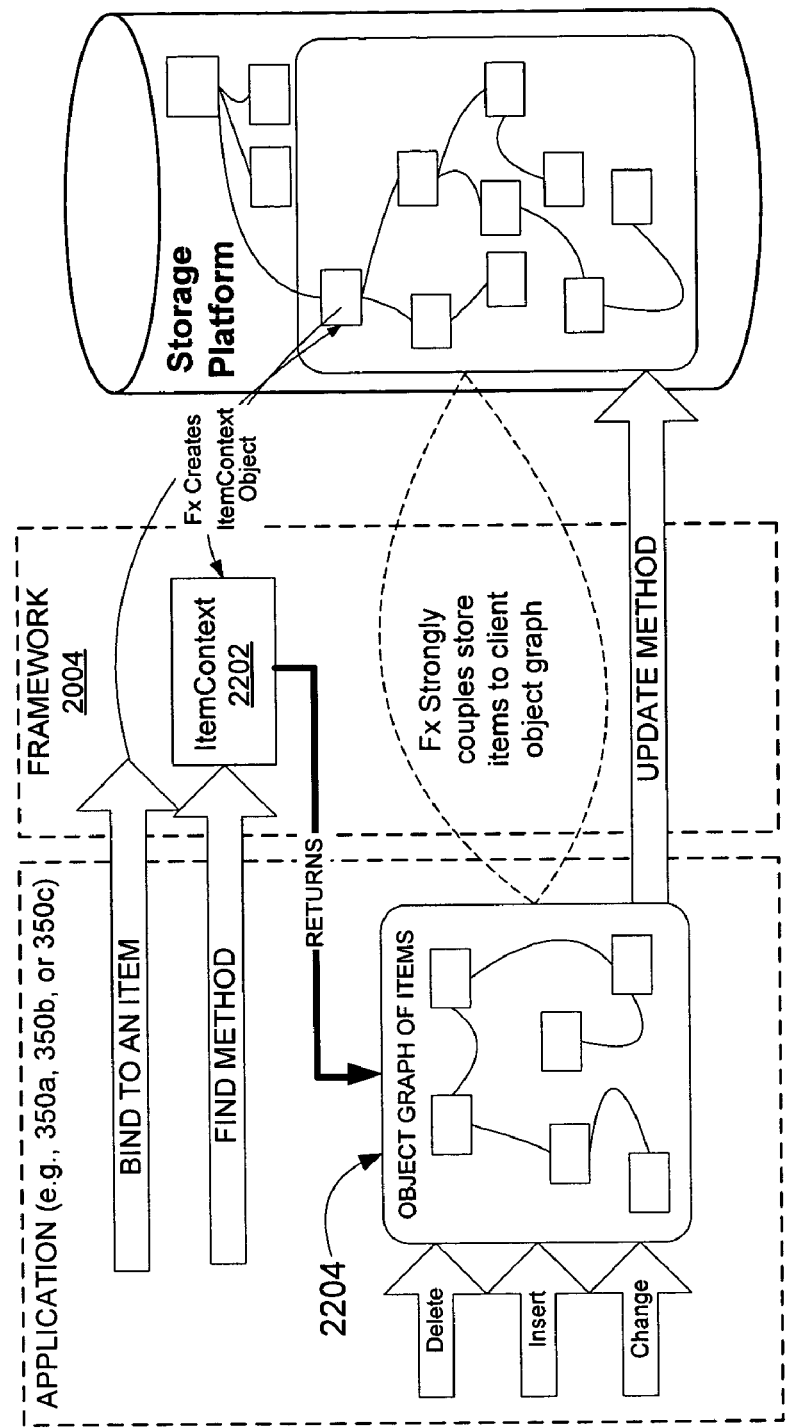
FIG. 22 illustrates the runtime framework of the storage platform API, in accordance with an aspect of the present invention.

FIG. 22 illustrates the runtime framework in operation. The runtime framework operates as follows:

1. An application 350*a*, 350*b*, or 350*c* binds to an item in the storage platform.
2. The framework 2004 creates an ItemContext object 2202 corresponding to the bound item and returns it to the application.
3. The application submits a Find on this ItemContext to get a collection of Items; the returned collection is conceptually an object graph 2204 (due to relationships).
4. The application changes, deletes, and inserts data.
5. The application saves the changes by calling the Update() method.

c) Common Programming Patterns

This section provides a variety of examples of how the storage platform API framework classes can be used to manipulate items in the data store.

(1) Opening and Closing ItemContext Objects

An application gets the ItemContext object it will use to interact with the data store, e.g. by calling a static ItemContext.Open method and providing the path or paths that identify the item domains that will be associated with the ItemContext. Item domains scope the searches performed using the ItemContext such that only the domain item and the items contained in that item will be subject to the search. Examples are as follows:

Open an ItemContext with the DefaultStore storage platform share on the local computer ItemContext ic = ItemContext.Open( );
Open an ItemContext with a given storage platform share ItemContext ic = ItemContext.Open( @ "\\myserver1\DefaultStore" );
Open an ItemContext with an item under a storage platform share ItemContext ic = ItemContext.Open( @ "\\myserver1\WinFSSpecs\api\m6" );
Open an ItemContext with multiple item domains ItemContext ic = ItemContext.Open( @ "\\myserver1\My Documents",
    @ "\\jane1\My Documents",
    @ "\\jane2\My Documents" );

When an ItemContext is no longer needed, it must be closed.

Explicitly Close an ItemContext

ItemContext ic = ItemContext.Open( );
...
ic.Close( );
Close using statement with an ItemContext using( ItemContext ic = ItemContext.Open( ) )
{
    ... ;
}

(2) Searching for Objects

According to another aspect of the present invention, the storage platform API provides a simplified query model that enables application programmers to form queries based on various properties of the items in the data store, in a manner that insulates the application programmer from the details of the query language of the underlying database engine.

Applications can execute a search across the domains specified when the ItemContext was opened using an ItemSearcher object returned by the ItemContext.GetSearcher method. Search results are accessed using a FindResult object. Assume the following declarations for the examples below:

ItemContext ic = ... ;
ItemSearcher searcher = null;
FindResult result = null;
Item item = null;
Relationship relationship = null;
ItemExtension itemExtension = null;

The basic search pattern involves using an ItemSearcher object retrieved from an ItemContext by calling the GetSearcher method.

Search for all items of a given type searcher = ic.GetSearcher( typeof( Person ) );
result = searcher.FindAll( );
foreach( Person p in result ) ... ;
Search for items of a given type that satisfy a filter searcher = ic.GetSearcher( typeof( Person ) );
searcher.Filters.Add( "PersonalNames.Surname = 'Smith'" );

-continued result = searcher.FindAll( );
foreach( Person p in result ) ... ;
Use a parameter in a filter string searcher = ic.GetSearcher( typeof( Person ) );
searcher.Filters.Add( "Birthdate < @ Date" );
searcher.Parameters["Date"] = someDate;
result = searcher.FindAll( );
foreach( Person p in result ) ... ;
Search for relationships of a given type and satisfying a filter searcher = ic.GetSearcher( typeof( EmployeeEmployer ) );
searcher.Filters.Add( "StartDate <= @ Date AND
(EndDate >= @ Date OR isnull(EndDate))" );
searcher.Parameters["Date"] = someDate;
result = searcher.FindAll( );
Foreach( EmployeeEmployer ee in result ) ... ;
Search for items with relationships of a given type and satisfying a filter searcher = ic.GetSearcher( typeof( Folder ) );
searcher.Filters.Add( "MemberRelationships.Name like
'A %'" ); // See [ApiRel]
result = searcher.FindAll( );
Foreach( Folder f in result ) ... ;
Search for item extensions of a given type and satisfying a filter searcher = ic.GetSearcher( typeof( ShellExtension ) );
searcher.Filters.Add( "Keywords.Value = 'Foo'" );
result = searcher.FindAll( );
foreach( ShellExtension se in result ) ... ;
Search for items with item extensions of a given type and satisfying a filter searcher = ic.GetSearcher( typeof( Person ) );
searcher.Filters.Add( "Extensions.Cast(@Type).Keywords.Value =
'Foo'" ); // See [ApiExt]
searcher.Parameters["Type"] = typeof( ShellExtension );
result = searcher.FindAll( );
foreach( Person p in result ) ... ;

(a) Search Options

Various options can be specified when executing a search, including sorting, delay loading, and limiting the number of results.

Sort search results searcher = ic.GetSearcher( typeof( Person ) );
searcher.Filters.Add( "PersonalNames.Surname = 'Smith'" );
SearchOptions options = new SearchOptions( );
options.SortOptions.Add( new SortOption( "Birthdate",
SortOrder.Ascending ) );

```
result = searcher.FindAll( options );
foreach( Person p in result ) . . . ;
// A shortcut is available:
searcher = ic.GetSearcher( typeof( Person ) );
searcher.Filters.Add( "PersonalNames.Surname = 'Smith'" );
result = searcher.FindAll( new SortOption( "Birthdate",
SortOrder.Ascending ) );
foreach( Person p in result ) . . . ;
```

Limit result count

```
searcher = ic.GetSearcher( typeof( Person ) );
searcher.Filters.Add( "PersonalNames.Surname = 'Smith'" );
SearchOptions options = new SearchOptions( );
options.MaxResults = 10;
result = searcher.FindAll( options );
foreach( Person p in result ) . . . ;
```

(b) FindOne and FindOnly

On occasion retrieving only the first result is useful, especially when specifying sort criteria. In addition, some searches are expected to return only one object and are not expected to return no objects.

Search for one object

```
searcher = ic.GetSearcher( typeof( Person ) );
searcher.Filters.Add( "PersonalNames.Surname = 'Smith'" );
Person p = searcher.FindOne( new SortOption( "Birthdate"
SortOrder.Ascending ) ) as Person;
if(p != null) . . . ;
```

Search for single object that is expected to always exist

```
searcher = ic.GetSearcher( typeof( Person ) );
searcher.Filters.Add( "PersonalNames[Surname = 'Smith'
AND Givenname 'John']" );
try
{
    Person p = searcher.FindOnly( );
    . . . ;
}
catch( Exception e )
{
    . . . ;
}
```

(c) Search Shortcuts on ItemContext

There are also a number of shortcut methods on ItemContext that make executing simple searches as easy as possible.

Search using the ItemContext.FindAll shortcut

```
result = ic.FindAll( typeof( Person ), "PersonalNames.Surname =
'Smith'" );
foreach( Person p in result ) . . . ;
```

Search using the ItemContext.FindOne shortcut

```
Person p = ic.FindOne( typeof( Person ), "PersonalNames.Surname =
'Smith'" ) as Person;
```

(d) Find by ID or Path

In addition, Items, relationships, and item extensions can be retrieved by providing their id(s). Items may also be retrieved by path.

Get items, relationships, and item extensions given their id(s)

```
item = ic.FindItemById( iid );
relationship = ic.FindRelationshipById( iid, rid );
itemExtension = ic.FindItemExtensionById( iid, eid );
```

Get items given a path

```
// Single domain only
item = ic.FindItemByPath( @"temp\foo.txt" );
// Single or multi-domain
result = ic.FindAllItemsByPath( @"temp\foo.txt" );
foreach( Item I in result ) . . . ;
```

(e) The GetSearcher Pattern

There are many places in the storage platform API where it is desirable to provide a helper method that executes a search in the context of another object or with specific parameters. The GetSearcher pattern enables these scenarios. There are many GetSearcher methods in the API. Each returns an ItemSearcher pre-configured to perform a given search. For example:

```
searcher = itemContext.GetSearcher( );
searcher = Person.GetSearcher( );
searcher = EmployeeEmployer.GetSearcherGivenEmployer(
organization );
searcher = person.GetSearcherForReports( );
```

You can add additional filters before executing the search:

```
searcher = person.GetSearcherForReports( );
searcher.Filters.Add( "PersonalNames.Surname='Smith'" );
```

You can choose how you want the results:

```
FindResult findResult = searcher.FindAll( );
Person person = searcher.FindOne( );
```

(3) Updating the Store

Once an object has been retrieved by a search it may be modified by the application as needed. New objects may also be created and associated with existing objects. Once the application has made all the changes that form a logical group, the application calls ItemContext.Update to persist those changes to the store. According to yet another aspect of the storage platform API of the present invention, the API collects changes to an item made by an application program and then organizes them into the correct updates required by the database engine (or any kind of storage engine) on which the data store is implemented. This enables application programmers to make changes to an item in memory, while leaving the complexity of data store updates to the API.

Save Changes to a Single Item

```
Person p = ic.FindItemById( pid ) as Person;
p.DisplayName = "foo";
```

-continued

```
p.TelephoneNumbers.Add( new TelephoneNumber( "425-555-1234" ) );
ic.Update( );
```
Save Changes to Multiple Items

```
Household h1 = ic.FindItemById( hid1 ) as Household;
Household h2 = ic.FindItemById( hid2 ) as Household;
Person p = ic.FindItemById( pid ) as Person;
h1.MemberRelationships.Remove( p );
h2.MemberRelationships.Add( p );
ic.Update( );
```
Create a new Item

```
Folder f = ic.FindItemById( fid ) as Folder;
Person p = new Person( );
p.DisplayName = "foo";
f.Relationships.Add( new FolderMember( p, "foo" ) );
ic.Update( );
// Or using a shortcut . . .
Folder f = ic.FindItemById( fid ) as Folder;
Person p = new Person( );
p.DisplayName = "foo";
f.MemberRelationships.Add( p, "foo" );
ic.Update( );
```
Delete relationships (and possibly the target Item)

```
searcher = ic.GetSearcher( typeof( FolderMember ) );
searcher.Filters.Add( "SourceItemId=@fid" );
searcher.Filters.Add( "TargetItemId=@pid" );
searcher.Parameters.Add( "fid", fid );
searcher.Parameters.Add( "pid", pid );
foreach( FolderMember fm in searcher.FindAll( ) ) fm.MarkForDelete( );
ic.Update( );
// Or using a shortcut . . .
Folder f = ic.FindItemById( fid ) as Folder;
f.MemberRelationships.Remove( pid );
ic.Update( );
```
Add an Item Extension

```
Item item = ic.FindItemById( iid );
MyExtension me = new MyExtension( );
me.Foo = "bar";
item.Extensions.Add( me );
ic.Update( );
```
Delete Item Extensions

```
searcher = ic.GetSearcher( typeof( MyExtension ) );
searcher.Filters.Add( "ItemId=@iid" );
searcher.Parameters.Add( "iid", iid );
foreach( MyExtension me in searcher.FindAll( ) ) me.MarkForDelete( );
ic.Update( );
// Or using a shortcut . . .
Item i = ic.FindItemById( iid );
i.Extensions.Remove( typeof( MyExtension ) );
ic.Update( );
```

6. Security

With reference to section II.E above (Security), in the present embodiment of the storage platform API, there are five methods available on the Item Context for retrieving and modifying the security policy associated with an item in the store. These are:

1. GetItemSecurity;
2. SetItemSecurity;
3. GetPathSecurity;
4. SetPathSecurity; and
5. GetEffectiveItemSecurity.

GetItemSecurity and SetItemSecurity provide the mechanism to retrieve and modify the explicit ACL associated with the item. This ACL is independent of the paths that exist to the item and will be in play independent of the holding relationships which have this item as the target. This enables the administrators to reason about the item security independent of the paths that exist to the item if they so desire.

The GetPathSecurity and SetPathSecurity provide the mechanism for retrieving and modifying the ACL that exists on an item because of a holding relationship from another folder. This ACL is composed from the ACL's of the various ancestors to the item along the path under consideration along with the explicit ACL if any supplied for that path. The difference between this ACL and the ACL in the previous case is that this ACL remains in play only as long as the corresponding holding relationship exists while the explicit item ACL is independent of any holding relationship to an item.

The ACL's that can be set on an item with SetItemSecurity and SetPathSecurity is restricted to inheritable and object specific ACE's. They cannot contain any ACE marked as inherited.

The GetEffectiveItemSecurity retrieves the various path based ACL's as well as the explicit ACL on the item. This reflects the authorization policy in effect on the given item.

7. Support for Relationships

As discussed above, the data model of the storage platform defines "relationships" that allow items to be related to one another. When the data classes for a schema are generated, the following classes are produced for each relationship type:

1. A class that represents the relationship itself. This class is derived from the Relationship class and contains members specific to the relationship type.
2. A strongly typed "virtual" collection class. This class is derived from VirtualRelationshipCollection and allows relationship instances to be created and deleted.

This section describes the support for relationshps in the storage platform API.

a) Base Relationship Types

The storage platform API provides a number of types in the System.Storage namespace that form the foundation of the relationship API. These are:

1. Relationship—the base type of all relationship classes
2. VirtualRelationshipCollection—the base type for all relationship collections
3. ItemReference, ItemIdReference, ItemPathReference—Represent the item reference types; the relationship among these types is illustrated in FIG. 11.

(1) Relationship Class

The following is the base class for relationship classes.

```
public abstract class Relationship : StoreObject
{
    // Create with default values.
    protected Relationship( ItemIDReference
    targetItemReference );
    // Informs the relationship that it has been added to a
    relationship collection. The object
    // will interrogate the collection to determine the source
    item, item context, etc.
    internal AddedToCollection( VirtualRelationshipCollection
    collection );
    // The relationship's id.
    public RelationshipId RelationshipId { get; }
    // The id of the source item.
    public ItemId SourceItemId { get; }
    // Get the source item.
    public Item SourceItem { get; }
    // Reference to the target item.
    public ItemIdReference TargetItemReference { get; }
    // Get the target item (calls
    TargetItemReference.GetItem( )).
    public Item TargetItem { get; }
    // Determines if the ItemContext already has a connection
    to the target item's domain (calls
    //TargetItemReference.IsDomainConnected).
```

```
        public bool IsTargetDomainConnected { get; }
        // The name of the target item in the namespace. The
        name must be unique across all the
        // source item's holding relationships.
        public OptionalValue<string> Name {get; set;}
        // Determines if this is a holding or reference
        relationship.
        public OptionalValue<bool> IsOwned {get; set;}
}
```

(2) ItemReference Class

The following is the base class for item reference types.

```
public abstract class ItemReference : NestedElement
{
    // Create with default values.
    protected ItemReference( );
    // Returns the item referenced.
    public virtual Item GetItem( );
    // Determine if a connection to the referenced item's domain
    has been established.
    public virtual bool IsDomainConnected( );
}
```

ItemReference objects may identify items that exist in a store other than the one where the item reference itself resides. Each derived type specifies how a reference to a remote store is constructed and used. Implementations of GetItem and IsDomainConnected in derived classes use the ItemContext's multi-domain support to load items from the necessary domain and to determine if a connection to the domain has already been established.

(3) ItemIdReference Class

The following is the ItemIdReference class—an Item reference that uses an item id to identify the target item.

```
public class ItemIdReference : ItemReference
{
    // Construct a new ItemIdReference with default values.
    public ItemIdReference( );
    // Construct a new ItemIdReference to the specified item. The
    domain associated with the
    // Item is used as the locator.
    public ItemIdReference( Item item );
    // Construct a new ItemIdReference with a null locator and the
    given target item id.
    public ItemIdReference( ItemId itemId );
    // Construct a new ItemIdReference with the given locator and
    item id values.
    public ItemIdReference( string locator, ItemId itemId );
    // The id of the target item.
    public ItemId ItemId {get; set;}
    // A path identifying that WinFS item that contains the target
    item in its domain. If null,
    // the domain that contains the item is not known.
    public OptionalValue<string> Locator {get; set;}
    // Determine if a connection to the referenced item's domain
    has been established.
    public override bool IsDomainConnected( );
    // Retrieves the referenced item.
    public override Item GetItem( );
}
```

GetItem and IsDomainConnected use the ItemContext's multi-domain support to load items from the necessary domain and to determine if a connection to the domain has already been established. This feature is not implemented yet.

(4) ItemPathReference Class

The ItemPathReference Class is an item reference that uses a path to identify the target item. The code for the class is as follows:

```
public class ItemPathReference : ItemReference
{
    // Construct an item path reference with default values.
    public ItemPathReference( );
    // Construct an item path reference with no locator and
    the given path.
    public ItemPathReference( string path );
    // Construct an item path reference with the given
    locator and path.
    public ItemPathReference( string locator, string path );
    // A path identifying that WinFS item that contains the
    target item in it's domain.
    public OptionalValue<string> Locator {get; set;}
    // The path of the target item relative to the item domain
    specified by locator.
    public string Path {get; set;}
    // Determine if a connection to the referenced item's domain
    has been established.
    public override bool IsDomainConnected( );
    // Retrieves the referenced item.
    public override Item GetItem( );
}
```

GetItem and IsDomainConnected use the ItemContext's multi-domain support to load items from the necessary domain and to determine if a connection to the domain has already been established.

(5) RelationshipId Structure

The RelationshipId Structure encapsulates a relationship id GUID.

```
public class RelationshipId
{
    // Generates a new relations id GUID.
    public static RelationshipId NewRelationshipId( );
    // Initialize with a new relationship id GUID.
    public RelationshipId( );
    // Initialize with the specified GUID.
    public RelationshipId( Guid id );
    // Initialize with a string representation of a GUID.
    public RelationshipId( string id );
    // Returns a string representation of the relationship
    id GUID.
    public override string T String( );
    // Converts a System.Guid instance into a RelationshipId
    instance.
    public static implicit operator RelationshipId(Guid guid);
    // Converts a RelationshipId instance into a System.Guid
    instance.
    public static implicit operator Guid(RelationshipId
    relationshipId);
}
```

This value type wraps a guid so that parameters and properties can be strongly typed as a relationship id. OptionalValue<RelationshipId> should be used when a relationship id is nullable. An Empty value, such as provided by System.Guid.Empty, is not exposed. A RelationshipId cannot be constructed with an empty value. When the default constructor is used to create a RelationshipId, a new GUID is created.

(6) VirtualRelationshipCollection Class

The VirtualRelationshipCollection class implements a collection of relationship objects that includes objects from the data store, plus new objects that have been added to the collection, but not including objects that have been removed from the store. Objects of a specified relationship type with a given source item id are included in the collection.

This is the base class for the relationship collection class that is generated for each relationship type. That class can be used as the type of a property in the source item type to provide access and easy manipulation of a given item's relationships.

Enumerating the contents of a VirtualRelationshipCollection requires that a potentially large number of relationship objects be loaded from the store. Applications should use the Count property to determine how many relationships could be loaded before they enumerate the contents of the collection. Adding and removing objects to/from the collection does not require relationships to be loaded from the store.

For efficiency, it is preferable that applications search for relationships that satisfy specific criteria instead of enumerating all of an item's relationships using a VirtualRelationshipCollection object. Adding relationship objects to the collection causes the represented relationships to be created in the store when ItemContext.Update is called. Removing relationship objects from the collection causes the represented relationship to be deleted in the store when ItemContext.Update is called. The virtual collection contains the correct set of objects regardless of whether or not a relationship object is added/removed through the Item.Relationships collection or any other relationship collection on that item.

The following code defines the VirtualRelationshipCollection class:

```
public abstract class VirtualRelationshipCollection : ICollection
{
    // The collection will contain the relationships of the
    specified type owned by the item
    // identified by itemId.
    protected VirtualRelationshipCollection( ItemContext itemContext,
                            ItemId itemId,
                            Type relationshipType );
    // The enumerator will return all the objects retrieved from
    the store minus any object that
    // with the state Deleted in addition to objects that have the
    state Inserted.
    public IEnumerator GetEnumerator( );
    // Returns a count of the number of relationship objects that
    would be returned by the
    // enumerator. This count is computed without needing to
    retrieve all objects from the store.
    public int Count { get; }
    // Always returns false.
    public bool ICollection.IsSynchronized( ) { get; }
    // Always returns this object.
    public object ICollection.SyncRoot { get; }
    // Searches the store for the necessary objects.
    public void Refresh( );
    // Adds the specified relationship to the collection. The
    object must have the state
    // Constructed or Removed. If the state is Constructed, it
    is changed to Added. If the state
    // is Removed, it is changed to Retrieved or Modified as
    appropriate. The relationship's
    // source item id must be the same as the source item id
    provided when the collection was
    // constructed.
    protected void Add( Relationship relationship );
    // Removes the specified relationship from the collection.
    The object's state must be
    // Added, Retrieved or Modified. If the object's state is
    Added, it will be set to
    // Constructed. If the object's state is Retrieved or
    Modified, it will be set to Removed.
    // The relationship's source item id must be the same as the
    source item id provided when
    // the collection was constructed.
    protected void Remove( Relationship relationship );
```

-continued

```
    // The objects that have been removed from the collection.
    public ICollection RemovedRelationships { get; }
    // The objects that have been added to the collection.
    public ICollection AddedRelationships { get; }
    // The objects that have been retrieved from the store.
    This collection will be empty until
    // after the VirtualRelationshipCollection is enumerated
    or Refresh is called (getting this
    // property's value does not cause the collection to be
    filled).
    public ICollection StoredRelationships { get; }
    // Asynchronous methods.
    public IAsyncResult BeginGetCount( IAsyncCallback callback,
        object state );
    public int EndGetCount( IAsyncResult asyncResult );
    public IAsyncResult BeginRefresh( IAsyncCallback callback,
        object state );
    public void EndRefresh( IAsyncResult asyncResult );
}
``` b) Generated Relationship Types

When generating classes for a storage platform schema, a class is generated for each relationship declaration. In addition to a class that represents a relationship itself, a relationship collection class is also generated for each relationship. These classes are used as the type of properties in the relationship's source or target item classes.

This section describes the classes that are generated using a number of "prototype" classes. That is, given a specified relationship declaration, the class that is generated is described. It is important to note the class, type, and end point names used in the prototype classes are place holders for the names specified in the schema for the relationship, and should not be taken literally.

(1) Generated Relationship Types

This section describes the classes that are generated for each relationship type. For example:

```
<Relationship Name="RelationshipPrototype"
BaseType="Holding">
    <Source Name="Head" ItemType="Foo"/>
    <Target Name="Tail" ItemType="Bar"
    ReferenceType="ItemIDReference" />
    <Property Name="SomeProperty"
    Type="WinFSTypes.String" />
</Relationship>
```

Given this relationship definition RelationshipPrototype and RelationshipPrototypeCollection classes would be generated. The RelationshipPrototype class represents the relationship itself. The RelationshipPrototypeCollection class provides access to the RelationshipPrototype instances that have a specified item as the source end point.

(2) RelationshipPrototype Class

This is a prototypical relationship class for a holding relationship named "HoldingRelationshipPrototype" where the source end point is named "Head" and specifies the "Foo" item type and the target end point is named "Tail" and specifies the "Bar" item type. It is defined as follows:

```
public class RelationshipPrototype : Relationship
{
    public RelationshipPrototype( Bar tailItem );
    public RelationshipPrototype( Bar tailItem, string name );
```

-continued

```
        public RelationshipPrototype( Bar tailItem, string name,
            bool IsOwned );
        public RelationshipPrototype( Bar tailItem, bool IsOwned );
        public RelationshipPrototype( ItemIdReference
            tailItemReference );
        // Get the Head item (calls base.SourceItem).
        public Foo HeadItem { get; }
        // Get the Tail item (calls base.TargetItem).
        public Bar TailItem { get; }
        // Represents additional properties declared in the schema
        for the relationship. These are
        // generated just as for properties in an item or nested
        element type.
        public string SomeProperty {get; set;}
        public static ItemSearcher GetSearcher( ItemContext
            itemContext );
        public static ItemSearcher GetSearcher( Foo headItem );
        public static FindResult FindAll( string filter );
        public static RelationshipPrototype FindOne( string
            filter );
        public static RelationshipPrototype FindOnly( string
            filter );
}
```

(3) RelationshipPrototypeCollection Class

This is a prototypical class, generated with the RelationshipPrototype class, that maintains a collection of RelationshipPrototype relationship instances owned by a specified item. It is defined as follows:

```
public class RelationshipPrototypeCollection :
VirtualRelationshipCollection
{
        public RelationshipPrototypeCollection( ItemContext
            itemContext,
                ItemId headItemId );
        public void Add( RelationshipPrototype relationship );
        public RelationshipPrototype Add( Bar bar );
        public RelationshipPrototype Add( Bar bar, string name );
        public RelationshipPrototype Add( Bar bar, string name,
            bool IsOwned );
        public RelationshipPrototype Add( Bar bar, bool IsOwned );
        public void R move( RelationshipPrototype relationship );
        public void Remove( Bar bar );
        public void Remove( ItemId barItemId );
        public void Remove( RelationshipId relationshipId );
        public void Remove( string name );
}
``` c) Relationship Support in the Item Class

The Item class contains a Relationships property that provide access to the relationships in which that item is the source of the relationship. The Relationships property has the type RelationshipCollection.

(1) Item Class

The following code shows the relationship context properties of the Item class:.

```
public abstract class Item : StoreObject
{
        ...
        // Collection of relationships where this item is the source.
        public RelationshipCollection Relationships {get;}
        ...
}
```

(2) RelationshipCollection Class

This class provides access to the relationship instances where a given item is the source of the relationship. It is defined as follows:

```
public class RelationshipCollection : VirtualRelationshipCollection
{
        public RelationshipCollection( ItemContext itemContext,
                ItemId headItemId );
        public void Add( Relationship relationship );
        public Relationship Add( Bar bar );
        public Relationship Add( Bar bar, string name );
        public Relationship Add( Bar bar, string name, bool IsOwned );
        public Relationship Add( Bar bar, bool IsOwned );
        public void Remove ( Relationship relationship );
        public void Remove ( Bar bar );
        public void Remove ( ItemId barItemId );
        public void Remove( RelationshipId relationshipId );
        public void Remove( string name );
}
``` d) Relationship Support in Search Expressions

It is possible to specify the traversal of a join between relationships and related items in a search expression.

(1) Traversing From Items to Relationships

When the current context of a search expression is a set of items, a join between the items and relationship instances where the item is the source can be done using the Item.Relationships property. Joining to relationships of a specific type can be specified using the search expression Cast operator.

Strongly typed relationship collections (e.g. Folder.MemberRelationships) can also be used in a search expression. The cast to the relationship type is implicit.

Once the set of relationships has been established, the properties of that relationship are available for use in predicates or as the target of a projection. When used to specify the target of a projection, the set of relationships would be returned. For example, the following statement would find all persons related to an organization where the StartDate property of the relationships had a value greater then or equal to '1/1/2000'.

```
FindResult result = Person.FindAll( context,
    "Relationships.Cast(Contact.EmployeeOfOrganization).StartDate >
    '1/1/2000'" );
```

If the Person type had a property EmployerContext of type EmployeeSideEmployerEmployee-Relationships (as generated for an EmployeeEmployer relationship type), this could be written as:

```
FindResult result = Person.FindAll( context,
    "EmployerRelationships.StartDate >
    '1/1/2000'" );
```

(2) Traversing From Relationships to Items

When the current context of the search expression is a set of relationships, a join from a relationship to either end point of the relationship can be traversed by specifying the name of the end point. Once the set of related items has been established, the properties of those items are available for use in predicates or as the target of a projection. When used to specify the target of a projection, the set of items would be returned. For example, the following statement would find all EmployeeOfOrganization relationships (regardless of organization) where the employee's last name is name "Smith":

```
FindResult result = EmployeeOfOrganization.FindAll( context,
    "Employee.PersonalNames[SurName='Smith']" );
```

The search expression Cast operator can be used to filter the type of the end point item. For example, to find all the MemberOfFolder relationship instances where the member is a Person item with the surname "Smith":

```
FindResult result = MemberOfFolder.FindAll( context,
    "Member.Cast(Contact.Person).PersonalNames[Surname='Smith']" );
```

(3) Combining Relationship Traversal

The previous two patterns, traversing from items to relationships and from relationships to items, can be combined to achieve arbitrarily complex traversals. For example, to find all organizations with an employee that has the Surname "Smith":

```
FindResult result = Organization.FindAll( context,
    "EmployeeRelationships." +
    "Employee." +
    "PersonalNames[SurName = 'Smith']" );
```

The example below would find all Person items representing people who live in a household that is in the "New York" area (TODO: this is no longer supported . . . what is the alternative).

```
FindResult result = Person.FindAll( context,
    "Relationships.Cast(Contact.MemberOfHousehold)." +
    "Household." +
    "Relationships.Cast(Contact.LocationOfHousehold)." +
    "MetropolitonRegion = 'New York'" );
``` e) Examples Uses of Relationship Support

The following are examples of how the relationship support in the storage platform API can be used to manipulate relationships. For the examples below, assume the following declarations:

```
ItemContext ic = . . . ;
ItemId fid = . . . ; // a folder item's id
Folder folder = Folder.FindById( ic, fid );
ItemId sid = . . . ; // a source item's id.
Item source = Item.FindById( ic, sid );
ItemId tid = . . . ; // an target item's id.
Item target = Item.FindById( ic, tid );
ItemSearcher searcher = null;
```

(1) Searching for Relationships

It is possible to search for source or target relationships. Filters can be used to select relationships of a specified type and that have given property values. Filters can also be used to select relationships based related item type or property values. For example, the following searches can be performed:

All relationships where a given item is the source

```
searcher = Relationship.GetSearcher( folder );
foreach( Relationship relationship in searcher.FindAll( ) ) . . . ;
```
All relationships where a given item is the source that have a name that matches "A %"

```
searcher = Relationship.GetSearcher( folder );
searcher.Filters.Add( "Name like 'A %'" );
foreach( Relationship relationship in searcher.FindAll( ) ) . . . ;
```
All FolderMember relationships where a given item is the source

```
searcher = FolderMember.GetSearcher( folder );
foreach( FolderMember folderMember in searcher.FindAll( ) ) . . . ;
```
All FolderMember relationships where a given item is the source and a name like 'A %'

```
searcher = FolderMember.GetSearcher( folder );
searcher.Filters.Add( "Name like 'A %'" );
foreach( FolderMember folderMember in searcher.FindAll( ) ) . . . ;
```
All FolderMember relationships where the target item is a Person

```
searcher = FolderMember.GetSearcher( folder );
searcher.Filters.Add( "MemberItem.Cast(Person)" );
foreach( FolderMember folderMember in searcher.FindAll( ) ) . . . ;
```
All FolderMember relationships where the target item is a Person with the Surname "Smith"

```
searcher = FolderMember.GetSearcher( folder );
searcher.Filters.Add(
    "MemberItem.Cast(Person).PersonalNames.Surname='Smith'" );
foreach( FolderMember folderMember in searcher.FindAll( ) ) . . . ;
```

In addition to the GetSearcher API shown above, each relationship class supports static FindAll, FindOne, and FindOnly API. In addition, a relationship type can be specified when calling ItemContext.GetSearcher, ItemContext.FindAll, ItemContext.FindOne, or ItemContext.FindOnly.

(2) Navigating from a Relationship to the Source and Target Items

Once a relationship object has been retrieved through a search, it is possible to "navigate" to the target or source item. The base relationship class provides SourceItem and TargetItem properties that return an Item object. The generated relationship class provides the equivalent strongly typed and named properties (e.g. FolderMember.FolderItem and FolderMember.MemberItem). For example:

Navigate to source and target item for relationship with the name "Foo"

```
searcher = Relationship.GetSearcher( );
searcher.Filters.Add( "Name='Foo'" );
foreach( Relationship relationship in searcher.FindAll( ) )
{
        Item source = relationship.SourceItem;
        Item target = relationship.TargetItem;
}
```
Navigate to the target item

```
searcher = FolderMember.GetSearcher( folder );
searcher.Filters.Add( "Name like 'A %'" );
foreach( FolderMember folderMember in searcher.FindAll( ) )
{
    Item member = folderMember.TargetItem;
    . . .
}
```

Navigating to a target item works even if the target item is not in the domain where the relationship was found. In such cases, the storage platform API opens a connection to the target domain as needed. Applications can determine if a connection would be required before retrieving the target item.

---
Check for target item in an unconnected domain

```
searcher = Relationship.GetSearcher( source );
foreach( Relationship relationship in searcher.FindAll( ) )
{
    if( relationship.IsTargetDomainConnected )
    {
        Item member = relationship.TargetItem;
        ...
    }
}
```
---

(3) Navigating from Source Items to Relationships

Given an item object, it is possible to navigate to the relationships for which that item is the source without executing an explicit search. This is done using the Item.Relationships collection property or a strongly typed collection property such as Folder.MemberRelationships. From a relationship, it is possible to navigate to the target item. Such navigation works even if the target item is not in the item domain associated with the source item's ItemContext, including when the target item is not in the same store as the target item. For example:

---
Navigate from a Source Item to Relationship to Target Items

```
Console.WriteLine( "Item {0} is the source of the following
relationships:", source.ItemId );
foreach( Relationship relationship in source.Relationships )
{
    Item target = relationship.TargetItem;
    Console.WriteLine( " {0} ==> {1}",
        relationship.RelationshipId, target.ItemId );
}
```
Navigate from a Folder Item to Foldermember Relationships to Target Items

```
Console.WriteLine( "Item {0} is the source of the following
relationships:", folder.ItemId );
foreach( FolderMember folderMember in folder.MemberRelationships )
{
    Item target = folderMember.GetMemberItem( );
    Console.WriteLine( " {0} ==> {1}",
        folderMember.RelationshipId, target.ItemId );
}
```
---

An item may have many relationships, so applications should use caution when enumerating a relationship collection. In general, a search should be used to identify particular relationships of interest instead of enumerating the entire collection. Still, having a collection based programming model for relationships is valuable enough, and items with many relationships rare enough, that the risk of abuse by the developer is justified. Applications can check the number of relationships in the collection and use a different programming model if needed. For example:

---
Check the size of a relationship collection

```
if( folder.MemberRelationships.Count > 1000 )
{
    Console.WriteLine( "Too many relationships!" );
}
```
---

-continued

```
else
{
    ...
}
```
---

The relationship collections described above are "virtual" in the sense that they are not actually populated with objects that represent each relationship unless the application attempts to enumerate the collection. If the collection is enumerated, the results reflect what is in the store, plus what has been added by the application but not yet saved, but not any relationships that have been removed by the application but not saved.

(4) Creating Relationships (and Items)

New relationships are created by creating a relationship object, adding it to a relationship collection in the source item, and updating the ItemContext. To create a new item, a holding or embedding relationship must be created. For example:

---
Add a new item to an existing folder

```
Bar bar = new Bar( );
folder.Relationships.Add( new FolderMember( bar, "name" ) );
ic.Update( );
// Or
Bar bar = new Bar( );
folder.MemberRelationships.Add( new FolderMember( bar, "name" ) );
ic.Update( );
// Or
Bar bar = new Bar( );
folder.MemberRelationships.Add( bar, name );
ic.Update( );
```
Add an existing item to an existing folder

```
folder.MemberRelationships.Add( target, "name" );
ic.Update( );
```
Add an existing item to a new folder

```
Folder existingFolder = ic.FindItemById( fid ) as Folder;
Folder newFolder = new Folder( );
existingFolder.MemberRelationships.Add( newFolder, "a name" );
newFolder.MemberRelationships.Add( target, "a name" );
ic.Update( );
```
Add a new item to a new folder

```
Folder existingFolder = ic.FindItemById( fid ) as Folder;
Folder newFolder = new Folder( );
existingFolder.MemberRelationships.Add( newFolder, "a name" );
Bar bar = new Bar( );
newFolder.MemberRelationships.Add( bar, "a name" );
ic.Update( );
```
---

(5) Deleting Relationships (and Items)

---
Delete a holding relationship

```
// If the source item and relationship ids are known ...
RelationshipId rid = ... ;
Relationship r = ic.FindRelationshipById( fid, rid );
r.MarkForDelete;
ic.Update( );
// Otherwise ...
folder.MemberRelationships.Remove( target );
ic.Update( );
```
---

8. "Extending" the Storage Platform API

As noted above, every storage platform schema results in a set of classes. These classes have standard methods such as Find* and also have properties for getting and setting field values. These classes and associated methods form the foundation of the storage platform API.

a) Domain Behaviors

In addition to these standard methods, every schema has a set of domain specific methods for it. We call these domain behaviors. For example, some of the domain behaviors in the Contacts schema are:

Is an email address valid?

Given a folder, get the collection of all members of the folder.

Given an item ID, get an object representing this item

Given a Person, get his online status

Helper functions to create a new contact or a temporary contact

And so on.

It is important to note that while we make a distinction between "standard" behaviors (Find*, etc) and domain behaviors, they simply appear as methods to the programmer. The distinction between these methods lies in the fact that standard behaviors are generated automatically from the schema files by the storage platform API design time tools while domain behaviors are hard-coded.

By their very nature, these domain behaviors should be hand-crafted. This leads to a practical problem: the initial version of C# requires that the entire implementation of a class be within a single file. Thus, this forces the auto-generated class files to have to be edited to add domain behaviors. By itself, this can be a problem.

A feature called partial classes has been introduced in C# for problems such as these. Basically, a partial class allows the class implementation to span multiple files. A partial class is the same as a regular class except that its declaration is preceded by the keyword partial:

```
partial public class Person : DerivedItemBase
{
    // implementation
}
```

Now, domain behaviors for Person can be put in a different file like so: partial public class Person

```
partial public class Person
{
    public EmailAddress PrimaryEmailAddress
    {
        get { /*implementation*/ }
    }
}
``` b) Value-Add Behaviors

Data classes with domain behaviors form a foundation that application developers build on. However, it is neither possible nor desirable for data classes to expose every conceivable behavior related to that data. The storage platform allows a developer to build on the base functionality offered by the storage platform API. The basic pattern here is to write a class whose methods take one or more of the the storage platform data classes as parameters. For example, the value add classes for sending email using Microsoft Outlook or using Microsoft Windows messenger can be as below:

```
MailMessage m = MailMessage.FindOne( . . . );
OutlookEMailServices.SendMessage(m);
Person p = Person.FindOne( . . . );
WindowsMessagerServices m = new WindowsMessagerServices(p);
m.MessageReceived += new MessageReceivedHandler( f );
m.SendMessage("Hello");
```

These value-add classes can be registered with the storage platform. The registration data is associated with the schema metadata the storage platform maintains for every installed storage platform type. This metadata is stored as storage platform items and can be queried.

Registration of value-add classes is a powerful feature; for example, it allows the following scenario: Right click on a Person object in the Shell explorer and the set of actions allowed could be derived from the value-add classes registered for Person.

c) Value-Add Behaviors as Service Providers

In the present embodiment, the storage platform API provides a mechanism whereby value-add classes can be registered as "services" for a given type. This enables an application to set and get service providers (=value add classes) of a given type. Value-add classes wishing to utilize this mechanism should implement a well known interface; for example:

```
interface IChatServices
{
    void SendMessage(string msg);
    event MessageReceivedHandler MessageReceived;
}
class WindowsMessengerServices : IChatServices
{
    ...
}
class YahooMessengerServices : IChatServices
{
    ...
}
```

All the storage platform API data classes implement the ICachedServiceProvider interface. This interface extends the System.IServiceProvider interface as follows:

```
interface ICachedServiceProvider : System.IServiceProvider
{
    void SetService(System.Type type, Object provider);
    void RemoteService(System.Type type);
}
```

Using this interface, applications can set the service provider instance as well as request a service provider of a specific type.

To support this interface, the storage platform data class maintains a hashtable of service providers keyed by type. When a service provider is requested, the implementation first looks in the hashtable to see if a service provider of the specified type has been set. If not, the registered service provider infrastructure is used to identify a service provider of the specified type. An instance of this provider is then created, added to the hashtable, and returned. Note that it is also possible for a shared method on the data class to request a service provider and forward an operation to that provider.

For example, this could be used to provide a Send method on the mail message class that uses the e-mail system specified by the user.

9. Design Time Framework

This section describes how a storage platform Schema gets turned into storage platform API classes on the client and UDT classes on the server, in accordance with the present embodiment of the invention. The diagram of FIG. 24 shows the components involved.

Figure 24:
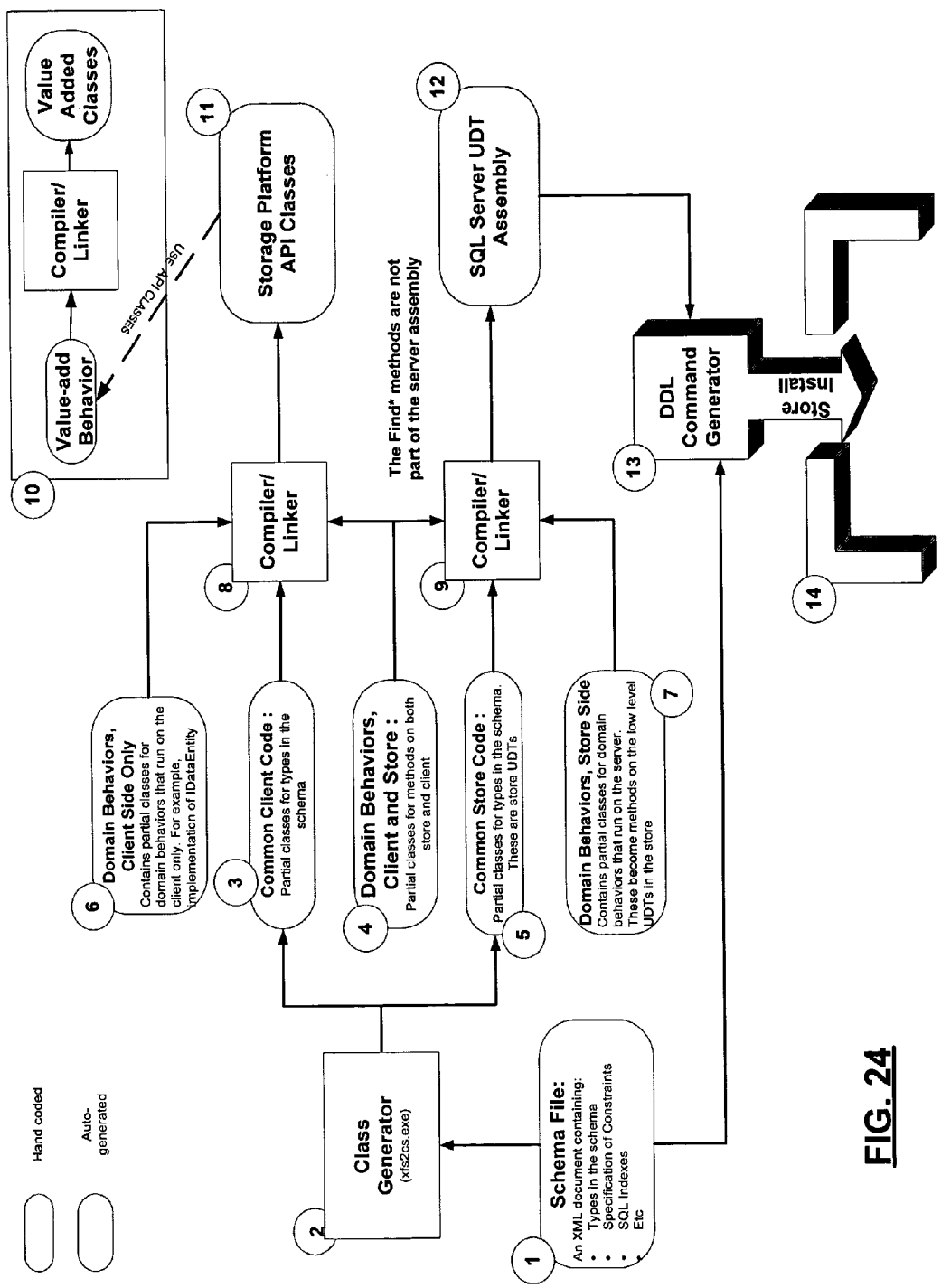
FIG. 24 illustrates the process by which storage platform API classes are generated from the storage platform Schema, in accordance with an aspect of the present invention.

With reference to FIG. 24, the types in the schema are contained in an XML file (box 1). This file also contains field level and item level constraints associated with the schema. The storage platform Class generator (xfs2cs.exe—box 2) takes this file and generates the partial classes for the store UDTs (box 5) and partial classes for the client classes (box 3). For each schema domain, there exist additional methods— which we call domain behaviors. There are domain behaviors that make sense on the store (box 7), on the client (box 6), and in both places (box 4). The code in boxes 4, 6, and 7 are hand written (not—auto generated). The partial classes in boxes 3, 4, and 6 together form the complete class implementation for the storage platform API domain classes. Boxes 3, 4, and 6 are compiled (box 8) to form the storage platform API classes— box 11 (actually, the storage platform API is the result of compiling boxes 3, 4, and 6 that result from all initial schema domains). In addition to the domain classes, there also exist additional classes which implement value-add behavior. These classes make use of one or more classes in one or more schema domains. This is represented by box 10. The partial classes in box 4, 5, and 7 together form the complete class implementation for server UDT classes. Boxes 4, 5, and 7 are compiled (box 9) to form the server side UDT assembly—box 12 (actually, the server side UDT assembly is the result of compiler-plus-ing boxes 4, 5, and 7 that result from all initial schema domains). The DDL Command Generator module (box 13) takes the UDT assembly (box 12) and the Schema file (box 1), and installs them on the data store. This process involves, among other things, the generation of tables and views for the types in each schema.

10. Query Formalism

When reduced to the basics, the application's pattern when using the storage platform API is: Open an ItemContext; use Find with a filter criterion to retrieve the desired objects; operate on the objects; and send changes back to the store. This section is concerned with the syntax of what goes into the filter string.

The filter string provided when finding the storage platform data objects describes the conditions that the properties of the objects must meet in order to be returned. The syntax used by the storage platform API supports type casts and relationship traversal.

a) Filter Basics

A filter string is either empty, indicating that all objects of the specified type are to be returned, or a boolean expression that each returned object must satisfy. The expression references the object's properties. The storage platform API runtime knows how these property names map to the storage platform type field names and, ultimately, to the SQL views maintained by the the storage platform store.

Consider the following examples:

```
// Find all people
FindResult res1 = Person.FindAll(ctx)
// Find all people that have a Gender property value equal
// to "Male"
FindResult res2 = Person.FindAll(ctx, "Gender='Male'")
// Find all people that have a Gender property value equal
// to "Male" and that were born in the last millennium.
FindResult res3 = Person.FindAll(
    ctx,
    "Gender='Male' And Birthdate < '1/1/2001'")
```

The properties of nested objects can also be used in the filter. For example:

```
// Find all people that were modified in the last 24 hours
FindResult res1 = Person.FindAll(
    ctx,
    String.Format("Item.Modified > '{0}'",DateTime.Now.Subtract(new
    TimeSpan(24,0,0))));
```

For collections, it is possible to filter members using a condition in square brackets. For example:

```
// Find all people with the first name "John" and the last name
// "Smith"
FindResult res1 = Person.FindAll(
    ctx,
    "PersonalNames[GivenName='John' And Surname='Smith']")
// Find all people with a real time address from provider 'x'
// and with an online status category of 'y'
FindResult res2 = Person.FindAll(
    ctx,
    "PersonalRealtimeAddress[ProviderURI='x'].BasicPresence." +
        "OnlineStatus.Category='y'")
```

The following example lists all people born since Dec. 31, 1999:

```
ItemContext ctx = ItemContext.Open("Work Contacts");
FindResult results =
    Person.FindAll( ctx, "Birthdate > '12/31/1999'" );
foreach( Person person in results )
    Console.WriteLine(person.DisplayName);
ctx.Close( );
```

Figure 23:
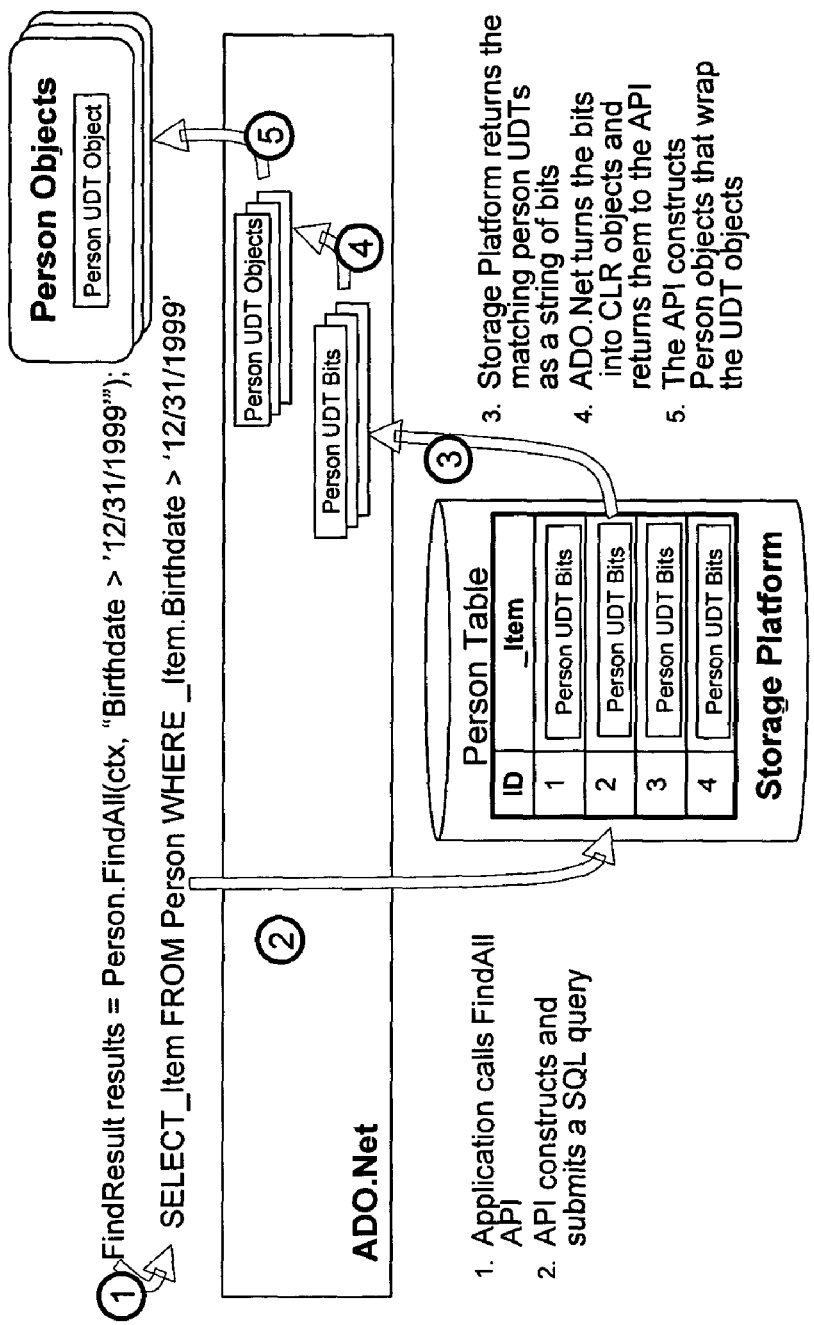
FIG. 23 illustrates the execution of a FindAll operation, in accordance with an embodiment of the present invention.

Line 1 creates a new ItemContext object to access the "Work Contacts" on the storage platform share on the local computer. Lines 3 and 4 get a collection of Person objects where the Birthdate property specifies a date more recent then Dec. 31, 1999, as specified by the expression "Birthdate >'Dec. 31, 1999'". The execution of this FindAll operation is illustrated in FIG. 23.

b) Type Casts

It is often the case that the type of a value stored in a property is derived from the properties declared type. For example, the PersonalEAddresses property in Person contains a collection of types derived from EAddress such as EMailAddress and TelephoneNumber. In order to filter based on telephone area code, it is necessary to cast from the EAddress type to the TelephoneNumber type:

```
// Find all people with a phone number in the 425 area code
FindResult res1 = Person.FindAll(
    ctx,
    "PersonalEAddresses." +
        "Cast(System.Storage.Contact.TelephoneNumber))." +
        "AreaCode='425'");
// Alternatively, you could pass the type name as follows:
FindResult res1 = Person.FindAll(
    ctx,
    String.Format("PersonalEAddresses.Cast({0})).AreaCode='425'",
        typeof(TelephoneNumber).FullName ))
``` c) Filter Syntax

Below is a description of the filter syntax supported by the storage platform API, in accordance with one embodiment.

```
Filter ::= EmptyFilter | Condition
EmptyFilter ::=
Condition ::= SimpleCondition | CompoundCondition |
ParenthesizedCondition
SimpleCondition ::= ExistanceCheck | Comparison
ExistanceCheck ::= PropertyReference
Comparison ::= PropertyReference ComparisonOp Constant
CompoundCondition ::= SimpleCondition BooleanOp Condition
ParenthesizedCondition ::= '(' Condition ')'
ComparisonOp ::= '!=' | '==' | '=' | '<' | '>' | '>=' || '<='
BooleanOp ::= 'And' | '&&' | 'Or' | '||'
Constant ::= StringConstant | NumericConstatant
StringConstant ::= "'" (any Unicode character)* "'"
    Note: embedded ' characters are escaped by duplication
NumericConstant ::= 0-9*
PropertyReference ::= SimplePropertyName | CompoundPropertyName
SimplePropertyName ::= (all Unicode characters except '.' and space)*
Filter?
Filter ::= '[' Condition ']'
CompoundPropertyName ::=
    (Typecast | RelationshipTraversal | SimplePropertyName) '.'
    PropertyReference
TypeCast ::= 'Cast(' TypeName ')'
RelationshipTraversal ::= TraversalToSource | TraversalToTarget
TraversalToSource ::= 'Source(' FullRelationshipName ')'
TraversalToTarget ::= 'Target(' FullRelationshipName ')'
TypeName ::= a fully qualified CLR type name
FullRelationshipName ::= SchemaName '.' RelationshipName
SchemaName ::= the storage platformName
RelationshipName ::= the storage platformName
the storage platformName ::= as defined in [SchemaDef]
```

11. Remoting a) Local/Remote Transparency in the API

Data access in the storage platform is targeted to the local storage platform instance. The local instance serves as a router if the query (or part thereof) refers to remote data. The API layer thus provides local/remote transparency: there is no structural difference in the API between local and remote data access. It is purely a function of the requested scope.

The storage platform data store also implements distributed queries; thus, it is possible to connect to a local storage platform instance and perform a query which includes items from different volumes, some of which are on the local store and others on the remote store. The store unions the results and presents it to the application. From the point of view of the storage platform API (and hence the application developer) any remote access is completely seamless and transparent.

The storage platform API allows an application to determine if a given ItemContext object (as returned by the ItemContext.Open method) represents a local or remote connection using the IsRemote property—this is a property on the ItemContext object. Among other things, the application may wish to provide visual feedback to help set user expectations for performance, reliability, etc.

b) Storage Platform Implementation of Remoting

The storage platform data stores talk to each other using a special OLEDB provider which runs over HTTP (the default OLEDB provider uses TDS). In one embodiment, a distributed query goes through the default OPENROWSET functionality of the relational database engine. A special user defined function (UDF): DoRemoteQuery(server, queryText) is provided to do actual remoting.

c) Accessing Non-Storage Platform Stores

In one embodiment of the storage platform of the present invention, there is no generic provider architecture that allows any store to participate in storage platform data access. However, a limited provider architecture for the specific case of Microsoft Exchange and Microsoft Active Directory (AD) is provided. This implies that developers can use the storage platform API and access data in AD and Exchange just as they would in the storage platform, but that the data they can access is limited to the storage platform schematized types. Thus, address book (=collection of the storage platform Person types) is supported in AD, and mail, calendar and contacts are supported for Exchange.

d) Relationship to DFS

The storage platform property promoter does not promote past mount points. Even though the namespace is rich enough to access through mount points, queries do not pass through them. The storage platform volumes can appear as leaf nodes in a DFS tree.

e) Relationship to GXA/Indigo

A developer can use the storage platform API to expose a "GXA head" on top of the data store. Conceptually, this is no different from creating any other web service. The storage platform API does not talk to a storage platform data store using GXA. As mentioned above, the API talks to the local store using TDS; any remoting is handled by the local store using the synchronization service.

12. Constraints

The storage platform data model allows value constraints on types. These constraints are evaluated on the store automatically and the process is transparent to the user. Note that constraints are checked at the server. Having noted this, sometimes, it is desirable to give the developer the flexibility to verify that the input data satisfies the constraints without incurring the overhead of a round trip to the server. This is especially useful in interactive applications where the end user enters the data which is used to populate an object. The storage platform API provides this facility.

Recall that a storage platform Schema is specified in an XML file, which is used by the storage platform to generate the appropriate database objects representing the schema. It is also used by the design time framework of the storage platform API to auto generate classes.

Here's a partial listing of the XML file used to generate the Contacts schema:

```
<Schema Name="Contacts" MajorVersion="1" MinorVersion="8">
    <ReferencedSchema Name="Base" MajorVersion="1" />
    <Type Name="Person" MajorVersion="1" MinorVersion="0"
          ExtendsType="Principal" ExtendsVersion="1">
```

```
        <Field Name="Birthdate" Type="the
        storage platformTypes.datetime"
            Nullable="true" MultiValued="false" />
        <Field Name="Gender" Type="the storage
        platformTypes.nvarchar(16)"
            Nullable="true" MultiValued="false" />
        <Field Name="PersonalNames" Type="FullName"
        TypeMajorVersion="1"
            Nullable="true" MultiValued="true" />
        <Field Name="PersonalEAddresses" Type="EAddress"
            TypeMajorVersion="1" Nullable="true"
            MultiValued="true" />
        <Field Name="PersonalPostalAddresses"
        Type="PostalAddress"
            TypeMajorVersion="1" Nullable="true"
            MultiValued="true" />
        <Check>expression</Check>
    </Type>
    ...
    ...
</Schema>
```

The Check tags in the XML above specify the constraints on the Person type. There can be more than one check tag. The above constraint is generally checked in the store. To specify that the constraint can also be checked explicitly by the application, the above XML is modified like so:

```
<Schema Name="Contacts" MajorVersion="1" MinorVersion="8">
    <ReferencedSchema Name="Base" MajorVersion="1" />
    <Type Name="Person" ... >
        <Field Name="Birthdate" Type="the
        storage platformTypes.datetime"
            Nullable="true" MultiValued="false" />
        ...
        <Check InApplication="true">expression</Check>
    </Type>
    ...
    ...
</Schema>
```

Note the new "InApplication" attribute on the <Check>element, which is set to true. This causes the storage platform API to surface the constraint in the API through an instance method on the Person class called Validate( ). The application can call this method on the object to ensure that the data is valid and, preventing a potentially useless round trip to the server. This returns a bool to indicate the results of validation. Note that the value constraints are still applied at the server regardless of whether the client calls <object>.Validate( ) method or not. Here's an example of how Validate can be used:

```
ItemContext ctx = ItemContext.Open( );
// Create a contact in the user's My Contacts folder.
Folder f = UserDataFolder.FindMyPersonalContactsFolder( ctx );
Person p = new Person( f );
// Set the person's birthdate.
p.Birthdate = new DateTime( 1959, 6, 9 );
// Add a name categorized as a personal name
FullName name = new FullName( FullName.Category.PrimaryName );
name.GivenName = "Joe";
name.Surname = "Smith";
p.PersonalNames.Add( name );
//validate the Person object
if (p.Validate( ) == false)
{
    // data does not represent a valid person
}
```

```
// save changes
p.Update( );
ctx.Close( );
```

There exist multiple access paths to the the storage platform store—the storage platform API, ADO.NET, ODBC, OLEDB, and ADO. This raises the question of authoritative constraint checking—that is, how can we guarantee that data written from, say, ODBC, go through the same data integrity constraints as would data written from the storage platform API. Since all constraints are checked at the store, the constraints are now authoritative. Regardless of what API path one uses to get to the store, all writes to the store are filtered through the constraint checks at the store.

13. Sharing

A share in the storage platform is of the form:

\\<DNS Name>\<Context Service>, where <DNS Name> is the DNS name of the machine, and <Context Service> is a containment folder, virtual folder, or an item in a volume on that machine. For example, assume that the machine "Johns_Desktop" has a volume called Johns_Information, and in this volume there exists a folder called Contacts_Categories; this folder contains a folder called Work, which has the work contacts for John:

\\Johns_Desktop\Johns_Information$\Contacts_Categories\Work

This can be shared as "WorkContacts". With the definition of this share, \\Johns_DesktopWorkContacts\JaneSmith is a valid storage platform name, and identifies the Person item JaneSmith.

a) Representing a Share

The share item type has the following properties: the share name, and the share target (this can be a non-holding link). For example, the aforementioned share's name is WorkContacts and target is Contacts_CategoriesWork on the volume Johns_Information. Below is the schema fragment for the Share type:

```
<Schema
    xmlns=
        "http://schemas.microsoft.com/winfs/2002/11/18/schema"
    Name="Share" MajorVersion="1" MinorVersion="0">
        <ReferencedSchema Name="Base" MajorVersion="1"/>
        <ReferencedSchema Name="the storage platformTypes"
        MajorVersion="1"/>
        <Type Name="Share" MajorVersion="1" MinorVersion="0"
            ExtendsType="Base.Item" ExtendsVersion="1">
            <Field Name="Name" Type="the storage
            platformTypes.nvarchar(512)"
                TypeMajorVersion="1"/>
            <Field Name="Target" Type="Base.RelationshipData"
            TypeMajorVersion="1"/>
        </Type>
</Schema>
``` b) Managing Shares

Because a share is an item, shares can be managed just as with other items. A share can be created, deleted, and modified. A share is also secured the same way as other storage platform items.

c) Accessing Shares

An application accesses a remote storage platform share by passing the share name (e.g. \\Johns_Desktop\WorkContacts) to the storage platform API in the ItemContext.Open( ) method call. ItemContext.Open returns an ItemContext object instance. The storage platform API then talks to the local storage platform service (recall that accessing remote storage platform shares is done via the local storage platform). In turn, the local storage platform service talks to a remote storage platform service (e.g. on machine Johns_Desktop) with the given share name (e.g. WorkContacts). The remote storage platform service then translates WorkContacts into Contacts_Categories\Work and opens it. After that, query and other operations are performed just like other scopes.

d) Discoverability

In one embodiment, an application program can discover shares available on a given <DNS Name>, in the following ways. According to the first way, the storage platform API accepts a DNS name (e.g. Johns_Desktop) as the scope parameter in ItemContext.Open( ) method. The storage platform API then connects to the storage platform store with this DNS name as part of a connection string. With this connection, the only possible thing an application can do is call ItemContext.FindAll(typeof(Share)). A storage platform service then unions all the shares on all the attached volumes and returns the collection of shares. According to the second way, on a local machine, an administrator can easily discover the shares on a particular volume by FindAll(typeof(Share)), or a particular folder by FindAll(typeof(Share), "Target(ShareDestination).Id =folderId").

14. Semantics of Find

The Find* methods (regardless of whether they are called on the ItemContext object or on an individual item) generally apply to Items (including embedded items) within a given context. Nested elements do not have a Find—they cannot be searched independently of their containing Items. This is consistent with the semantic desired by the storage platform data model, where nested elements derive their "identity" from the containing item. To make this notion clearer, here are examples of valid and invalid find operations:

a) Show me all telephone numbers in the system which have an area code of 206?

Invalid, since the find is being done on telephone numbers—an element—without reference to an item.

b) Show me all telephone numbers within all Persons which have area code of 206?

Invalid, even though a Person (=item) is referenced, the search criterion does not involve that item.

c) Show me all telephone numbers of Murali (=one single person) which have area code of 206?

Valid, since there is a search criterion on an Item (a Person named "Murali"). The exception to this rule is for nested element types derived directly or indirectly from the Base.Relationship type. These types can be queried individually through relationship classes. Such queries can be supported because the storage platform implementation employs a "master link table" to store Relationship elements instead of embedding them inside item UDTs.

15. The Storage Platform Contacts API

This section gives an overview of the storage platform Contacts API. The schema behind the Contacts API is shown in FIGS. 21A and 21B.

a) Overview of System.Storage.Contact

The storage platform API includes a namespace for dealing with items and elements in the Contacts schema. This namespace is called System.Storage.Contact.

This schema has, for example, the following classes:

Items: UserDataFolder, User, Person, ADService, Service, Group, Organization, Principal, Location Elements: Profile, PostalAddress, EmailAddress, TelephoneNumber, RealTimeAddress, EAddress, FullName, BasicPresence, GroupMembership, RoleOccupancy b) Domain Behaviors Below is a list of domain behaviors for the Contacts schema. When viewed from a high enough level, domain behaviors fall into well-recognizable categories:

Static Helpers, for example, Person.CreatePersonalContact( ) to create a new personal contact;

Instance Helpers, for example user.AutoLoginToAllProfiles( ), which logs in a user (instance of User class) into all profiles that are marked for auto login;

CategoryGUIDs, for example, Category.Home, Category.Work, etc;

Derived properties, for example, emailAddress.Address( )—returns a string that combines the username and domain fields of the given emailAddress (=instance of EmailAddress class); and Derived collections, for example, person.PersonalEmailAddresses—given an instance of Person class, get her personal email addresses.

The table below gives, for each class in Contacts that has domain behaviors, a list of these methods and the category they belong to.

| | | |
|---|---|---|
| BasicPresence | Category URIs | UnknownCategoryURI, OfflineCategoryURI, BusyCategoryURI, AwayCategoryURI, OnlineCategoryURI |
| | Static helpers | ConvertPresenceStateToString - format presence state as a localized string (actually localization needs to be added; just does a friendly English string now). |
| Category | Category GUIDs | Home, Work, Primary, Secondary, Cell, Fax, Pager |
| EmailAddress | Derived properties | Address - combines username and domain |
| | Static helpers | IsValidEmailAddress |
| Folder | Derived properties | GetChildItemCollection - makes an item collection based on the Targets of the FolderMembership. |
| | Static helpers | GetKnownFolder - specialized queries to get well-known folders AddToPersonalContacts - adds an item to the well-known personal contacts folder |
| Items | Static helpers | GetItemFromID - does ID based query |
| Relationship | Instance helpers | BindToTarget - returns Item for Target |
| Person | Derived collections | PersonalRealtimeAddresses, PersonalEmailAddresses, PersonalTelephoneNumbers |
| | Derived properties | OnlineStatus, OnlineStatusIconSource, |

-continued

| | | |
|---|---|---|
| | Static helpers | PrimaryEmailAddress, PrimarySecurityID CreatePersonalContact, CreateTemporaryContact - creates new person in well-known folder GetCurrentUser - get's Person for currently logged in user |
| SecurityID | Derived properties | UserName, DomainName, DomainUserName |
| TelephoneNumber | Instance helpers | SetFromUserInputString - parses telephone number string into parts |
| | Static helpers | ParseNumber - parses telephone number string into parts |
| User | Instance helpers | AutoLoginToAllProfiles - logs into all profiles that are marked for autologin |

16. Storage Platform File API

This section gives an overview of the the storage platform File API, in accordance with one embodiment of the present invention.

a) Introduction (1) Reflecting an NTFS Volume in the Storage Platform

The storage platform provides a way of indexing over content in existing NTFS volumes. This is accomplished by extracting ("promoting") properties from each file stream or directory in NTFS and storing these properties as Items in the storage platform.

The storage platform File schema defines two item types—File and Directory—to store promoted file system entities. The Directory type is a subtype of the Folder type; it is a containment folder which contains other Directory items or File items.

A Directory item can contain Directory and File items; it cannot contain items of any other type. As far as the storage platform is concerned, Directory and File items are read-only from any of the data access APIs. The File System Promotion Manager (FSPM) service asynchronously promotes changed properties into the storage platform. The properties of File and Directory items can be changed by the Win32 API. The storage platform API can be used to read any of the properties of these items, including the stream associated with a File item.

(2) Creating Files and Directories in the storage Platform Namespace

When an NTFS volume gets promoted to a storage platform volume, all the files and directories therein are in a specific part of that volume. This area is read-only from the storage platform perspective; the FSPM can create new directories and files and/or change properties of existing items.

The rest of the namespace of this volume can contain the usual gamut of the storage platform item types—Principal, Organization, Document, Folder, etc. The storage platform also allows you to create Files and Directories in any part of the the storage platform namespace. These "native" Files and Directories have no counterpart in the NTFS file system; they are stored entirely in the storage platform. Furthermore, changes to properties are visible immediately.

However, the programming model remains the same: they are still read-only as far as the the storage platform data access APIs are concerned. The "native" Files and Directories have to be updated using Win32 APIs. This simplifies the developer's mental model, which is:

1. Any storage platform item type can be created anywhere in the namespace (unless prevented by permissions, of course);
2. Any storage platform item type can be read using the storage platform API;
3. All storage platform items types are writable using the storage platform API with the exception of File and Directory;
4. To write to File and Directory items regardless of where they are in the namespace, use the Win32 API; and
5. Changes to File/Directory items in the "promoted" namespace may not appear immediately in the storage platform; in the "non-promoted" namespace, the changes are reflected immediately in the storage platform.

b) File Schema

Figure 25:
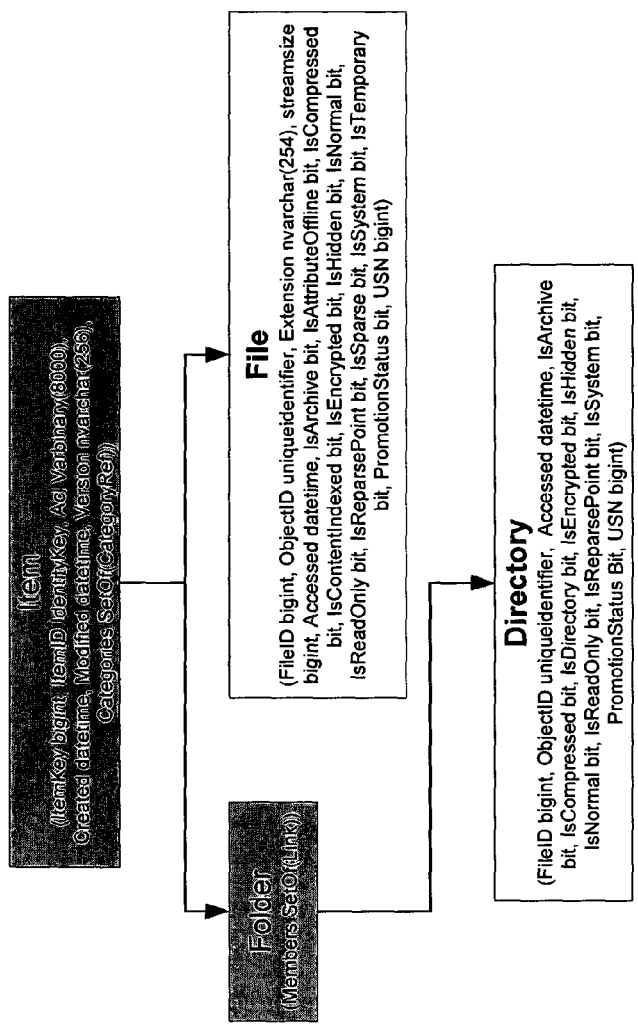
FIG. 25 illustrates a schema on which a File API is based, in accordance with another aspect of the present invention.

FIG. 25 illustrates the schema on which the File API is based.

c) Overview of System.Storage.Files

The storage platform API includes a namespace for dealing with file objects. This namespace is called System.Storage.Files. The data members of the classes in System.Storage.Files directly reflect the information stored in the storage platform store; this information is "promoted" from the file system objects or may be created natively using the Win32 API. The System.Storage.Files namespace has two classes: FileItem and DirectoryItem. The members of these classes and methods thereof can be readily divined by looking at the schema diagram in FIG. 25. FileItem and DirectoryItem are read-only from the storage platform API. In order to modify them, one has to use the Win32 API or classes in System.IO.

d) Code Examples

In this section, three code examples are provided illustrating the use of the classes in System.Storage.Files.

(1) Opening a File and Writing to It

This example shows how to do "traditional" file manipulation.

```
ItemContext ctx = ItemContext.Open( );
FileItem f = FileItem.FindByPath(ctx, @"\My
Documents\billg.ppt");
// example of handling file properties - ensure that file is
// not read-only
if (If.IsReadOnly)
{
    FileStream fs = f.OpenWrite( );
    // Read, write, close file stream fs
}
ctx.Close( );
```

Line 3 uses the FindByPath method to open the file. Line 7 shows the use of the promoted property, IsReadOnly, to check if the file is writeable. If it is, then in line 9 we use the OpenWrite( ) method on the FileItem object to get the file stream.

(2) Using Queries

Since the storage platform store holds properties promoted from the file system, it is possible to easily do rich queries on the files. In this example, all files modified in the last three days are listed:

```
// List all files modified in the last 3 days
FindResult result = FileItem.FindAll(
    ctx,
    "Modified >= '{0}'",
    DateTime.Now.AddDays(-3));
foreach ( FileItem file in result )
{
    ...
}
```

Here's another example of using queries—this one finds all writable files of a certain type (=extension):

```
// Find all writable .cs files in a particular directory.
// Equivalent to: dir c:\win\src\api\*.cs /a-r-d
DirectoryItem dir =
    DirectoryItem.FindByPath(ctx, @"c:\win\src\api");
FindResult result = dir.GetFiles(
    "Extension='cs' and IsReadOnly=false");
foreach ( File file in result )
{
    ...
}
``` e) Domain Behaviors

In one embodiment, in addition to the standard properties and methods, the file class also has domain behaviors (hand coded properties and methods). These behaviors are generally based on methods in the corresponding System.IO classes.

J. Conclusion

As the foregoing illustrates, the present invention is directed to a storage platform for organizing, searching, and sharing data. The storage platform of the present invention extends and broadens the concept of data storage beyond existing file systems and database systems, and is designed to be the store for all types of data, including structured, non-structured, or semi-structured data, such as relational (tabular) data, XML, and a new form of data called Items. Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

As is apparent from the above, all or portions of the various systems, methods, and aspects of the present invention may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

APPENDIX A

```
namespace System.Storage
{
    abstract class ItemContext : IDisposable, IServiceProvider
    {
        ItemContext Creation and Management Members // Applications cannot create ItemContext objects directly nor can they derive
        // classes from ItemContext.
        interal ItemContext( );
        // Create ItemContext that can be used to search the specified paths or, if no path
        // is specified, the default store on the local computer.
        public static ItemContext Open( );
        public static ItemContext Open( string path );
        public static ItemContext Open( params string[ ] paths );
        // Return the paths specified when the ItemContext was created.
        public string[ ] GetOpenPaths( );
        // Create a copy of this ItemContext. The copy will have independent transaction, caching
        // and update state. The cache will initially be empty. It is expected that using a
        // cloned ItemContext would be more efficient then opening a new ItemContext using the
        // same item domain(s).
        public ItemContext Clone( );
        // Close the ItemContext. Any attempt to use the ItemContext after it is closed will
        // result in an ObjectDisposedException.
        public void Close( );
        void IDisposable.Dispose( );
        // True if any domain specified when the ItemConext was opened resolved to a remote
        // computer.
        public bool IsRemote { get; }
```

APPENDIX A-continued

// Returns an object that can provide the requested service type. Returns null if the
// requested service cannot be provided. The use of the IServiceProvider pattern allows
// API that are not normally used and could confuse developers to be factored out of
// the ItemContext class. ItemContext can provide the following kinds of services:
// IItemSerialization, IStoreObjectCache
public object GetService( Type serviceType );
Update Related Members // Saves changes represented by all modified objects and all objects passed to
// MarkForCreate or MarkForDelete. May throw UpdateCollisionException if an update
// collision is detected.
public void Update( );
// Saves changes represented by the specified objects. The objects must have either
// been modified or passed to MarkForCreate or MarkForDelete, otherwise Argument-
// Exception is thrown. May throw UpdateCollisionException if an update collision is
// detected.
public void Update( Object objectToUpdate );
public void Update( IEnumerable objectsToUpdate );
// Refreshes the content of the specified objects from the store. If the object has
// been modified, the changes are overwritten and the object is no longer considered
// modified. Throws ArgumentException if anything other then an item, item extension,
// or relationship object is specified.
public void Refresh( object objectToRefresh );
public void Refresh( IEnumerable objectsToRefresh );
// Raised when an update detects that data has been changed in the store between when a
// modified object was retrieved and an attempt was made to save it. If no event handler
// is registered, the update throws an exception. If an event handler is registered, it
// can throw an exception to abort the update, case the modified object to overwrite
// the data in the store or merge the changes made in the store and in the object.
public event ChangeCollisionEventHandler UpdateCollision;
// Raised at various points during update processing to provide update progress
// information.
public event UpdateProgressEventhandler UpdateProgress;
// Async versions of Update
public IAsyncResult BeginUpdate( IAsyncCallback callback, object state );
public IAsyncResult BeginUpdate( object objectToUpdate,
                    IAsyncCallback callback,
                    object state );
public IAsyncResult BeginUpdate( IEnumerable objectsToUpdate,
                    IAsyncCallback callback,
                    object state );
public void EndUpdate( IAsyncResult result);
// Async versions of Refresh
public IAsyncResult BeginRefresh( object objectToRefresh,
                    IAsyncCallback callback,
                    object state );
public IAsyncResult Begin Refresh( IEnumerable objectsToRefresh,
                    IAsyncCallback callback,
                    object state );
public void EndRefresh( IAsyncResult result);
Transaction Related Members // Begins a transaction with the specified isolation level. The default isolation level
// is ReadCommited. In all cases, a distributed transaction is started because it may
// have to encompass changes stream typed item properties.
public Transaction BeginTransaction( );
public Transaction BeginTransaction( System.Data.IsolationLevel isolationLevel );
Search Related Members // Create an ItemSearcher that will search this item context for objects of the
// specified type. Throws ArgumentException if a type othern then an item,
// relationship, or item extension is specified.
public ItemSearcher GetSearcher( Type type );
// Find an item given its id.
public Item FindItemById( Itemid itemid );
// Find an item given its path. The path may be absolute or relative. If it is relative,
// NotSupportedException will be thrown if multiple item domains were specified when
// the ItemContext was opened. Will return null if no such item exists. Creates a
// connection to the \\machine\share part of the domain to retrieve the item. The
// item will be assocaited with that domain.
public Item FindItemByPath( string path );
// Find an item given its path. The path is relative to the specified item domain.
// Creates a connection to the specified domain to retrieve the item. The item will be
// associated with that domain. Will return null if no such item exists.
public Item FindItemByPath( string domain, string path );
// Find a set of items given a path. The path is relative to the item domains specified
// when the ItemContext was opened. Will return an empty result if no such item exists.
public FindResult FindAllItemsByPath( string path );
// Find a relationship given its ids.

APPENDIX A-continued

```
    public Relatioinship FindRelationshipById( ItemId itemID,
                            RelationshipId relationshipId );
    // Find a item extension given its ids.
    public ItemExtension FindItemExtensionById( ItemId itemId,
                            ItemExtensionId itemExtensionId );
    // Find all item, relationship, or item extensions of the specified type optionally
    // satisifing a given filter. Throws ArgumentException if a type other then one of
    // these is specified.
    public FindResult FindAll( Type type );
    public FindResult FindAll( Type type, string filter );
    // Find any item, relationship, or item extensions of the specified type that satisfies
    // a given filter. Throws ArgumentException if a type other then one of these is
    // specified. Returns null if no such object is found.
    public object FindOne( Type type, string filter );
    // Find the item, relationship, or item extensions of the specified type that satisfies
    // a given filter. Throws ArgumentException if a type other then one of these is
    // specified. Throws ObjectNotFoundException if no such object was found. Throws
    // MultipleObjectsFoundException if more then one object was found.
    public object FindOnly( Type type, string filter );
    // Returns true if an item, relationship, or item extensions of the specified type that
    // satisfies a given filter exists. Throws ArgumentException if a type other then one
    // of these is specified.
    public bool Exists( Type type, string filter );
    // Specifies how the objects returned by a search relate to the object identity map
    // maintained by the ItemContext.
    public SearchCollisionMode SearchCollisionMode { get; set; }
    // Raised when PreserveModifiedObjects is specified for ResultMapping. This event allows
    // the application to selectivly update the modified object with data retrieved with the
    // search.
    public event ChangeCollisionEventHandler SearchCollision;
    // Incorporate an object from annother ItemContext into this item context. If an object
    // representing the same item, relationship or item extension does not already exist
    // this this ItemContext's identity map, a clone of the object is created and added to
    // the map. If an object does exist, it is updated with the state and content of the
    // specified object in a way concistant with the SearchCollisionMode.
    public Item IncorporateItem( Item item );
    public Relationship IncorporateRelationship( Relationship relationship );
    public ItemExtension IncorporateItemExtension( ItemExtension itemExtension );
}
// Handler for ItemContext.UpdateCollision and ItemSearcher.SearchCollision events.
public delegate void ChangeCollisionEventHandler( object source,
                        ChangeCollisionEventArgs args );
// Arguments for the ChangeCollisionEventHandler delegate.
public class ChangeCollisionEventArgs : EventArgs
{
    // Modified item, item extension, or relationship object.
    public object ModifiedObject { get; }
    // Properties from store.
    public IDictionary StoredProperties { get; }
}
// Handler for ItemContext.UpdateProgress.
public delegate void UpdateProgressEventHandler( ItemContext itemContext,
                        UpdateProgressEventArgs args );
// Arguments for the UpdateProgressEventHandler delegate
public class ChangeCollisionEventArgs : EventArgs
{
    // The current update operation.
    public UpdateOperation CurrentOperation { get; }
    // The object that is currently being updated.
    public object CurrentObject { get; }
}
// Specifies how the objects returned by a search relate to the objects identity map
// maintained by the ItemContext.
public enum SearchCollisionMode
{
    // Indicates that new objects should be created and returned. Objects representing the
    // same item, item extension, or relationship in the identity map are ignored. If this
    // option is specified the SearchCollision event will not be raised.
    DoNotMapSearchResults.
```

APPENDIX B

```
name space System.Storage
{
    // Executes a search across a specific type in an item context.
    public class ItemSearcher
    {
        Constructors public ItemSearcher( );
        public ItemSearcher( Type targetType, ItemContext context );
        public ItemSearcher( Type targetType, ItemContext context,
                    params SearchExpression[ ] filters);
        Properties // The filters used to identify matching objects.
        public SearchExpressionCollection Filters {get;}
        // The ItemContext that specifies the domains that will be searched.
        public ItemContext ItemContext {get; set;}
        // The search parameter collection.
        public ParameterCollection Parameters {get;}
        // The type the searcher will operate against. For simple searches this
        // is the type of the object that will be returned.
        public Type TargetType {get; set;}
        Search Methods // Find objects of TargetType that satisfiy the conditions specified by
        // Filters. Returns an empty FindResult if no such objects exist.
        public FindResult FindAll( );
        public FindResult FindAll( FindOptions findOptions );
        public FindResult FindAll( params SortOption[ ] sortOptions );
        // Find any one object of TargetType that satisifies the conditions
        // specified by Filters. Returns null if no such object exists.
        public object FindOne( );
        public object FindOne( FindOptions findOptions );
        public object FindOne( params SortOption[ ] sortOptions );
        // Find the object of TargetType that satisfies the conditions
        // specified by Filters. Throws ObjectNotFoundException if no such
        // object was found. Throws MultipleObjectsFoundException if more
        //   then one object was found.
        public object FindOnly( );
        public object FindOnly( FindOptions findOptions );
        // Determine if an object of TargetType that satisfies the conditions
        // specified by Filters exists.
        public bool Exists( );
        // Creates an object that can be used to more efficiently execute the
        // same search repeatedly.
        public PreparedFind PrepareFind( );
        public PreparedFind PrepareFind( FindOptions findOptions );
        public PreparedFind PrepareFind( params
            SortOption[ ] sortOptions );
        // Retrieves the number of records that would be returned
        //   by FindAll( ).
        public int GetCount( );
        // Asynchronous versions of various methods.
        public IAsyncResult BeginFindAll( AsyncCallback callback,
                    object state );
        public IAsyncResult BeginFindAll( FindOptions findOptions,
                    AsyncCallback callback,
                    object state );
        public IAsyncResult BeginFindAll( SortOption[ ] sortOptions,
                    AsyncCallback callback,
                    object state );
        public FindResult EndFindAll( IAsyncResult ar );
        public IAsyncResult BeginFindOne( AsyncCallback callback,
                    object state );
        public IAsyncResult BeginFindOne( FindOptions findOptions,
                    AsyncCallback callback,
                    object state );
        public IAsyncResult BeginFindOne( SortOption[ ] sortOptions,
                    AsyncCallback callback,
                    object state );
        public object EndFindOne( IAsyncResult asyncResult );
        public IAsyncResult BeginFindOnly( AsyncCallback callback,
                    object state );
        public IAsyncResult BeginFindOnly( FindOptions findOptions,
                    AsyncCallback callback,
                    object state );
        public IAsyncResult BeginFindOnly( SortOption[ ] sortOptions,
                    AsyncCallback callback,
                    object state );
        public object EndFindOnly( IAsyncResult asyncResult );
        public IAsyncResult BeginGetCount( AsyncCallback callback,
                    object state );
        public int EndGetCount( IAsyncResult asyncResult );
        public IAsyncResult BeginExists( AsyncCallback callback,
                    object state );
        public bool EndExists( IAsyncResult asyncResult );
    // Options used when executing a search.
    public class FindOptions
    {
        public FindOptions( );
        public FindOptions( params SortOption[ ] sortOptions );
        // Specifies if delay loadable fields should be delay loaded.
        public bool DelayLoad {get; set;}
        // The number of matches that are returned.
        public int MaxResults {get; set;}
        // A collection of sort options.
        public SortOptionCollection SortOptions {get;}
    }
    // Represents a parameter name and value.
    public class Parameter
    {
        // Initializes a Parameter object with a name and value.
        public Parameter( string name, object value );
        // The parameter's name.
        public string Name {get;}
        // The parameter's value.
        public object Value {get; set;}
    }
    // A collection of parameter name/value pairs.
    public class ParameterCollection : ICollection
    {
        public ParameterCollection( );
        public int Count {get;}
        public object this[string name] {get; set;}
        public object SyncRoot {get;}
        public void Add( Parameter parameter );
        public Parameter Add( string name, object value);
        public bool Contains( Parameter parameter );
        public bool Contains( string name );
        public void CopyTo( Parameter[ ] array, int ind x );
        void ICollection.CopyTo( Array array, int ind x );
        IEnumerator IEnumerable.GetEnumerator( );
        public void Remove( Parameter parameter );
        public void Remove( string name );
    }
    // Represents a search that has been optimized for repeated execution.
    public class PreparedFind
    {
        public ItemContext ItemContext {get;}
        public ParameterCollection Parameters {get;}
        public FindResult FindAll( );
        public object FindOne( );
        public object FindOnly( );
        public bool Exists( );
    }
    // Specifies sorting options used in a search.
    public class SortOption
    {
        // Initialize a object with default values.
        public SortOption( );
        // Initializes a SortOptions object with SearchExpression, order.
        public SortOption( SearchExpression searchExpression,
            SortOrder order );
        // A search SearchExpression that identifies the property that will be
        //   sorted.
        public SearchExpression Expression {get; set;}
        // Specifies ascending or descending sort order.
        public SortOrder Order {get; set;}
    }
    // A collection of sort option objects.
    public class SortOptionCollection : IList
    {
        public SortOptionCollection( );
        public SortOption this[int index] {get; set;}
        public int Add( SortOption value );
        public int Add( SearchExpression expression, SortOrder order );
        int IList.Add( object value );
        public void Clear( );
```

APPENDIX B-continued

```
    public bool Contains( SortOption value );
    bool IList.Contains( object value );
    public void CopyTo( SortOption[ ] array, int index );
    void ICollection.CopyTo( Array array, int index );
    public int Count {get;}
    IEnumerator IEnumerable.GetEnumerator( );
    public void Insert( int index, SortOption value );
    void IList.Insert( int index, object value );
    public int IndexOf( SortOption value );
    int IList.IndexOf( object value );
    public void Remove( SortOption value );
    void IList.Remove( object value );
    public void RemoveAt( int index );
    public object SyncRoot {get;}
  }
  // Specifies the sort order using in a SortOption object.
  public enum SortOrder
  {
    Ascending,
    Descending
  }
}
```

APPENDIX C

```
namespace System.Storage
{
  public abstract class FindResult : IAsyncObjectReader
  {
    public FindResult( );
    // Moves the FindResult to the next position in the result.
    public bool Read( );
    public IAsyncResult BeginRead( AsyncCallback callback,
        object state );
    public bool EndRead( IAsyncResult asyncResult );
    // The current object.
    public object Current {get;}
    // Returns whether or not the FindResult contains any objects.
    public bool HasResults {get;}
    // Returns whether or not the FindResult is closed.
    public bool IsClosed {get;}
    // Returns the type of items in this FindResult.
    public Type ObjectType {get;}
    // Closes the FindResult
    public void Close( );
    void IDisposable.Dispose( );
    // Returns an enumerator over the FindResult, starting at the current
    // position. Advancing any enumerator on the FindResult advances all
    // enumerators as well as the FindResult itself.
    IEnumerator IEnumerable.GetEnumerator( );
    public FindResultEnumerator GetEnumerator( );
  }
  public abstract class FindResultEnumerator : IEnumerator, IDisposable
  {
    public abstract object Current { get; }
    public abstract bool MoveNext( );
    public abstract void Reset( );
    public abstract void Close( );
    void IDisposable.Dispose( );
  }
}
namespace System
```

```
  // Indicates that objects from the identity map should be returned. If
      the content of
  // an object has been modified by the application, the modified
      object's content is
  // preserved. If the object has not been modified, its content is
      updated with the
  // data returned by the search. The Application may provide an
      handler for the
  // SearchCollision event and selectivly update the object as desired.
    PreserveModifiedObjects,
  // Indicates that the objects from the identity map should be
      returned. The content
  // of the object is updated with the data returned by the search, even
      if the object
  // has been modified by the application. If this option is specified
      the Search-
  // Collision event will not be raised.
    OverwriteModifiedObjects
  }
  // The current update operation.
  public enum UpdateOperation
  {
    // Provided when Update is first called. CurrentObject will be null.
    OverallUpdateStarting,
    // Provided just before Update returns after a successful update.
      CurrentObject will be
    // null.
    OverallUpdateCompletedSucessfully,
    // Provided just before Update throws an exception. CurrentObject
      will be the exception
    // object.
    OverallUpdateCompletedUnsuccessfully,
    // Provided when the update of an object is started. CurrentObject will
      reference the
    // object that will be used for the updated.
    ObjectUpdateStaring,
    // Provided when a new connection is needed. CurrentObject will be
      a string that contains
    // the path identifying an item domain as passed to ItemContext.Open
      or retrieved from
    // the Location field of a relationship.
    OpeningConnection
  }
}
```

```
{
  // A common interface for iterating over objects.
  public interface IObjectReader : IEnumerable, IDisposable
  {
    object Current {get;}
    bool IsClosed {get;}
    bool HasResults {get;}
    Type ObjectType {get;}
    bool Read( );
    void Close( );
  }
  // Adds asynchronous methods to IObjectReader
  public interface IAsyncObjectReader : IObjectReader
  {
    IAsyncResult BeginRead( AsyncCallback callback, object state );
    bool EndRead( IAsyncResult result );
  }
}
```

What is claimed:

1. A method for manipulating a plurality of discrete units of information said method comprising:

generating, by an operating system, a shell and a kernel, wherein the operating system includes a database management program;

generating, by the operating system, a plurality of Items wherein each Item includes Relationships to other Items;

storing, by the operating system, the Items in a file system as filestreams, wherein the filestreams are managed within the context of the database management program;

associating, by the operating system, each of said Items with one or more Relationships, the one or more Relationships including Holding Relationships that control the lifetime of a target Item and Embedding Relationships that enable modeling of compound Items, each one or more Relationships being between a source Item and a target Item, the target Items each having an associated reference count;

determining, by the operating system, the lifetime of each target Item that has a Holding Relationship associated between the source Item and the target Item based on the associated reference count;

storing, by the operating system, each target Item based on the lifetime determined from the reference count;

preventing, by the operating system, a Holding Relationship between the source Item and the target Item if an Embedding Relationship currently exists between the source Item and the target Item; and exposing the Items to the shell of the operating system.

2. The method of claim 1 wherein each Relationship from among said plurality of Relationships constitutes, at the operating system level, a mapping between a pair of Items that said Relationship interconnects.

3. The method of claim 2 wherein each Relationship has properties.

4. The method of claim 3 wherein each Relationship comprises a target property for the identification of the target Item of said Relationship.

5. The method of claim 4 wherein each Relationship further comprises an ownership property corresponding to an ownership of said target Item.

6. The method of claim 3 wherein the operating system automatically establishes a Relationship between each pair of Items in which each of the Items in the pair of Items has a common value for a common property.

7. The method of claim 3 wherein the operating system automatically establishes a Relationship between each pair of Items in which each of the Items in the pair of Items has a common property.

8. The method of claim 3 wherein each Item has an Item type, and the operating system automatically establishes a Relationship between each pair of Items in which each of the Items in the pair of Items has the same Item type.

9. The method of claim 3 wherein each Item has a parent Item type, and the operating system automatically establishes a Relationship between each pair of Items in which each of the Items in the pair of Items has a common parent Item type.

10. The method of claim 3 wherein the operating system automatically establishes a Relationship between each pair of Items based on a user-defined parameter.

11. A computer-readable storage medium for implementing an operating system, the computer-readable storage medium comprising:

instructions for the operating system including instructions for a database management program;

instructions for the operating system including instructions for a file system;

instructions for the operating system including instructions for generating items;

instructions for the operating system including instructions for storing the Items in the file system as filestreams, wherein the filestreams are managed within the context of the database management program;

instructions for the database management program including instructions for manipulating the Items said Items associated by one or more Relationships, the one or more Relationships including Holding Relationships that control the lifetime of a target Item and Embedding Relationships that enable modeling of compound Items, wherein a target Item of an Embedding Relationship can be manipulated within the context of the source Item, each Relationship being associated between a source Item and the target Item.

12. The computer-readable storage medium of claim 11 wherein each Relationship from among said plurality of Relationships constitutes, at the operating system level, a mapping between a pair of Items that said Relationship interconnects.

13. The computer-readable storage medium of claim 12 wherein each Relationship has properties.

14. The computer-readable storage medium of claim 13 wherein each Relationship comprises a target property for the identification of the target Item of said Relationship.

15. The computer-readable storage medium of claim 14 wherein each Relationship further comprises an ownership property corresponding to an ownership of said target Item.

16. The computer-readable storage medium of claim 13 wherein the operating system automatically establishes a Relationship between each pair of Items in which each of the Items in the pair of Items has a common value for a common property.

17. The computer-readable storage medium of claim 13 wherein the operating system automatically establishes a Relationship between each pair of Items in which each of the Items in the pair of Items has a common property.

18. The computer-readable storage medium of claim 13 wherein each Item has an Item type, and operating system automatically establishes a Relationship between each pair of Items in which each of the Items in the pair of Items has the same Item type.

19. The computer-readable storage medium of claim 13 wherein each Item has a parent Item type, and operating system automatically establishes a Relationship between each pair of Items in which each of the Items in the pair of Items has a common parent Item type.

20. The computer-readable storage medium of claim 13 wherein the operating system automatically establishes a Relationship between each pair of Items based on a user-defined parameter.

21. A computer system, comprising:

a processor;

a memory; and instructions for an operating system stored in the memory; the instructions for the operating system including instructions for a file system and a database management program, the instructions for the operating system further including instructions for storing the Items in the file system as filestreams, wherein the filestreams are managed within the context of the database management program, the instructions for the operating system further including instructions for managing a plurality of Relationships interconnecting the Items, the plurality of Relationships including Holding Relationships that control the lifetime of a target Item and Embedding Relationships that enable modeling of compound Items, each Relationship being between a source Item and a target Item; and instructions for the operating system including instructions for maintaining a reference count associated with each of the target Items that is used to determine the lifetime of each of the target Items if a Holding Relationship is associated between the source Item and the target Item, and storage of each target Item is maintained based on the lifetime, and a Holding Relationship is prevented from being formed between the source Item and target Item if an Embedding Relationship is currently associated between the source Item and the target Item.

22. The computer system of claim 21 wherein each Relationship from among said plurality of Relationships constitutes, at the operating system level, a mapping between a pair of Items that said Relationship interconnects.

23. The computer system of claim 22 wherein each Relationship has properties.

24. The computer system of claim 23 wherein each Relationship comprises a target property for the identification of the target Item of said Relationship.

25. The computer system of claim 24 wherein each Relationship further comprises an ownership property corresponding to an ownership of said target Item.

26. The computer system of claim 23 wherein the operating system automatically establishes a Relationship between each pair of Items in which each of the Items in the pair of Items has a common value for a common property.

27. The computer system of claim 23 wherein the operating system automatically establishes a Relationship between each pair of Items in which each of the Items in the pair of Items has a common property.

28. The computer system of claim 23 wherein each Item has an Item type, and the operating system automatically establishes a Relationship between each pair of Items in which each of the Items in the pair of Items has the same Item type.

29. The computer system of claim 23 wherein each Item has a parent Item type, and the operating system automatically establishes a Relationship between each pair of Items in which each of the Items in the pair of Items has a common parent Item type.

30. The computer system of claim 23 wherein the operating system automatically establishes a Relationship between each pair of Items based on a user-defined parameter.

* * * * *